United States Patent [19]
Tarter et al.

[11] Patent Number: 5,550,734
[45] Date of Patent: Aug. 27, 1996

[54] COMPUTERIZED HEALTHCARE ACCOUNTS RECEIVABLE PURCHASING COLLECTIONS SECURITIZATION AND MANAGEMENT SYSTEM

[75] Inventors: Fred B. Tarter, Armonk; Jeffrey M. Greene; Thomas J. De Fazio, both of New York, all of N.Y.; Jan Peck, Glendale; L. Stephen Wylie, Scottsdale, both of Ariz.; Mark M. Magnotte, Woodbridge, N.J.; Del Hall, Phoenix, Ariz.; Scott A. Tarter, Armonk, N.Y.

[73] Assignee: The Pharmacy Fund, Inc., New York, N.Y.

[21] Appl. No.: 175,338

[22] Filed: Dec. 23, 1993

[51] Int. Cl.⁶ .............................. G06F 17/60; G06G 7/52
[52] U.S. Cl. ........................................ 364/401 R; 364/408
[58] Field of Search ..................... 364/401, 406, 364/408; 235/375, 380

[56] References Cited

U.S. PATENT DOCUMENTS

| | | | |
|---|---|---|---|
| 4,858,121 | 8/1989 | Barber et al. | 364/406 |
| 5,012,077 | 4/1991 | Takano | 235/380 |
| 5,070,452 | 12/1991 | Doyle, Jr. et al. | 364/401 |
| 5,231,569 | 7/1993 | Myatt et al. | 364/408 |

OTHER PUBLICATIONS

Dialog Abstract: File 16, Acc#02275161; "Dallas–based Insurance Claims Processor Goes Public"; *Dallas Business Journal (TX)*; Aug. 7, 1989; p. 12.
Raphael; "Feeling Sick? Now You Can Get Better With a Credit"; *Crain Detroit Business (Detroit, MI, US)*; v5 n50 s1; Dec. 11, 1989; Dialog: File 635, Acc#0118046.
Dialog Abstract: File 16, Acc#02675163; "United Medicorp—The Company, Recent Developments"; *S1 SEC Registration*; Jun. 1, 1990.
Smith; "United Medicorp Goes to Market for $10M"; *Dallas Business Journal (Dallas, TX, US)*; v13 n42 s1; p7; Dialog: File 635, Acc#0147620.
Gonzales; "New Medical Financial Service Lets Patients Pay with 'Plastic'"; *Business Journal—Serving Phoenix & the Valley of the Sun*; v10 n47; p4(1); Oct. 1, 1990; Dialog: File 148, Acc#0452648.
Freeman; "Two Hospital Accept Medical Credit Card"; *Jacksonville Business Journal*; v6 n8; p10(1); Nov. 30, 1990; Dialog: File 148, Acc#04915414.
Dialog Abstract: File 16, Acc#03517134; "Completecare Announces National Credit Program"; *PR Newswire*; Dec. 2, 1991; p. 1.
"Credit Card Program Hospital Boost Cash Flow"; *Modern Healthcare*; Dec. 16, 1991; p. 44; Dialog: File 16, Acc#03523283.
Blount; "Credit Card Specializes in Health Care"; *Arkansas Democrat Gazette*; Feb. 21, 1992.

*Primary Examiner*—Donald E. McElheny, Jr.
*Assistant Examiner*—Stephen R. Tkacs
*Attorney, Agent, or Firm*—Brown Raysman & Millstein

[57] ABSTRACT

The present invention is a computerized method and system for financing health care service providers, especially pharmacies, by evaluating and purchasing their accounts receivables, scoring the creditworthiness of payors and obligors such as insurance companies, self-insured employers, health maintenance organizations, preferred provider organizations, government agencies, and other entities sponsoring groups and individuals receiving health care benefits, collecting on receivables, securitizing receivables, managing funds, and processing and reconciling claims and payments.

32 Claims, 71 Drawing Sheets

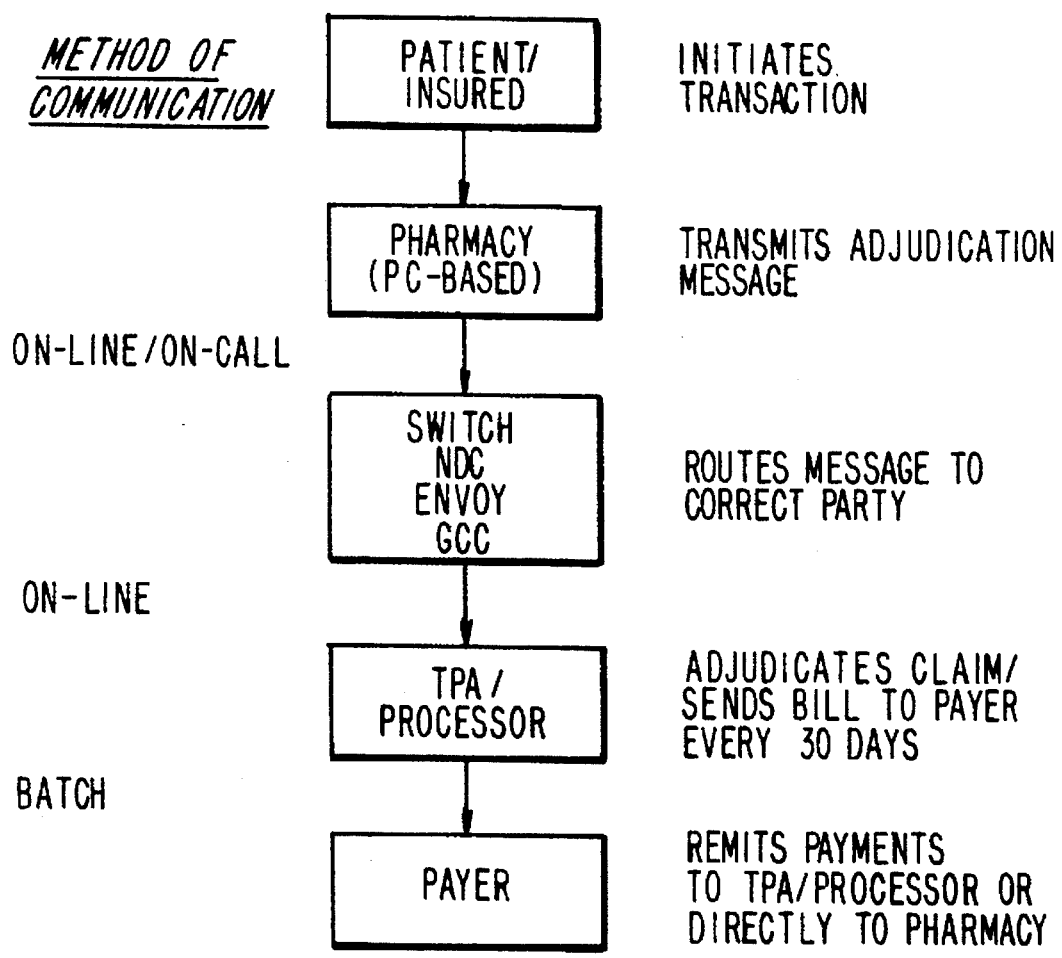

FIG. 4

| Key | DATABASE FILE/FIELD | Type | Length | FREQUENCY |
|---|---|---|---|---|
| 1) | DAILY RR - NABP | | | DAILY |
| * | NABP_NBR | N | 9 | |
| | CHAIN_NBR | N | 8 | |
| | GROUP | N | 8 | |
| ** | BIN_NBR | N | 9 | |
| | CLAIMS_BOUGHT_# | N | 7 | |
| | CLAIMS_BOUGHT_$ | N | 10 | |
| | DISCOUNT_EARNED | N | 8 | |
| | CLAIMS_DECL_# | N | 7 | |
| | CLAIMS_DECL_$ | N | 10 | |
| | TRANS_DATE | D | | |
| | | | | |
| 2) | DAILY RR - OBLIGOR | | | DAILY |
| ** | BIN_NBR | N | 9 | |
| ** | PLAN_NBR | A/N | 9 | |
| * | OBLIGOR_NBR | A/N | 9 | |
| | CLAIMS_BOUGHT_# | N | 7 | |
| | CLAIMS_BOUGHT_$ | N | 10 | |
| | DISCOUNT_EARNED | N | 8 | |
| | CLAIMS_DECL_# | N | 7 | |
| | CLAIMS_DECL_$ | N | 10 | |
| | TRANS_DATE | D | | |
| | DATE_DUE | D | | |
| | | | | |
| 3) | LOCK_BOX_RECEIPTS | | | WEEKDAYS |
| | PAYOR NAME (optional) | A/N | 10 | |
| * | BIN_NBR | N | 9 | |
| * | PROCESSOR_NBR | N | 10 | |
| | BATCH_NBR | N | 5 | |
| | DATE_PAID | D | | |
| | AMOUNT_PAID | N | 10 | |
| | DIFF_FROM_RA | N | 10 | |
| | DAYS_LATE | N | 4 | |
| | | | | |
| 4) | RA_RECEIPTS SUMMARY | | | WEEKDAYS |
| * | BIN_NBR | N | 9 | |
| * | PROCESSOR_NBR | N | 10 | |
| | BATCH_NBR | N | 5 | |
| | RA_AMOUNT | N | 10 | |
| | DIFF_FROM_LB | N | 10 | |
| | CYCLE_DATE | D | | |
| | RA_DATE | D | | |
| | CUR_CYCLE_PMTS | N | 10 | |
| | PRIOR_CYCLE_PMTS | N | 10 | |
| | FUT_CYCLE_PYMTS | N | 10 | |
| | PROVIDER_DEBITS | N | 10 | |
| | PROVIDER_CREDITS | N | 10 | |
| | PAYOR_DEBITS | N | 10 | |
| | PAYOR_CREDITS | N | 10 | |
| | PFI_ITEMS (Future Use) | N | 10 | |

FIG. 5

| Key | DATABASE FILE/FIELD | Type | Length | FREQUENCY |
|---|---|---|---|---|
| 5) | ACCT RECEIVABLE - SUMMARY | | | DAILY |
| * | BIN_NBR | N | 9 | |
| ** | PLAN_NBR | A/N | 9 | |
| ** | OBLIGOR_NBR | A/N | 9 | |
| | TRANS_DATE | D | | |
| | CUTOFF_DATE | D | | |
| | AMOUNT_DUE | N | 10 | |
| | DATE_DUE | D | | |
| | | | | |
| 6) | ACCT RECEIVABLE - DETAIL | | | MONTHLY/ |
| *** | NABP_NBR | N | 9 | ON DEMAND |
| | RX_NBR | N | 9 | |
| * | BIN_NBR | N | 9 | |
| ** | PLAN_NBR | A/N | 9 | |
| ** | OBLIGOR_NBR | A/N | 9 | |
| | TRANS_DATE | D | | |
| | AMOUNT_DUE | N | 10 | |
| | DATE_DUE | D | | |
| | | | | |
| 7) | CASH DUE/PAST DUE | | | DAILY |
| * | BIN_NBR | N | 9 | |
| ** | CUTOFF_DATE | D | | |
| | AMOUNT_DUE | N | 10 | |
| | AMOUNT_PAID | N | 10 | |
| | AMOUNT_OPEN | N | 10 | |
| | DATE_DUE | D | | |
| | | | | |
| 8) | ACH DETAIL | | | DAILY |
| * | NABP_NBR, REGION_NBR, GROUP_NBR or CHAIN_NBR | N | 9 | |
| | ACH_AMOUNT | N | 10 | |
| | TRACE_NUMBER | N | 15 | |
| | ACH_DATE | D | | |
| | BANK_ROUTING | N | 8 | |
| | ACCOUNT_NBR | N | 17 | |
| | | | | |
| 12) | PROVIDER ADJUSTMENTS | | | DAILY |
| * | NABP_NBR, REGION_NBR, GROUP_NBR or CHAIN_NBR | N | 9 | |
| | BIN_NBR | N | 9 | |
| | PLAN_NBR | A/N | 9 | |
| | OBLIGOR_NBR | A/N | 9 | |
| | ADJ_DATE | D | | |
| | RX_NBR (Optional) | N | 9 | |
| | ADJ_TYPE | A/N | 4 | |
| | ADJ_AMOUNT | N | 9 | |
| | ENTERED BY | A/N | 4 | |

FIG.6

| Key | DATABASE FILE/FIELD | Type | Length | FREQUENCY |
|---|---|---|---|---|
| 13) | PAYOR ADJUSTMENTS | | | DAILY |
| | NABP_NBR, REGION_NBR, GROUP_NBR or CHAIN_NBR | N | 9 | |
| * | BIN_NBR | N | 9 | |
| | PLAN_NBR | A/N | 9 | |
| | OBLIGOR_NBR | A/N | 9 | |
| | RECON_DATE | D | | |
| | RX_NBR (Optional) | N | 9 | |
| | EXCEPTION_TYPE | A/N | 3 | |
| | TXN_AMT_PAID | N | 9 | |
| | RECON_AMT_PAID | N | 9 | |
| | REVIEWED BY | A/N | 4 | |
| | ALERT_NBR | N | 7 | |
| | | | | |
| 14) | NEGATIVE BALANCE SUMMARY | | | DAILY |
| | NABP_NBR, REGION_NBR, GROUP_NBR or CHAIN_NBR | N | 9 | |
| | PRIOR_DAYS_BAL | N | 9 | |
| | END_NEG_BAL | N | 9 | |
| | NET_CHANGE | N | 9 | |

FIG. 17A

MM/DD/YY
HHMMSS

MAIN MENU

NABP No. _____   TRANSACTION DATE __/__/__   DEPOSIT No. _____

Rx No. _____   FROM __/__/__ TO __/__/__   DEPOSIT DATE __/__/__

CHAIN CODE _____ (Summary Only)   CALLER NAME _____

Mark Call Category that applies with "X" and press the appropriate PF key

| | |
|---|---|
| ___ DEPOSIT INQUIRY | ___ RECEIVABLE NOT PURCHASED |
| ___ DISAGREE WITH TOTALS | ___ ADJUSTMENT INQUIRY |
| ___ PAYER SPECIFIC PROBLEM | ___ PROCESSOR PROBLEM |
| ___ BANK PROBLEM | ___ PFI BULLETIN REVIEW |
| ___ INQUIRY INACTIVE LIST | ___ NO DEPOSIT RECEIVED |
| ___ PAYOR PROFILE | |
| ___ SWITCHING PROBLEM | |
| ___ ORDER DETAIL REPORT | ___ MONTHLY STATEMENT |
| | (Mark type of report |
| | from list below) |
| | ___ ACTIVITY SUMMARY |
| | ___ PROCESSORS SUMMARYS |
| | ___ PROCESSOR ACTIVITY |
| | (Detail) |

PFxx PHARMACY PROFILE        PFxx ADJUSTMENTS           PFxx NON-PURCHASE DETAIL
PFxx DEPOSIT SUMMARY         PFxx ALERT NOTES           PFxx BUYING GROUP PROFILE
PFxx CLAIM DETAIL            PFxx ORDER SUMMARY REPORT  PFxx CHAIN PROFILE
PFxx                         PFxx                       PFxx END/RECORD CALL

FIG. 17B

PHARMACY PROFILE

EFFECTIVE DATE ___/___/___

NABP No. _____
MEDICAID No. _____ CHAIN CODE No. _____
NAME _____ BUYING GROUP No. _____
ADDR _____
CITY _____ ADJUSTMENT AUTHORIZATION
STATE ___ ALERT _____ LVL 1 - $25/DAY
ZIP _____ LVL 2 - $100/DAY
PHONE ___-___-___ FAX ___-___-___ LVL 3 - $500/DAY
TIME ZONE _____
PHARMACY TYPE _____ CLIENT STATUS CODE: __
PHARMACY CONTACT _____ 2ND CONTACT _____
SOFTWARE VENDOR NAME _____ PHONE No. ___-___-___
CONTRACT DATE ___/___/___ FIRST BUY DATE ___/___/___ TERMINATION DATE ___/___/___
REMIT TO: [ ] PHARMACY  [ ] CHAIN HQ. AVG. DAILY RECEIVABLES $ _____
BANK NAME _____ ACCOUNT No. _____
BANK ROUTING _____ DISC. RATE 1 ____ % DISC. RATE 2 ____ %
YTD # OF CLAIMS _____ YTD $ OF CLAIMS $ _____

PFxx ADD/UPDATE PHARMACY          PFxx ADJUSTMENTS              PFxx
PFxx DEPOSIT SUMMARY              PFxx ALERT NOTES              PFxx DELETE PHARMACY
PFxx CLAIM DETAIL                 PFxx ORDER SUMMARY REPORT     PFxx CHAIN/BG PROFILE
PFxx                              PFxx                          PFxx END/RECORD CALL

FIG.17C

DEPOSIT SUMMARY

NABP No. _____  TRANSACTION DATE __/__/__  DEPOSIT No. _____

Rx No. _____  FROM __/__/__ TO __/__/__  DEPOSIT DATE __/__/__

CHAIN CODE _____ (Summary Only)  CALLER NAME _____

| DEPOSIT NO. | AMT PUR CLAIMS | AMT N/P CLAIMS | AMT CR/ ADJ'S | DISC. FEE | TOT NET DEPOSIT | N W B T | DEPOSIT DATE mmddyy | TIME hhmm |
|---|---|---|---|---|---|---|---|---|
| ___ | ___ | ___ | ___ | ___ | ___ | ___ | ___ | ___ |
| ___ | ___ | ___ | ___ | ___ | ___ | ___ | ___ | ___ |
| ___ | ___ | ___ | ___ | ___ | ___ | ___ | ___ | ___ |
| ___ | ___ | ___ | ___ | ___ | ___ | ___ | ___ | ___ |
| ___ | ___ | ___ | ___ | ___ | ___ | ___ | ___ | ___ |
| ___ | ___ | ___ | ___ | ___ | ___ | ___ | ___ | ___ |

PFxx PHARMACY PROFILE
PFxx NEG BAL RE-PAY SUMM
PFxx CLAIM DETAIL
PFxx

PFxx ADJUSTMENTS
PFxx ALERT NOTES
PFxx ORDER SUMMARY REPORT
PFxx DEP SUMM BY PROCR

PFxx NON-PURCHASE DETAIL
PFxx BUYING GROUP PROFILE
PFxx CHAIN PROFILE
PFxx END/RECORD CALL

FIG. 17D

DEPOSIT SUMMARY BY PROCESSOR

PAGE 1 OF 1

ABP No. _____ x No. _____   DEPOSIT No. _____

HAIN CODE _____ (Summary Only)

TRANSACTION DATE __/__/__   DEPOSIT DATE __/__/__

FROM __/__/__ TO __/__/__   CALLER NAME _____

| PROCESSOR NAME | # & AMT PUR CLAIMS | # & AMT N/P CLAIMS | # & AMT CR/ADJ'S | FEES |
|---|---|---|---|---|
| _____ | _____ | _____ | _____ | _____ |
| _____ | _____ | _____ | _____ | _____ |
| _____ | _____ | _____ | _____ | _____ |
| _____ | _____ | _____ | _____ | _____ |
| _____ | _____ | _____ | _____ | _____ |
| _____ | _____ | _____ | _____ | _____ |
| _____ | _____ | _____ | _____ | _____ |

Fxx PHARMACY PROFILE          PFxx ADJUSTMENTS              PFxx NON-PURCHASE DETAIL
Fxx SECONDARY SUMMARY         PFxx ALERT NOTES              PFxx BUYING GROUP PROFILE
Fxx CLAIM DETAIL              PFxx ORDER SUMMARY REPORT     PFxx CHAIN PROFILE
xx                            PFxx RETURN TO DEP SUMM       PFxx END/RECORD CALL

FIG. 17E

NEGATIVE BALANCE RE-PAYMENT SUMMARY

NABP No. _____   TRANSACTION DATE __/__/__   DEPOSIT No. _____

Rx No. _____   FROM __/__/__ TO __/__/__   DEPOSIT DATE __/__/__

CHAIN CODE _____ (Summary Only)   CALLER NAME _____

| DEPOSIT NO. | No. PUR CLAIMS | No. N/P CLAIMS | No. ADJ | TOT AMT DUE | NEG BALANCE | DISC. FEE | TOT NET DEPOSIT |
|---|---|---|---|---|---|---|---|
| | | | | | | | |
| | | | | | | | |
| | | | | | | | |
| | | | | | | | |
| | | | | | | | |
| | | | | | | | |

PFxx PHARMACY PROFILE       PFxx ADJUSTMENTS            PFxx NON-PURCHASE DETAIL
PFxx DEPOSIT SUMMARY        PFxx ALERT NOTES            PFxx BUYING GROUP PROFILE
PFxx CLAIM DETAIL           PFxx ORDER SUMMARY REPORT   PFxx CHAIN PROFILE
PFxx                        PFxx                        PFxx END/RECORD CALL

FIG. 17F

CLAIM DETAIL     PAGE 1 OF 1

NABP No. _____     TRANSACTION DATE __/__/__     DEPOSIT No. _____

Rx No. _____     FROM __/__/__ TO __/__/__     DEPOSIT DATE __/__/__

CHAIN CODE _____ (Summary Only)     CALLER NAME _____

| RX# | PROCSR | CARR GRP | DOF | AMT PD | POST DATE | POST TIME |
|-----|--------|----------|-----|--------|-----------|-----------|
| ___ | ___ | ___ ___ | ___ | ___.___ | ___ | ___ |
| ___ | ___ | ___ ___ | ___ | ___.___ | ___ | ___ |
| ___ | ___ | ___ ___ | ___ | ___.___ | ___ | ___ |
| ___ | ___ | ___ ___ | ___ | ___.___ | ___ | ___ |
| ___ | ___ | ___ ___ | ___ | ___.___ | ___ | ___ |
| ___ | ___ | ___ ___ | ___ | ___.___ | ___ | ___ |
| ___ | ___ | ___ ___ | ___ | ___.___ | ___ | ___ |

TOTAL # CLAIMS _____     TOTAL $ _____.__

PFxx PHARMACY PROFILE     PFxx ADJUSTMENTS     PFxx NON-PURCHASE DETAIL
PFxx DEPOSIT SUMMARY     PFxx ALERT NOTES     PFxx BUYING GROUP PROFILE
PFxx CLAIM DETAIL     PFxx ORDER SUMMARY REPORT     PFxx CHAIN PROFILE
PFxx     PFxx     PFxx END/RECORD CALL

FIG. 17G

ADJUSTMENTS     PAGE 1 OF 1

NABP No. _____     TRANSACTION DATE __/__/__     DEPOSIT No. _____

Rx No. _____     FROM __/__/__ TO __/__/__     DEPOSIT DATE __/__/__

CHAIN CODE _____ (Summary Only)     CALLER NAME _____

TOTAL # PROCSRS _____     TOTAL NUMBER CREDITS/ADJUSTMENTS _____     TOTAL NET AMOUNT CREDITS/ADJUSTMENTS AMOUNT (+/-) _____

| ADJ DATE | DOF | Rx# | AMT PD | TYPE | PROCSR | ADJ AMT(+/-) |
|---|---|---|---|---|---|---|
| __/__/__ | ___ | _____ | ___.__ | ___ | _____ | ___.__ |
| __/__/__ | ___ | _____ | ___.__ | ___ | _____ | ___.__ |
| __/__/__ | ___ | _____ | ___.__ | ___ | _____ | ___.__ |
| __/__/__ | ___ | _____ | ___.__ | ___ | _____ | ___.__ |

PFxx PHARMACY PROFILE     PFxx LIST ADJ BY PROCSR     PFxx ADJUSTMENT ENTRY
PFxx DEPOSIT SUMMARY     PFxx ALERT NOTES     PFxx BUYING GROUP PROFILE
PFxx CLAIM DETAIL     PFxx ORDER SUMMARY REPORT     PFxx CHAIN PROFILE
PFxx     PFxx     PFxx END/RECORD CALL

FIG. 17H

ADJUSTMENTS BY PROCESSOR   PAGE 1 OF 1

NABP No. _____

Rx No. _____

CHAIN CODE _____ (Summary Only)

TRANSACTION DATE __/__/__

FROM __/__/__ TO __/__/__   CALLER NAME _____

DEPOSIT No. _____

DEPOSIT DATE __/__/__

TOTAL NUMBER CREDITS/ADJUSTMENTS
PROCSRS _____

TOTAL NET AMOUNT CREDITS/ADJUSTMENTS (+/-)
___.__

| PROCSR | ADJ DATE | DOF | Rx# | AMT PD | TYPE | ADJ AMT(+/-) |
|---|---|---|---|---|---|---|
| ___ | ___ | ___ | ___ | ___ | ___ | ___ |
| ___ | ___ | ___ | ___ | ___ | ___ | ___ |
| ___ | ___ | ___ | ___ | ___ | ___ | ___ |
| ___ | ___ | ___ | ___ | ___ | ___ | ___ |
| ___ | ___ | ___ | ___ | ___ | ___ | ___ |

PFxx PHARMACY PROFILE
PFxx DEPOSIT SUMMARY
PFxx CLAIM DETAIL
PFxx

PFxx ADJUSTMENTS
PFxx ALERT NOTES
PFxx ORDER SUMMARY REPORT
PFxx

PFxx NON-PURCHASE DETAIL
PFxx BUYING GROUP PROFILE
PFxx CHAIN PROFILE
PFxx END/RECORD CALL

FIG. 171

ADJUSTMENT ENTRY     PAGE 1 OF 1

NABP No. _____     TRANSACTION DATE __/__/__     DEPOSIT No. _____

Rx No. _____     FROM __/__/__ TO __/__/__     DEPOSIT DATE __/__/__

CHAIN CODE _____     (Summary Only)     CALLER NAME _____     ENTERED BY: _____

| CR/ADJ DATE | DOF | RX NUMBER | AMOUNT PAID | TYPE | PROCSR | CR/ADJ AMT(+/-) |
|---|---|---|---|---|---|---|
| ___ | ___ | ___ | ___ | ___ | ___ | ___ |
| ___ | ___ | ___ | ___ | ___ | ___ | ___ |
| ___ | ___ | ___ | ___ | ___ | ___ | ___ |
| ___ | ___ | ___ | ___ | ___ | ___ | ___ |
| ___ | ___ | ___ | ___ | ___ | ___ | ___ |
| ___ | ___ | ___ | ___ | ___ | ___ | ___ |

PFxx PHARMACY PROFILE          PFxx LIST ADJ BY PROCSR          PFxx NON-PURCHASE DETAIL
PFxx DEPOSIT SUMMARY           PFxx ALERT NOTES                 PFxx BUYING GROUP PROFILE
PFxx CLAIM DETAIL              PFxx ORDER SUMMARY REPORT        PFxx CHAIN PROFILE
PFxx                           PFxx ADJUSTMENT ENTRY LOG        PFxx END/RECORD CALL

FIG. 17J

ALERT NOTES                                       PAGE 1 OF 1

CHAIN CODE or                REF#     SUB-CLASS
NABP No. _____             _____   _____    [ ] OPEN  [ ] UPDATE  [ ] RESOLVE

SUB-CLASS _____
DATE      TIME     REF#                                                            BY:
MM/DD/YY  HHMMSS   9999999

COMMENTS
    CALLER NAME: _____
    PHARMACY CALLED, NEEDS A COPY OF ADJUSTMENTS
    FOR THE PERIOD OF 4/5/93 - 4/12/93                                             JJH

MM/DD/YY  HHMMSS   C876543
    CALLER NAME: _____
    BANK HAD SYSTEM PROBLEMS, NO DEP DAT'D 4/12/93                                 PLW

SUB-CLASS _____
DATE      TIME     REF#
MM/DD/YY  HHMMSS   C234567R
    COMMENTS
    CALLER NAME: _____
    PER BANK, DEPOSIT AMOUNT VERIFIED. RELEASED
    FUNDS FOR TONIGHT'S DEPOSIT.                                                   PLW

MM/DD/YY  HHMMSS   C234567R
    CALLER NAME: _____
    PHARMACY DIDN'T RECV DEPOSIT ON MM/DD/YY
    PHARMACY DEP AMT IN QUESTION. REQ VERIFICATION                                 PLW

MM/DD/YY  HHMMSS   C234567R
    DAILY DEPOSIT WITHELD DUE TO ADV FLAG                                          SYS

PFxx PRINT ALERT REPORT                  PFxx PRINT ALERT NOTES
    (enter NABP# and REF#)                   (enter NABP# or leave blank for all)

FIG. 17K

NON-PURCHASED CLAIM DETAIL  PAGE 1 OF 1

NABP No. _____

TRANSACTION DATE __/__/__   DEPOSIT NO. _____

Rx No. _____   FROM __/__/__ TO __/__/__   DEPOSIT DATE __/__/__

CHAIN CODE _____ (Summary Only)   CALLER NAME _____

| RX# | PROCSR | CARR/GRP | DOF | AMT PD | STATUS | REASON | POST DATE | POST TIME |
|-----|--------|----------|-----|--------|--------|--------|-----------|-----------|
| ___ | ___ | ___ | ___ | ___ | ___ | ___ | ___ | ___ |
| ___ | ___ | ___ | ___ | ___ | ___ | ___ | ___ | ___ |
| ___ | ___ | ___ | ___ | ___ | ___ | ___ | ___ | ___ |
| ___ | ___ | ___ | ___ | ___ | ___ | ___ | ___ | ___ |
| ___ | ___ | ___ | ___ | ___ | ___ | ___ | ___ | ___ |
| ___ | ___ | ___ | ___ | ___ | ___ | ___ | ___ | ___ |
| ___ | ___ | ___ | ___ | ___ | ___ | ___ | ___ | ___ |
| ___ | ___ | ___ | ___ | ___ | ___ | ___ | ___ | ___ |

TOTAL # CLAIMS _____   TOTAL $ _____

PFxx PHARMACY PROFILE          PFxx ADJUSTMENTS              PFxx NON-PURCHASED DETAIL
PFxx DEPOSIT SUMMARY           PFxx ALERT NOTES              PFxx BUYING GROUP PROFILE
PFxx CLAIM DETAIL              PFxx ORDER SUMMARY REPORT     PFxx CHAIN PROFILE
PFxx                           PFxx                          PFxx END/RECORD CALL

FIG. 17L

CHAIN PROFILE

EFFECTIVE DATE __/__/__

BUYING GROUP No. _____

CHAIN CODE _____
NAME _____
ADDR _____
CITY _____
STATE _____
ZIP _____
PHONE _____
TIME ZONE _____
CHAIN TYPE _____
CONTACT NAME _____
SOFTWARE VENDOR NAME _____
CONTRACT DATE __/__/__
REMIT TO: [ ] PHARMACY  [ ] CHAIN HQ.
BANK NAME _____
BANK ROUTING _____
YTD # OF CLAIMS _____

ALERT _____
FAX _____-_____

ADJUSTMENT AUTHORIZATION
LVL 1 - $25/DAY
LVL 2 - $100/DAY
LVL 3 - $500/DAY

CLIENT STATUS CODE: _____
2ND CONTACT _____
PHONE No. _____
TERMINATION DATE __/__/__
AVG. DAILY RECEIVABLES $_____
ACCOUNT No. _____
DISC. RATE 1 _____%  DISC. RATE 2 _____%
YTD $ OF CLAIMS $_____

FIRST BUY DATE __/__/__

PFxx PHARMACY PROFILE
PFxx DEPOSIT SUMMARY
PFxx CLAIM DETAIL
PFxx

PFxx ADJUSTMENTS
PFxx ALERT NOTES
PFxx ORDER SUMMARY REPORT
PFxx

PFxx BILLING GROUP PROFILE
PFxx DELETE CHAIN
PFxx ADD/UPDATE CHAIN
PFxx END/RECORD CALL

FIG. 17M

BUYING GROUP PROFILE  EFFECTIVE DATE __/__/__

BUYING GROUP No. _____
NAME _____
ADDR _____
CITY _____
STATE __
ZIP __
PHONE __-__-__
TIME ZONE __
BUYING GROUP TYPE ____ (PSAO, Private Network, etc.)
CONTACT NAME _____   ALERT _____   FAX __-__-__   2ND CONTACT _____

ADJUSTMENT AUTHORIZATION
LVL 1 - $25/DAY
LVL 2 - $100/DAY
LVL 3 - $500/DAY

CLIENT STATUS CODE: __

CONTRACT DATE __/__/__   FIRST BUY DATE __/__/__   TERMINATION DATE __/__/__

BANK NAME _____
BANK ROUTING _____   ACCOUNT No. _____
YTD # OF CLAIMS _____   DISC. RATE 1 ____% DISC. RATE 2 ____%
                              YTD $ OF CLAIMS $_____

PFxx ADD/UPDATE PROFILE          PFxx ADJUSTMENTS                PFxx DELETE BUYING GROUP
PFxx DEPOSIT SUMMARY             PFxx ALERT NOTES                PFxx CHAIN PROFILE
PFxx CLAIM DETAIL                PFxx ORDER SUMMARY REPORT       PFxx ADD/UPDATE BUY GROUP
PFxx                             PFxx                            PFxx END/RECORD CALL

FIG. 17N

PFI BULLETIN

PAGE 1 OF 1

NABP No. _____  TRANSACTION DATE _/_/_  DEPOSIT No. _____

Rx No. _____  FROM _/_/_ TO _/_/_  DEPOSIT DATE _/_/_

CHAIN CODE _____ (Summary Only)  CALLER NAME _____

START DATE _____  STOP DATE _____  BULLETIN ENTERED BY: _____

BULLETIN TEXT _____
_____
_____
_____
_____
_____

PFxx PHARMACY PROFILE  PFxx LIST ADJ BY PROCSR  PFxx NON-PURCHASE DETAIL
PFxx DEPOSIT SUMMARY  PFxx ALERT NOTES  PFxx BUYING GROUP PROFILE
PFxx CLAIM DETAIL  PFxx ORDER SUMMARY REPORT  PFxx CHAIN PROFILE
PFxx  PFxx  PFxx END/RECORD CALL

FIG. 170

PAGE 1 OF 1

INQUIRY INACTIVE LIST

NABP No. _____   TRANSACTION DATE __/__/__   DEPOSIT No. _____

Rx No. _____   FROM __/__/__ TO __/__/__   DEPOSIT DATE __/__/__

CHAIN CODE _____ (Summary Only)   CALLER NAME _____

| PHARMACY/CHAIN NAME | CONTACT NAME | PHONE# | FAX# | LAST DATE | INQUIRY TIME |
|---|---|---|---|---|---|
| _____ | _____ | _____ | _____ | _____ | _____ |
| _____ | _____ | _____ | _____ | _____ | _____ |
| _____ | _____ | _____ | _____ | _____ | _____ |
| _____ | _____ | _____ | _____ | _____ | _____ |
| _____ | _____ | _____ | _____ | _____ | _____ |
| _____ | _____ | _____ | _____ | _____ | _____ |

PFxx PHARMACY PROFILE       PFxx LIST ADJ BY PROCSR       PFxx NON-PURCHASE DETAIL
PFxx DEPOSIT SUMMARY        PFxx ALERT NOTES              PFxx BUYING GROUP PROFILE
PFxx CLAIM DETAIL           PFxx ORDER SUMMARY REPORT     PFxx CHAIN PROFILE
PFxx                        PFxx                          PFxx END/RECORD CALL

FIG. 17P

PAYOR PROFILE

PAGE 1 OF 1

NABP No. _____    TRANSACTION DATE __/__/__    DEPOSIT No. _____

Rx No. _____    FROM __/__/__ TO __/__/__    DEPOSIT DATE __/__/__

CHAIN CODE _____ (Summary Only)    CALLER NAME _____

PLAN NAME: _____    PLAN NO: _____

OBLIGOR NAME: _____    OBLIGOR NO: _____

PAYOR NAME: _____    PAYOR NO: _____

PROCESSOR NAME: _____    PROCESSOR NO: _____

CYCLE RULE-OFF    PAYMENT
SCHEDULE: _____    SCHEDULE: _____

PFxx PHARMACY PROFILE        PFxx LIST ADJ BY PROCSR        PFxx NON-PURCHASE DETAIL
PFxx DEPOSIT SUMMARY         PFxx ALERT NOTES               PFxx BUYING GROUP PROFILE
PFxx CLAIM DETAIL            PFxx ORDER SUMMARY REPORT      PFxx CHAIN PROFILE
PFxx                         PFxx                           PFxx END/RECORD CALL

FIG. 28

|  | 1 | 2 | 3 | 4 | 5 | 6 | 7 | 8 |
|---|---|---|---|---|---|---|---|---|
| Payor | + | + | - | + | - | + | - | unknown |
| Obligor | + | - | + | blank | blank | unknown | unknown | |
| Buy | √ | | √ | √ | √ | √ | √ | √ |
| Don't Buy | | √ | | | | | | |
| Research | | | | √ | | √ | | √ |
| Obligor Notice | | | √ | | | | | |

FIG. 29

|  | 1 | 2 | 3 | 4 | 5 | 6 | 7 | 8 | 9 | 10 | 11 | 12 | 13 |
|---|---|---|---|---|---|---|---|---|---|---|---|---|---|
| Payor | + | + | + | + | - | - | - | - | + | - | + | - | unknown |
| Obligor | + | + | - | - | + | - | + | - | blank | blank | unknown | unknown | |
| Plan | + | - | - | + | + | + | - | - | blank | blank | unknown | unknown | |
| Buy | ✓ |  |  |  | ✓ |  |  |  | ✓ | ✓ | ✓ |  |  |
| Don't Buy |  | ✓ | ✓ | ✓ |  | ✓ | ✓ | ✓ |  |  |  | ✓ | ✓ |
| Research |  |  |  | ✓ | ✓ | ✓ |  |  | ✓ | ✓ | ✓ |  | ✓ |
| Obligor Notice |  |  |  |  |  |  | ✓ |  |  |  |  |  |  |

FIG. 30

| Function | 1 | 2 | 3 | 4 |
|---|---|---|---|---|
| Decline Indicator | off | on | off | on |
| Inactive Indicator | off | off | on | on |
| A. Recognize as RAPID R$_x$EMIT$^{sm}$ Customer | ✓ | ✓ | ✓ | ✓ |
| B. Copy Transaction for Buy/Decline Decision | ✓ | ✓ | x | x |
| C. Decline Claim and Retain for RA Match | * | ✓ | x | x |
| D. Accept RAs and Process Reconciliation | ✓ | ✓ | ✓ | ✓ |

FIG. 31

| | Log File | RR Trans | Same Proc Day |
|---|---|---|---|
| A | Rejected by TPA | | |
| B | Timed-out | Timed Out | |
| C | Known 3.2 Duplicate | | |
| D | Valid Claim/Reversal (Ver. 3.2) | | |
| E | Unknown Dupl. Status (Prob v 1.0) | | |
| F | | Not on File | |
| G | | NR amount same | X |
| H | | NR amount Diff | X |
| I | | NR Amount Same | |
| J | | NR amount Diff | |
| K | | Recon - Amount Same | X |
| L | | Recon - Amount Diff | X |
| M | | Recon - Amount Same | |
| N | | Recon - Amount Diff | |

FIG. 32

|    | Log File  | RR Trans       | Action to update RR file   |
|----|-----------|----------------|----------------------------|
| 1  | B         | F              | Write to RR Trans          |
| 2  | B         | B              | Ignore Log file Trans      |
| 3  | B         | G,H,I,J,K,L,M,N| Ignore Log file Trans      |
| 4  | C         | F              | Write to RR per buy standards |
| 5  | C         | B              | Write to RR per buy standards |
| 6  | C         | G              | Ignore Log file Trans      |
| 7  | C         | H              | Rewrite J with C?          |
| 8  | C         | I              | Ignore Log file Trans      |
| 9  | C         | J              | Rewrite J with C?          |
| 10 | C         | K              | Ignore Log file Trans      |
| 11 | C         | L              | ???                        |
| 12 | C         | M              | Ignore Log file Trans      |
| 13 | C         | N              | Write to RR Trans          |
| 14 | D         | F              | Write & Buy                |
| 15 | D         | B              | Rewrite & Buy B with D     |
| 16 | D         | G,H,I,J,K,L,M,N| Write & Buy                |
| 17 | E         | F              | Write & Buy                |
| 18 | E         | B              | Rewrite & Buy              |
| 19 | E         | G              | Ignore Log file Trans      |
| 20 | E         | H              | ???                        |
| 21 | E         | I              | Ignore Log file Trans      |
| 22 | E         | J              | Rewrite J$ with E$ ?       |
| 23 | E         | K,M            | Ignore Log file Trans      |
| 24 | E         | L,N            | ???                        |
|    | Reversals |                |                            |
| 25 | A         | All Cases      | Ignore Log file Trans      |
| 28 | B         | $F_r$,C        | Write B                    |
| 29 | B         | $F_c$          | Ignore Log file Trans      |
| 30 | B         | $B_r$,C        | Ignore Log file Trans      |
| 31 | B         | $B_c$          | Write B                    |
| 32 | B         | G              | Write B                    |
| 33 | B         | G&R            | Ignore Log file Trans      |
| 34 | B         | G&Br           | Ignore Log file Trans      |
| 35 | B         | I              | Write B                    |
| 36 | B         | I&R            | Ignore Log file Trans      |
| 37 | B         | I&Br           | Ignore Log file Trans      |
| 38 | B         | K              | Write B                    |
| 39 | B         | K&R            | Ignore Log file Trans      |
| 40 | B         | K&$B_r$        | Ignore Log file Trans      |
| 41 | B         | M              | Write B                    |
| 42 | B         | M&R            | Ignore Log file Trans      |
| 43 | B         | M&$B_r$        | Ignore Log file Trans      |
| 44 | C         | $F_r$,C        | Write Reversal             |
| 45 | C         | $F_c$          | Write Reversal             |
| 46 | C         | $B_r$,C        | Write Reversal             |
| 47 | C         | $B_c$          | Write Reversal             |
| 48 | C         | G              | Write Reversal             |

FIG. 32A

|    | Log File | RR Trans | Action to update RR file |
|----|----------|----------|--------------------------|
| 49 | C | G&R | Ignore Log file Trans |
| 50 | C | I | Write Reversal |
| 51 | C | I&R | Ignore Log file Trans |
| 52 | C | K | Write Reversal |
| 53 | C | K&R | Ignore Log file Trans |
| 54 | C | M | Write Reversal |
| 55 | C | M&R | Ignore Log file Trans |
| 56 | D | $F_r C$ | Write Reversal |
| 57 | D | $F_c$ | Write Reversal |
| 58 | D | $B_r C$ | Overwrite timeout Reversal |
| 59 | D | $B_c$ | Write Reversal |
| 60 | D | G | Write Reversal |
| 61 | D | G&R | Write Reversal |
| 62 | D | I | Write Reversal |
| 63 | D | I&R | Write Reversal |
| 64 | D | K | Write Reversal |
| 65 | D | K&R | Write Reversal |
| 66 | D | M | Write Reversal |
| 67 | D | M&R | Write Reversal |
| 68 | E | $F_r C$ | Write Reversal |
| 69 | E | $F_c$ | Write Reversal |
| 70 | E | $B_r C$ | Overwrite timeout Reversal |
| 71 | E | $B_c$ | Write Reversal |
| 72 | E | G | Write Reversal |
| 73 | E | G&R | Ignore Log file Trans |
| 74 | E | I | Write Reversal |
| 75 | E | I&R | Ignore Log file Trans |
| 76 | E | K | Write Reversal |
| 77 | E | K&R | Ignore Log file Trans |
| 78 | E | M | Write Reversal |
| 79 | E | M&R | Ignore Log file Trans |

FIG. 33

| Provider (Store, Region, Chain, Group) Profile |
|---|
| 1. Account Type (Store, Region, Chain, Group) |
| 2. NABP/Provider Number (Store, Region, Chain, Group) |
| 3. Provider Name |
| 4. Address |
| 5. Phone/Fax Number (s) |
| 6. Contact Information[1] (3) |
| 7. Contract Dates (Date of Execution & Expiration) |
| 8. Payment Offset Conditions |
| 9. Negative Balance |
| 10. PFI or NDC Sales Contact ID |
| 11. First Buy Date |
| 12. Active/Inactive Indicator |
| 13. Cutoff Cycle (future use) |
| 14. Decline/Suspension Flags |
| 15. Decline Warning Date |
| 16. Remit To Indicator (Group, Region, Chain or Store) |
| 17. Bank Name, Address, Phone & Fax#s |
| 18. ABA and Bank Account Number |
| 19. Average Daily Claims (Total & Purchased $) |
| 20. Average Daily Claims (Total & Purchased #) |
| 21. Year-to-Date # and $ Amount of Claims Purchased |
| 22. Status Code (Monitor/Audit Status) |
| 23. Federal Employer ID # |
| 24. Report Types & Media Indicators (3) |
| 25. Discount Rates (2) and History (Dates & Rates) |
| 26. Local Time Information |
| 27. VAR Name, Address, Phone & Fax#s |
| 28. Medicaid ID # and Information |
| 29. Last Inquiry Date |
| 30. Last Bulletin Read |
| 31. Payor/Obligor/Plan Links |
| 32. Store/Region/Chain/Group Links |
| 33. Future expansion |

FIG. 34

| Payor (Payor/Obligor/Processor) Profile |
|---|
| 1. Type (Payor/Obligor/Processor ) |
| 2. ID (Bin/Obligor) Number |
| 3. Processor Number |
| 4. Name |
| 5. Address |
| 6. Phone/Fax Number(s) |
| 7. Contact Information[1] (3) |
| 8. Contract Dates/terms |
| 9. Live Date |
| 10. Active/Inactive Indicator |
| 11. Rule-off Cycle Table |
| 12. R/A Receipt Business Delay Days |
| 13. Payment Receipt Business Delay Days |
| 14. Credit Information |
| 15. Remittance Advice & Invoice Media & Format |
| 16. Payment Performance[2] |
| 17. Average Daily Claims (Total & Purchased $) |
| 18. Average Daily Claims (Total & Purchased #) |
| 19. Open Balance |
| 20. Bank Name, Number & Account Number, etc. |
| 21. Remit To: (Bank Lock Box Name, A/C#) |
| 22. Fees (Future Use) |
| 23. Decline Warning Date |
| 24. Buy/Decline Status |
| 25. Industry Classification |
| 26. Local Time Information |
| 27. Provider Links |
| 28. Plan Links |
| 29. Payor/Obligor/Processor Links |

FIG. 35

| INFORMATION | PROC. | PAYOR | OBLIGOR | PLAN | PROVIDER | RD. | WR. |
|---|---|---|---|---|---|---|---|
| TYPE | X | X | X | X | X | A | B |
| ID # | BIN | BIN | OBLIGOR | PLAN | (NOTE4) | A | D |
| PROCESSOR# | X | | | | | A | B |
| NAME | X | X | X | X | X | A | B |
| ADDRESS | X | X | X | | X | A | B |
| PHONE/FAX # | X | X | X | | X | A | B |
| CONTACT INFORMATION (3) (NOTE 1) | X | X | X | X | X | A | B |
| CONTACT DATE/TERMS | X | X | X | X | X | A | D |
| PFI/NDC SALES CONTACT ID | | | | | X | A | B |
| FIRST BUY/LIVE DATE | X | X | X | X | X | A | B |
| ACTIVE/INACTIVE | X | X | X | X | X | A | D |
| RULE-OFF CYCLE TABLE/(CUT-OFF CYCLE, FUTURE USE) | X | X | X | X | | F | G |
| R/A RECEIPT BUSINESS DELAY DAYS | X | X | | | | F | F |
| PAYMENT RECEIPT BUSINESS DELAY DAYS | | X | | | | G | G |
| CREDIT INFORMATION (NOTE 2) | | X | X | X | | G | G |
| RECONCILIATION & INVOICE FORMAT & MEDIA | X | X | | | | F | F |
| PAYMENT PERFORMANCE (NOTE 3) | | X | X | X | | F | H |
| AVERAGE DAILY CLAIMS (TOTAL & PURCHASED $) | | X | X | X | X | A | H |
| AVERAGE DAILY CLAIMS (TOTAL & PURCHASED #) | | X | X | X | X | A | H |
| OPEN BALANCE | | X | | | | F | H |
| PAYOR BANK NAME, NUMBER, & ACCT #, ETC. | | X | | | | F | G |
| PROVIDER BANK NAME, NUMBER, & ACCT #, PHONE/FAX | | | | | X | A | D |
| REMIT TO LOCK BOX BANK NAME, ACCT #, PHONE/FAX | | X | | | | F | G |
| FEES (FUTURE USE) | | | | | | | |
| DECLINE WARNING DATE | X | X | X | X | X | A | F |
| BUY/DECLINE STATUS | X | X | X | X | X | A | G |
| INDUSTRY CLASSIFICATION | | X | X | | | F | F |
| PAYMENT OFFSET CONDITIONS | | | | | X | A | G |
| NEGATIVE BALANCE | | | | | X | A | H |
| REMIT TO INDICATOR (GROUP, CHAIN, REGION, STORE) | | | | | X | A | B |
| YEAR-TO-DATE # AND $ AMOUNT OF CLAIMS PURCHASED | | | | | X | A | H |
| STATUS CODE (MONITOR/AUDIT STATUS) | | | | | X | A | G |
| FEDERAL EMPLOYER ID # | | | | | X | A | B |
| REPORT TYPES & MEDIA INDICATORS | | | | | X | A | B |
| DISCOUNT RATES(2) AND HISTORY (DATES & RATES) | | | | | X | A | G |
| LOCAL TIME INFORMATION | X | X | X | X | X | A | B |
| VAR NAME, ADDRESS, PHONE & FAX #S | | | | | X | A | B |
| MEDICAID ID# AND INFORMATION (NOTE 9) | | | | | X | A | B |
| LAST INQUIRY DATE | | | | | X | A | H |
| LAST BULLETIN READ | | | | | X | A | H |
| LINKS TO PROCESSOR (NOTE 10) | | X | | | X | A | H |
| LINKS TO PAYOR (NOTE 10) | X | | X | X | X | A | H |
| LINKS TO OBLIGOR (note 10) | | X | | X | X | A | H |
| LINKS TO PLAN (NOTE 10) | | X | X | | X | A | H |
| LINKS TO PROVIDER (NOTE 10) | X | X | X | X | (NOTE6) | A | H |

FIG. 36

PROCESSOR ACTIVITY SUMMARY AND DETAIL

FOR: PROCESSOR NAME BIN#: 123456

| Date | RX # | Group # | Plan Name | Code | Amount |
|---|---|---|---|---|---|
| | | CLAIMS PURCHASED | # = | 123 | 1234.56 |
| | DISCOUNT FEES | | | | |
| | CREDITS AND ADJUSTMENTS DETAIL | | | | |
| Sep-02 | Fees | 5678 | Plan 3 | PAP | 1,234.56 |
| Sep-07 | 2134657 | 6789 | Plan 4 | AUD | -1,234.56 |
| Sep-12 | 2134658 | 4523 | Plan 1 | PAP | 1,234.56 |
| Sep-17 | 2134757 | 3421 | Plan 2 | PAP | 1,234.56 |
| Sep-22 | 2134888 | 6766 | Plan 7 | AUD | -1,234.56 |
| | CREDITS AND ADJUSTMENTS' TOTAL | | # = | 5 | $1,234.56 |
| | PROCESSOR FEES | | | | $456.79 |
| | CASH DEPOSITED TO YOU | | | | $2,012.33 |
| | CLAIMS NOT PURCHASED DETAIL | | | | |
| Sep-06 | 1234567 | 1234 | Plan 8 | | $1,234.56 |
| Sep-12 | 1234568 | 7890 | Plan 12 | | 1,234.56 |
| Sep-02 | 1234570 | 6789 | Plan 11 | | 1,234.56 |
| Sep-01 | 1234421 | 1234 | Plan 8 | | 1,234.56 |
| Sep-23 | 1234424 | 5789 | Plan 10 | | 1,234.56 |
| Sep-01 | 1234105 | 1234 | Plan 8 | | 1,234.56 |
| Sep-12 | 1234108 | 6789 | Plan 11 | | 1,234.56 |
| Sep-17 | 1234678 | 7890 | Plan 12 | | 1,234.56 |
| | CLAIMS NOT PURCHASED TOTAL | | # = | 8 | 9,876.48 |

FIG. 37

CLAIM DETAIL REPORT

| RX NUMBER | PROCECESSOR NAME | GROUP NUMBER | DATE OF SERVICE | CLAIM AMOUNT | POSTED BY PFI DATE | TIME |
|---|---|---|---|---|---|---|
| 1234567 | PCS | 1234678 | 07/03/93 | $100.00 | 070393 | 110259 |
| 6666666 | PAID | AH12345 | 07/03/93 | $2355.27 | 070393 | 120224 |
| 9999999 | PHS | 132456 | 07/04/93 | $14.10 | 070493 | 101306 |

FIG. 38

DEPOSIT SUMMARY REPORT

Page 1 of 1

| DEPOSIT NUMBER | PUR-CLM AMOUNT | NON-PURC AMOUNT | ADJUST AMOUNT | DISC FEE | TOT NET DEPOSIT | NEG BAL | WIRE XFER | DEPOSIT DATE | TIME |
|---|---|---|---|---|---|---|---|---|---|
| 1234567 | $4899.75 | $459.75 | $0.00 | $97.99 | $4801.76 | | Y | 070393 | 0400 |
| 4567895 | $6250.00 | $1355.10 | $125.00- | $122.50 | $6002.50 | | Y | 070493 | 0400 |

FIG. 39

DAILY ACTIVITY SUMMARY

| Date | Claims Purch # | Claims Purch $ | Discount Fee | Processor Fees | Credits & Adjustment | Deposit | ACH # | Claims Not Purch # | Claims Not Purch $ |
|---|---|---|---|---|---|---|---|---|---|
| Sep-01 | 123 | $1,234.56 | ($123.45) | ($456.79) | $1,234.56 | $1,888.88 | | 123 | $1,234.56 |
| Sep-02 | 123 | 1,234.56 | (123.45) | (456.79) | 1,234.56 | $1,888.88 | | 123 | 1,234.56 |
| Sep-03 | 123 | 1,234.56 | (123.45) | (456.79) | 1,234.56 | $1,888.88 | | 123 | 1,234.56 |
| Sep-04 | 123 | 1,234.56 | (123.45) | (456.79) | 1,234.56 | $1,888.88 | | 123 | 1,234.56 |
| Sep-05 | 123 | 1,234.56 | (123.45) | (456.79) | 1,234.56 | $1,888.88 | | 123 | 1,234.56 |
| Sep-06 | 123 | 1,234.56 | (123.45) | (456.79) | 1,234.56 | $1,888.88 | | 123 | 1,234.56 |
| Sep-07 | 123 | 1,234.56 | (123.45) | (456.79) | 1,234.56 | $1,888.88 | | 123 | 1,234.56 |
| Sep-08 | 123 | 1,234.56 | (123.45) | (456.79) | 1,234.56 | $1,888.88 | | 123 | 1,234.56 |
| Sep-09 | 123 | 1,234.56 | (123.45) | (456.79) | 1,234.56 | $1,888.88 | | 123 | 1,234.56 |
| Sep-10 | 123 | 1,234.56 | (123.45) | (456.79) | 1,234.56 | $1,888.88 | | 123 | 1,234.56 |
| Sep-11 | 123 | 1,234.56 | (123.45) | (456.79) | 1,234.56 | $1,888.88 | | 123 | 1,234.56 |
| Sep-12 | 123 | 1,234.56 | (123.45) | (456.79) | 1,234.56 | $1,888.88 | | 123 | 1,234.56 |
| Sep-13 | 123 | 1,234.56 | (123.45) | (456.79) | 1,234.56 | $1,888.88 | | 123 | 1,234.56 |
| Sep-14 | 123 | 1,234.56 | (123.45) | (456.79) | 1,234.56 | $1,888.88 | | 123 | 1,234.56 |
| Sep-15 | 123 | 1,234.56 | (123.45) | (456.79) | 1,234.56 | $1,888.88 | | 123 | 1,234.56 |
| Sep-16 | 123 | 1,234.56 | (123.45) | (456.79) | 1,234.56 | $1,888.88 | | 123 | 1,234.56 |
| Sep-17 | 123 | 1,234.56 | (123.45) | (456.79) | 1,234.56 | $1,888.88 | | 123 | 1,234.56 |
| Sep-18 | 123 | 1,234.56 | (123.45) | (456.79) | 1,234.56 | $1,888.88 | | 123 | 1,234.56 |
| Sep-19 | 123 | 1,234.56 | (123.45) | (456.79) | 1,234.56 | $1,888.88 | | 123 | 1,234.56 |
| Sep-20 | 123 | 1,234.56 | (123.45) | (456.79) | 1,234.56 | $1,888.88 | | 123 | 1,234.56 |
| Sep-21 | 123 | 1,234.56 | (123.45) | (456.79) | 1,234.56 | $1,888.88 | | 123 | 1,234.56 |
| Sep-22 | 123 | 1,234.56 | (123.45) | (456.79) | 1,234.56 | $1,888.88 | | 123 | 1,234.56 |
| Sep-23 | 123 | 1,234.56 | (123.45) | (456.79) | 1,234.56 | $1,888.88 | | 123 | 1,234.56 |
| Sep-24 | 123 | 1,234.56 | (123.45) | (456.79) | 1,234.56 | $1,888.88 | | 123 | 1,234.56 |
| Sep-25 | 123 | 1,234.56 | (123.45) | (456.79) | 1,234.56 | $1,888.88 | | 123 | 1,234.56 |
| Sep-26 | 123 | 1,234.56 | (123.45) | (456.79) | 1,234.56 | $1,888.88 | | 123 | 1,234.56 |
| Sep-27 | 123 | 1,234.56 | (123.45) | (456.79) | 1,234.56 | $1,888.88 | | 123 | 1,234.56 |
| Sep-28 | 123 | 1,234.56 | (123.45) | (456.79) | 1,234.56 | $1,888.88 | | 123 | 1,234.56 |
| Sep-29 | 123 | 1,234.56 | (123.45) | (456.79) | 1,234.56 | $1,888.88 | | 123 | 1,234.56 |
| Sep-30 | 123 | 1,234.56 | (123.45) | (456.79) | 1,234.56 | $1,888.88 | | 123 | 1,234.56 |

FIG. 40

PROCESSOR ACTIVITY SUMMARY AND DETAIL

FOR: <u>PROCESSOR NAME</u>  BIN#: <u>123456</u>

| Date | RX # | Group # | Plan Name | Code | Amount |
|---|---|---|---|---|---|
| | | CLAIMS PURCHASED | | # = 123 | 1234.56 |
| | | DISCOUNT FEES | | | |
| | | CREDITS AND ADJUSTMENTS DETAIL | | | |
| Sep-02 | Fees | 5678 | Plan 3 | PAP | 1,234.56 |
| Sep-07 | 2134657 | 6789 | Plan 4 | AUD | -1,234.56 |
| Sep-12 | 2134658 | 4523 | Plan 1 | PAP | 1,234.56 |
| Sep-17 | 2134757 | 3421 | Plan 2 | PAP | 1,234.56 |
| Sep-22 | 2134888 | 6766 | Plan 7 | AUD | -1,234.56 |
| | CREDITS AND ADJUSTMENTS' TOTAL | | | # = 5 | $1,234.56 |
| | | PROCESSOR FEES | | | $ 456.79 |
| | | CASH DEPOSITED TO YOU | | | $2,012.33 |
| | | CLAIMS NOT PURCHASED DETAIL | | | |
| Sep-06 | 1234567 | 1234 | Plan 8 | | $1,234.56 |
| Sep-12 | 1234568 | 7890 | Plan 12 | | 1,234.56 |
| Sep-02 | 1234570 | 6789 | Plan 11 | | 1,234.56 |
| Sep-01 | 1234421 | 1234 | Plan 8 | | 1,234.56 |
| Sep-23 | 1234424 | 5789 | Plan 10 | | 1,234.56 |
| Sep-01 | 1234105 | 1234 | Plan 8 | | 1,234.56 |
| Sep-12 | 1234108 | 6789 | Plan 11 | | 1,234.56 |
| Sep-17 | 1234678 | 7890 | Plan 12 | | 1,234.56 |
| | CLAIMS NOT PURCHASED TOTAL | | | # = 8 | 9,876.48 |

FIG. 41

ACTIVITY SUMMARY BY PROCESSOR

| Bin# | Processor | Claims Purchased # | Claims Purchased $ | Discount Fees | Processor Fees | Credits & Adjustments | NET | Avg. Claim | % of Total | Claims Not Purch # | Claims Not Purch $ |
|---|---|---|---|---|---|---|---|---|---|---|---|
| 123456 | Argus | 123 | $1,234.56 | ($123.00) | ($456.79) | $1,234.56 | $1,889.33 | $10.04 | 9.1% | 123 | $1,234.56 |
| 123457 | BC of CA | 123 | 1,234.56 | (123.00) | (456.79) | 1,234.56 | $1,889.33 | 10.04 | 9.1% | 123 | 1,234.56 |
| 123458 | BS of CA | 123 | 1,234.56 | (123.00) | (456.79) | 1,234.56 | $1,889.33 | 10.04 | 9.1% | 123 | 1,234.56 |
| 234567 | Express Scripts | 123 | 1,234.56 | (123.00) | (456.79) | 1,234.56 | $1,889.33 | 10.04 | 9.1% | 123 | 1,234.56 |
| 345678 | MediMet | 123 | 1,234.56 | (123.00) | (456.79) | 1,234.56 | $1,889.33 | 10.04 | 9.1% | 123 | 1,234.56 |
| 456789 | NPA | 123 | 1,234.56 | (123.00) | (456.79) | 1,234.56 | $1,889.33 | 10.04 | 9.1% | 123 | 1,234.56 |
| 567890 | PAID | 123 | 1,234.56 | (123.00) | (456.79) | 1,234.56 | $1,889.33 | 10.04 | 9.1% | 123 | 1,234.56 |
| 678909 | PCA - FL | 123 | 1,234.56 | (123.00) | (456.79) | 1,234.56 | $1,889.33 | 10.04 | 9.1% | 123 | 1,234.56 |
| 789078 | PCS | 123 | 1,234.56 | (123.00) | (456.79) | 1,234.56 | $1,889.33 | 10.04 | 9.1% | 123 | 1,234.56 |
| 890909 | PHS | 123 | 1,234.56 | (123.00) | (456.79) | 1,234.56 | $1,889.33 | 10.04 | 9.1% | 123 | 1,234.56 |
| 988809 | Proserve | 123 | 1,234.56 | (123.00) | (456.79) | 1,234.56 | $1,889.33 | 10.04 | 9.1% | 123 | 1,234.56 |
| | TOTAL | 1353 | $13,580.16 | ($1,353.00) | ($5,024.69) | $13,580.16 | $20,782.63 | $10.04 | 100% | 1353 | $13,580.16 |

TPA/Plan Alerts and Messages
RAPID RxEMITsm is currently declining to purchase claims from the following plans:
Bin#    Processor    Group#    Group Name

FIG. 43

Inputs

1. Daily claims accumulation file
2. Processor/Payor/Plan input
   - 2.1. NCPDP R/A format, either tape or transmission
   - 2.2. Date received
3. Processor/Payor/Plan profile -
4. Prior reconciliation results file:
   - 4.1. NABP #
   - 4.2. Payor/Plan ID #
   - 4.3. Cycle control # - Payor/Plan supplied number if provided or last date of cycle
   - 4.4. Error code
     - 4.4.1. Non match - item on R/A., not on claims file
     - 4.4.2. Non match - item on claims file, not on R/A
     - 4.4.3. Match with amount difference
     - 4.4.4. Adjustment due from Payor/Plan
     - 4.4.5. Lock box payment and R/A amount differ
   - 4.5. Item source code
     - 4.5.1. R/A file
     - 4.5.2. Claims file
     - 4.5.3. Unresolved reconciliation items file
     - 4.5.4. Lock box
   - 4.6 (Reserved for future use)
   - 4.7. Date of Fill (service)
   - 4.8. ℞ number
   - 4.9. Patient ID #
   - 4.10. Claim amount approved on line (Payor/Plan total if a lock box source code)
   - 4.11. Claim amount received per R/A (Payor/Plan total if a lock box source code)
   - 4.12. Amount difference (Amount approved on line minus amount received per R/A)
   - 4.13. Transaction date
   - 4.14. Transaction time of response from Processor at NDC
   - 4.15 Cleared code
     - 4.15.1. Appeared on succeeding cycle
     - 4.15.2. Repaid to Payor/Plan
     - 4.15.3. Payor/Plan paid
     - 4.15.4. Write off
   - 4.16. Cleared date
5. Lock box data transmission from PFI
   - 5.1. Payor name
   - 5.2. Amount
   - 5.3. Date received
   - 5.4. Cycle control #
   - 5.5. BIN #/Payor#

FIG.44

Outputs
1. Notices of payment amounts and R/As due with dates by Payor/Plan
   - 1.1. Payor/Plan name
   - 1.2. Payor/Plan ID number
   - 1.3. Inclusive cycle dates
   - 1.4. Cycle control # - Payor supplied number or last day of the cycle.
   - 1.5. Due dates
     - 1.5.1. Payment due date
     - 1.5.2. R/A due date
   - 1.6. Amounts due by pharmacy:
     - 1.6.1. NABP #
     - 1.6.2. Number of transactions (all approved, purchased and non purchased, on-line transaction in cycle)
     - 1.6.3. Amount due (sum of all approved, purchased and not purchased on-line transactions in cycle)
   - 1.7. Total due from Payor/Plan
2. Notices of amounts and R/As received with dates of receipts and amounts and R/As due but not received
   - 2.1. Payor/Plan name
   - 2.2. Payor/Plan ID number
   - 2.3. Inclusive cycle dates
   - 2.4. Cycle control #
   - 2.5. Payment Due date
   - 2.6 Payment receipt date
   - 2.7. Days since last payment
   - 2.8. Dollar-Days late (sum of the products of each cycle amount due and the number of days each cycle payment is late). This indicator should be a running twelve month calculation.
   - 2.9 Total days payment late in last 90 days
   - 2.10 Payment performance characterization - free form (from Payor/Plan profile)
   - 2.11. Amounts due from each payor & total
   - 2.12. Amounts received (zero, if no receipts) from each Payor/Plan & total
   - 2.13. Amount differences from each Payor/Plan & total
   - 2.14. R/A due date
   - 2.15. R/A received date
   - 2.16. Total days R/A late in last 90 days.
   - 2.17. Number of cycles with unreconciled items (open invoices)
   - 2.18. Percent of cycle payments late (number of cycle payments late in most recent 90 days divided by total number of cycles in most recent 90 days)
3. Updates to Payor/Plan profile
   - 3.1 Total days payment late in most recent 90 days
   - 3.2. Days since last payment
   - 3.3. Dollar-Days late
   - 3.4. Total days R/A late in most recent 90 days
   - 3.5. Number of cycles with unreconciled items (open invoices)
   - 3.6. Percent of cycle payments late (number of cycle payments late in most recent 90 days divided by total number of cycles in most recent 90 days)

FIG.44A

4. Updated reconciliation results file (see Prior reconciliation results file at 4. above)
5. Provider adjustment to daily ACH file
6. Payor/Plan Invoice and Reconciliation Report, Notices of adjustments, Lock box errors, and Reconciliation items
   - 6.1. Adjustments - Invoices
     - 6.1.1. Payor/Plan name
     - 6.1.2. Payor/Plan ID number
     - 6.1.3. Cycle control #
     - 6.1.4. Adjustment data per the NCPDP adjustment standard
   - 6.2 Payment-R/A discrepancies
     - 6.2.1. Payor/Plan name
     - 6.2.2. Payor/Plan ID number
     - 6.2.3. Cycle control number
     - 6.2.4. Receipt date
     - 6.2.5. Amount received
     - 6.2.6. R/A receipt date
     - 6.2.7. Amount on R/A
     - 6.2.8. Amount due from/(to) Payor/Plan (Amount due minus amount received)
   - 6.3 Reconciliation items
     - 6.3.1. NABP #
     - 6.3.2. Payor/Plan ID #
     - 6.3.3. Cycle control #
     - 6.3.4. Error code
       - 6.3.4.1. Non match - item on R/A., not on claims file
       - 6.3.4.2. Non match - item on claims file, not on R/A
       - 6.3.4.3. Match with amount difference
       - 6.3.4.4. Adjustment due from Payor/Plan
       - 6.3.4.5. Lock box payment and R/A amount differ
     - 6.3.5. Item source code
       - 6.3.5.1. Payor/Plan R/A file
       - 6.3.5.2. Claims file
       - 6.3.5.3. Unresolved reconciliation items file
       - 6.3.5.4. Lock box
       - 6.3.5.5. PFI adjustment
     - 6.3.6. Date of service (fill)
     - 6.3.7. Rx number
     - 6.3.8 National Drug Code (NDC code)
     - 6.3.9. Patient ID #
     - 6.3.10. Sex code
     - 6.3.11. Person code
     - 6.3.12. Birth Date
     - 6.3.13. Group #
     - 6.3.14. Claim amount approved on line (Payor/Plan total if a lock box source code)
     - 6.3.15. Claim amount received per R/A (Payor/Plan total if a lock box source code)
     - 6.3.16. Amount difference (Amount approved on line minus amount received per R/A)
     - 6.3.17. Transaction date
     - 6.3.18 Transaction time of Response from Processor at NDC
     - 6.3.20. TPA authorization number.
7. PFI Management reports-consolidation of all other reports above.

FIG. 45

INVOICE

Payor/Plan: Contact (Individual)
Name (company)
Address 1
Address 2

Date :

TERMS: DUE ON RECEIPT

| CYCLE END DATE | CYCLE CONTROL NO | NABP NUMBER | TRANSACTION DATE | DATE OF SERVICE | PRESCRIPTION NUMBER | PATIENT ID | AMOUNT | TPA AUTH. CODE | TPA ADJUST. CODE | EXPLANATION |
|---|---|---|---|---|---|---|---|---|---|---|
| 1. ADJUSTMENTS INCORRECTLY CHARGED TO PROVIDERS: | | | | | | | | | | |
| | | | PROVIDER TOTAL | | | | $ | | | |
| | | | PROVIDER TOTAL | | | | $ | | | |
| | | | CYCLE TOTAL | | | | $ | | | |
| TOTAL INCORRECT ADJUSTMENTS | | | | | | | $ | | | |
| 2. CLAIMS APPROVED ON-LINE DURING CYCLE NOT INCLUDED IN PAYMENT: | | | | | | | | | | |
| | | | PROVIDER TOTAL | | | | $ | | | |
| | | | PROVIDER TOTAL | | | | $ | | | |
| | | | CYCLE TOTAL | | | | $ | | | |
| TOTAL MISSING CLAIMS | | | | | | | $ | | | |
| 3. CLAIMS PAID FOR LESS THAN AMOUNT APPROVED ON-LINE DURING CYCLE: | | | | | | | | | | |
| | | | PROVIDER TOTAL | | | | $ | | | |
| | | | PROVIDER TOTAL | | | | $ | | | |

Payor/Plan: Contact (Individual)
Name (company)
Address 1
Address 2

INVOICE

Date :

TERMS: DUE ON RECEIPT

| CYCLE END DATE | CYCLE CONTROL NO. | NABP NUMBER | TRANSACTION DATE | DATE OF SERVICE | PRESCRIPTION NUMBER | PATIENT ID | AMOUNT | TPA AUTH. CODE | TPA ADJUST CODE | EXPLANATION |
|---|---|---|---|---|---|---|---|---|---|---|
| | | | CYCLE TOTAL | | | | $ | | | |
| TOTAL UNDERPAID CLAIMS | | | | | | | $ | | | |
| 4. OTHER ITEMS DUE: | | | | | | | | | | PAYMENT LESS THAN REMITTANCE ADVICE |
| | | | | | | | | | | |
| | | | CYCLE TOTAL | | | | $ | | | |
| TOTAL OTHER ITEMS DUE: | | | | | | | $ | | | |
| GRAND TOTAL DUE | | | | | | | $ | | | |

Payor Reconciliation Report

Payor/Plan: Contact (individual)
Name (company)
Address 1
Address 2

Date :

| CYCLE END DATE | CYCLE CONTROL NO | NABP NUMBER | TRANSACTION DATE | DATE OF SERVICE | PRESCRIPTION NUMBER | PATIENT ID | AMOUNT | TPA AUTH. CODE | TPA ADJUST CODE | EXPLANATION |
|---|---|---|---|---|---|---|---|---|---|---|
| 1. CREDIT ADJUSTMENTS INCORRECTLY PAID TO PROVIDERS: | | | | | | | | | | |
| | | | PROVIDER TOTAL | | | | $ | | | |
| | | | PROVIDER TOTAL | | | | $ | | | |
| | | | CYCLE TOTAL | | | | $ | | | |
| | | | TOTAL INCORRECT CREDIT ADJUSTMENTS | | | | $ | | | |
| 2. CLAIMS INCLUDED IN PAYMENT NOT APPROVED ON-LINE DURING CYCLE: | | | | | | | | | | |
| | | | PROVIDER TOTAL | | | | $ | | | |
| | | | PROVIDER TOTAL | | | | $ | | | |
| | | | CYCLE TOTAL | | | | $ | | | |
| | | | TOTAL CLAIMS PAID NOT APPROVED ON-LINE | | | | $ | | | |
| 3. CLAIMS PAID FOR MORE THAN APPROVED ON-LINE DURING CYCLE: | | | | | | | | | | |
| | | | PROVIDER TOTAL | | | | $ | | | |
| | | | PROVIDER TOTAL | | | | $ | | | |

Payor Reconciliation Report

Date :

Payor/Plan: Contact (Individual)
Name (company)
Address 1
Address 2

| CYCLE END DATE | CYCLE CONTROL NO | NABP NUMBER | TRANSACTION DATE | DATE OF SERVICE | PRESCRIPTION NUMBER | PATIENT ID | AMOUNT | TPA AUTH. CODE | TPA ADJUST CODE | EXPLANATION |
|---|---|---|---|---|---|---|---|---|---|---|
| | | | CYCLE TOTAL | | | | $ | | | |
| TOTAL OVERPAID CLAIMS | | | | | | | $ | | | |
| OTHER ITEMS: | | | | | | | | | | |
| | | | | | | | | | | PAYMENT MORE THAN REMITTANCE ADVICE |
| | | | CYCLE TOTAL | | | | $ | | | |
| TOTAL OTHER ITEMS | | | | | | | $ | | | |
| GRAND TOTAL OVERPAYMENTS | | | | | | | $ | | | |

Adjustments Handling in Reconciliation

| ADJUSTMENT TYPE | INITIATED BY | RESPONSI-BILITY | AFFECTS RECONCILIATION EXCEPTNS FILE | AFFECTS PAYOR INVOICE/ RECON REPORT | HOW CLEARED(1) | AFFECTS DAILY SUMMARY | AFFECTS ACH TRANSFER | AFFECTS MONTHLY PROV STMT | NOTES |
|---|---|---|---|---|---|---|---|---|---|
| INDIVIDUAL CLAIMS, PLAN RELATED | | | | | | | | | |
| PATIENT INELIGIBLE | PAYOR | PAYOR | X | X | SUBSEQUENT PAYOR ADJ | | | | |
| DRUG NOT COVERED | PAYOR | PAYOR | X | X | SUBSEQUENT PAYOR ADJ | | | | |
| EXCEEDS PLAN LIMITS | PAYOR | PAYOR | X | X | SUBSEQUENT PAYOR ADJ | | | | |
| INGREDIENT COST | PAYOR | PAYOR | X | X | SUBSEQUENT PAYOR ADJ | | | | |
| DISPENSING FEE | PAYOR | PAYOR | X | X | SUBSEQUENT PAYOR ADJ | | | | |
| COPAYMENT | PAYOR | PAYOR | X | X | SUBSEQUENT PAYOR ADJ | | | | |
| SALES TAX | PAYOR | PAYOR | X | X | SUBSEQUENT PAYOR ADJ | | | | |
| REVERSAL BY PAYOR | PAYOR | PHARMACY | X | | ACH DEC/NEG BAL INC | X | X | X | |
| REVERSAL BY PHARMACY OUT OF PERIOD | PHARMACY | PHARMACY | X | | ACH DEC/NEG BAL INC | X | X | X | |
| FEES | | | | | | | | | |
| SHIPPING FEE | PAYOR | PHARMACY | X | | ACH DEC/NEG BAL INC | X | X | X | |
| RESEARCH FEE | PAYOR | PHARMACY | X | | ACH DEC/NEG BAL INC | X | X | X | |
| TRANSACTION FEE | PAYOR | PHARMACY | X | | ACH DEC/NEG BAL INC | X | X | X | |
| MEMBERSHIP FEE | PAYOR | PHARMACY | X | | ACH DEC/NEG BAL INC | X | X | X | |
| EQUIPMENT FEE | PAYOR | PHARMACY | X | | ACH DEC/NEG BAL INC | X | X | X | |
| OTHER FEES | PAYOR | PHARMACY | X | | ACH DEC/NEG BAL INC | X | X | X | |
| OTHER | | | | | | | | | |
| PHARMACY AUDIT | PAYOR | PHARMACY | X | | ACH DEC/NEG BAL INC OR DEC | X | X | X | |
| PAID TO WRONG PHARMACY | PAYOR | PHARMACY | X | | ACH DEC/NEG BAL INC OR DEC | X | X | X | |
| EFT CORRECTION | PAYOR | PHARMACY | X | | ACH DEC/NEG BAL INC OR DEC | X | X | X | |
| MISC. CHARGE BACK | PAYOR | PAYOR | X | X | SUBSEQUENT PAYOR ADJ | | | | |
| CORRECTION OF PREVIOUS ADJ TO PAYOR | PAYOR | PAYOR | X | X | SUBSEQUENT PAYOR ADJ | | | | |
| CORRECTION OF PREVIOUS ADJ TO PHARMACY | PAYOR | PHARMACY | X | | ACH/NEG BAL INC OR DEC | X | X | X | |
| PFI ADJUSTMENTS | | | | | | | | | |
| ACH CORRECTION | PFI | PHARMACY | X | | ACH/REG. BAL INC. OR DEC. | X | X | | |
| PFI DISCOUNT CORRECTION | PFI | PHARMACY | X | | ACH/REG. BAL INC. OR DEC. | X | X | | |
| NEG BALANCE CLEARED OFF LINE BY PHARMACY | PFI | PFI | X | | NEG BAL DEC | X | | | |
| RECON ITEM CLEARED OFF LINE BY PAYOR | PFI | PFI | X | | | | | | |
| RECON ITEM CLEARED BY WRITE OFF | PFI | PFI | X | X | | | | | |
| ACH TRANSFER OFF LINE (2) | PFI | PHARMACY | X | | ACH DEC OR NEG BAL INC | | X | X | REDUCES AMT DUE |
| ACH DELETE OFF LINE | PFI | PHARMACY | X | | ACH INC OR NEG BAL DEC | | X | X | INCREASES AMT DUE |

FIG. 49

| A RATING CATEGORY | B WEIGHTS 0.5 S&P | C 0.5 MOODY'S | D 0.375 FITCH | E 0.25 DUFF | F 0.25 AM BEST | G 0.0625 WEISS | H 0.0625 D&B | I PERF IND(1) | J CREDITS WORTH IN ESS. SCORES |
|---|---|---|---|---|---|---|---|---|---|
| 20 | AAA | Aaa | AAA | AAA | N/A | N/A |  | 0 | 60.00 |
| 19 | AA+ | Aa1 | AA+ | AA+ | A++ | A+ |  | 5 | 57.00 |
| 18 | AA | Aa2 | AA | AA | A+ | A |  | 10 | 54.00 |
| 17 | AA- | Aa3 | AA- | AA- | A | A- |  | 15 | 51.00 |
| 16 | A+ | A1 | A+ | A+ | A- | N/A |  | 20 | 48.00 |
| 15 | A | A2 | A | A | N/A | N/A |  | 25 | 45.00 | TOP 25%
| 14 | A- | A3 | A- | A- | B++ | B+ |  | 30 | 42.00 |
| 13 | BBB+ | Baa1 | BBB+ | BBB+ | B+ | B |  | 35 | 39.00 |
| 12 | BBB | Baa2 | BBB | BBB | B | B- |  | 40 | 36.00 |
| 11 | BBB- | Baa3 | BBB- | BBB- | B- | N/A |  | 45 | 33.00 |
| 10 | BB+ | Ba1 | BB+ | BB+ | N/A | N/A |  | 50 | 30.00 | MID RANGE
| 9 | BB | Ba2 | BB | BB | C++ | C+ |  | 55 | 27.00 |
| 8 | BB- | Ba3 | BB- | BB- | C+ | C |  | 60 | 24.00 |
| 7 | B+ | B1 | B+ | B+ | C | C- |  | 65 | 21.00 |
| 6 | B | B2 | B | B | C- | N/A |  | 70 | 18.00 |
| 5 | B- | B3 | B- | B- | N/A | N/A |  | 75 | 15.00 |
| 4 | CCC+ | Caa1 | CCC+ | CCC+ | D | D |  | 80 | 12.00 |
| 3 | CCC | Caa2 | CCC | CCC | E | E |  | 85 | 9.00 |
| 2 | CCC- | Caa3 | CCC- | CCC- | N/A | N/A |  | 90 | 6.00 |
| 1 | NR | NR | NR | NR | NR | NR |  | 95 | 3.00 |
| 0 | D | D | D | D | F | F |  | 100 | 0.00 |

COMPUTERIZED HEALTHCARE ACCOUNTS RECEIVABLE PURCHASING COLLECTIONS SECURITIZATION AND MANAGEMENT SYSTEM

TABLE OF CONTENTS

I. BACKGROUND OF THE INVENTION
  A. Field of the Invention
  B. Description of the Related Art
    1. Participants in On-line Processing
    2. Processing the Claim
    3. Problems With the Current System
II. SUMMARY OF THE INVENTION
  A. Major Components of CHARMS
    1. Message Switching and Customer Service
    2. Evaluation of Service Provider Portfolios
    3. Creditworthiness Scoring and Payor and Obligor Selection
    4. Transaction Processing
    5. Funds Collection
    6. Funds Management and Reconciliation
    7. Receivables Securitization
  B. Objects of the Present Invention
III. BRIEF DESCRIPTION OF THE DRAWINGS
IV. DETAILED DESCRIPTION OF THE INVENTION
  A. Periodic System Functions
    1. Provider Profiles
    2. Help Desk Subsystem
    3. Provider On-Line Inquiries
    4. Electronic Bulletin Board
    5. Provider Reports
    6. Payor, Obligor, Processor and Plan Profiles
    7. Database Design
    8. Creditworthiness Scoring System
    9. Payor Services Procedures
  B. CHARMS Claims Processing Procedures
    1. Transaction Capture
    2. Buy/Decline Decision Processing
    3. Daily Summarization a. Daily Summarization Processing b. ACH and Wire Transfers c. Average Daily Activity Alert Procedures
    4. Reconciliation and Collection Processes a. Reconciliation Processing b. Reconciliation Timing and Disposition c. Collection Procedure
    5. Securitization System
V. CLAIMS
ABSTRACT A portion of the disclosure of this patent document contains material which is subject to copyright protection. The copyright owner has no objection to the facsimile reproduction by anyone of the patent disclosure, as it appears in the Patent and Trademark Office public patent files or records, but otherwise reserves all copyright rights whatsoever.

BACKGROUND OF THE INVENTION

A. Field of the Invention

The present invention relates to a computerized method and system for financing health care service providers, especially pharmacies, by evaluating and purchasing their accounts receivable, rating the creditworthiness of payors and obligors such as insurance companies, self-insured employers, health maintenance organizations, preferred provider organizations, government agencies, and other entities sponsoring groups and individuals receiving health care benefits, collecting on receivables, securitizing receivables, managing funds, and processing and reconciling claims and payments (Computerized Healthcare Accounts Receivable Management System or CHARMS). See FIGS. 1 and 11.

Description of the Related Art

The health care industry represents one of the single largest expenditures in the United States today, accounting for 14% of the nation's gross domestic product. This large percentage encompasses hospital, doctor and pharmaceutical payments as well as other medical related expenses.

The health care industry is primarily insurance based, and service providers such as hospitals, doctors and pharmacies ultimately rely on the credit of the insurers to satisfy most financial obligations. Two basic insurance systems are currently in operation: the indemnity system in which patients are required to make payment to service providers and then claim and collect from insurers; and the third party payment system in which service providers look directly to insurers or other obligors for primary payment, in addition to collecting optional co-payments directly from patients.

The pharmaceutical industry is primarily a third party payment system. Pharmacies must therefore rely on the payment practices and creditworthiness of the payors and obligors to collect for services provided to customers by a third party payment plan. Although recent improvements in the claims processing system for the pharmaceutical industry, including the introduction of electronic, on-line adjudication (discussed in detail below), have added significant reliability to the payment system, the time lag between submission of a claim and receipt of payment has an adverse effect on pharmacies' cash flows. Moreover, pharmacies are relatively powerless in the claims/payment process in that, after having submitted the claim for adjudication, they can do little more than wait for their money. One aspect of the present invention addresses this problem by offering pharmacies relatively rapid payments for certain of their accounts receivable.

1. Participants in On-line Processing

In recent years, the pharmaceutical industry's claim processing system has been completely reformed, having shifted from a variety of paper-based forms to a uniform claim form and then in 1986 to an electronic on-line system. Now, on-line adjudication of the validity of claims is possible for almost all pharmacies, regardless of size. More than 400 million claims transactions (66% of the 600 million total annual transactions) were processed through the on-line adjudication network in 1991. Pharmaceutical prescription claims processing is thus at the forefront of on-line medical claims processing. With the automation of Medicaid and the continuing automation of service providers, it is likely that almost all claims transactions will be processed electronically within the next three years.

The pharmaceutical claims processing and payment system involves one or more entities providing one or more of a variety of functions which include: service provider; plan sponsor; obligor; administrator; payor; processor; switch; and software supplier, each as described below. See FIG. 2. Importantly, many of the largest industry participants in the claims processing system perform multiple functions such as obligor, payor, administrator, and processor. It is important to understand the functions and/or the combinations of functions these entities provide to be able to recognize the level of detail and analysis that is inherent in correctly managing the on-line processing of health care claims, and to understand that the names applied to entities can sometimes be misleading.

A service provider is an entity that provides health care services. In the case of pharmaceutical services, service providers include independent pharmacies, drug store chains, supermarket combos (pharmacies inside supermarkets), mass volume retailers, and mail order pharmacies.

A plan sponsor is an entity that sponsors the group receiving health care benefits, e.g., operates as an insurance company that collects premiums directly from consumers in return for insurance benefits. The function of a plan sponsor is to gather a group of persons together to be insured. Plan sponsors include commercial insurance companies, health maintenance organizations ("HMOs"), preferred provider organizations ("PPOs"), Blue Cross/Blue Shield entities, affinity groups, unions, government entitlement programs (such as Medicaid), self-insured private and government employers (i.e., employers that take on the direct responsibility and liability for the health care claims of their employees rather than purchasing third-party coverage for such claims from commercial insurers), and private and governmental employers that are not self-insured.

Based on data supplied by the Health Insurance Association of America and the Health Care Financing Administration, the current market mix of plan sponsors is estimated as: 15–30% Medicaid; 55–70% private insurance companies, Blue Cross/Blue Shield entities, HMOs and PPOs; and 15% self-insured employers. Non-governmental plan sponsors currently account for about 95% of transaction volume of the on-line pharmaceutical claims network, with the balance coming from Medicaid. The low volume of government sponsored claims currently processed over the on-line network is primarily due to the delays in the automation of Medicaid claims processing. As the present invention relies to a significant extent on capturing claims on-line, until particular government sponsored claims are processed on-line they are generally not suitable for management by the present invention. However, the inventors expect that substantially all Medicaid claims will be processed over the on-line network by the year 2000.

An obligor is an entity that is generally considered as ultimately responsible for making payment for the health-care services provided on its behalf and for the insurance risk associated with a plan. Plan sponsors may also be obligors, as is the case with self-insured corporations. The current on-line pharmaceutical network recognizes an estimated 3,500 entities as obligors. An obligor may also function as an administrator, as is the case with certain insurance carriers, or as a payor or processor. Most of the obligors recognized by the on-line network utilize separate entities that perform these functions to facilitate their prescription programs.

An administrator, often called a third-party administrator ("TPA"), designs, structures and services prescription plans on behalf of another. A plan is a set of parameters that indicates the eligibility and types of insurance coverage of a particular group of insured persons. TPAs also maintain service provider networks and enroll and contract with pharmacies on behalf of obligors. Some TPAs also provide payment services for obligors. They bill the obligor for approved claims on a regular basis and remit payments to the service provider on behalf of the plan sponsor. TPAs may subcontract certain functions to payors and processors.

A payor is an entity, usually a TPA or obligor, that issues payments to service providers on behalf of obligors. A payor also provides obligors with management reports and sends service providers, along with payment, a remittance advice ("RA"), (i.e., a report outlining which transactions have been handled and positively adjudicated in the indicated processing cycle, along with any adjustments and processing charges) together with the payment. The total indicated on an RA should equal the amount of the payment which it accompanies.

A processor is an entity that provides on-line and paper-based manual adjudication services. A processor's responsibility is to adjudicate claims by applying the plan parameters established by the TPA (i.e., determining the acceptability of a claim based, for example, on a claimant's eligibility, the medication, and price), and then to report the results to the TPA or plan sponsor on a scheduled basis. Each payor selects a standard reimbursement payment cycle, typically 14 or 30 days, during which the processor adjudicates claims submitted over the on-line network by service providers. At the end of each processing cycle, processors "rule-off" the accumulated claims and report the results. They then forward their "experience" tapes for the relevant period, which itemize all of the approved transactions, to each TPA or plan sponsor who reviews the tapes and then makes payments to the service providers. FIG. 3. A processor may also conduct drug utilization reviews ("DUR"). There are a number of authorized sources for DUR information available from pharmaceutical and medical review boards.

The following example serves to illustrate the complex set of relationships between plan sponsors, obligors, TPAs, payors, and processors. A commercial bank, acting as plan sponsor, decides to provide insurance coverage to its employees and arranges for an insurance company to provide that coverage. The insurance company, acting as obligor, administrator, payor, and processor, collects premiums (coverage payments) from the bank, underwrites the actuarial risk associated with the plan, administers the bank's plan, makes payments to the service providers and adjudicates the insurance claims. After several years, the same bank does an actuarial and economic analysis and finds that it would be less costly to underwrite the insurance risk associated with the plan itself. The bank, now acting as a self-insured obligor, lets the agreement with the insurance company expire, and arranges with a TPA directly to administer its employee insurance coverage. For similar reasons, several other employers decide to take the same course of action and become self-insured. The insurance company, concerned with the loss of business, decides to reduce costs and premiums by contracting out some of its administrative functions. It therefore arranges with a TPA to handle its payor and processor functions.

Pharmaceutical Card System, or PCS Health Systems, Inc. ("PCS"), of Scottsdale, Ariz., a subsidiary of McKesson Corporation, of San Francisco, Calif., processes about 20% of the claims in the pharmaceutical industry, and is the largest TPA/processor. It handles the claims of over 27 million individuals for 158 commercial insurers, 700 self-insured employers and 40 Blue Cross/Blue Shield entities.

A switch provides the means for relaying electronic claims data from service providers to processors. Based upon a Bank Identification Number ("BIN"), a unique number issued by the American National Standards Institute which identifies the appropriate processor, the switch forwards messages from the service provider to the processor and returns the responses. In general, a switch does not impact on the content of any of the messages it processes, but is merely a communications conduit.

Switches accept industry standard formatted messages from pharmacies. The three largest switches—National Data Corporation, of Atlanta, Ga. ("NDC"), Envoy Corporation, of Memphis, Tenn., and General Computer Corporation, of Twinsburg, Ohio—process approximately 80% of all on-line transaction volume, with NDC being responsible for 70% of that 80% and being the only switch with access to every major processor.

A large number of companies supply several hundred software packages to service providers for such purposes as automatic inputting and formatting of electronic claims. Although the performance of the competing software systems vary dramatically, the functions they perform and the formats used to transmit third party pharmacy claims are essentiall identical because all electronic messages must conform to the standard electronic message format set by the National Council for Prescription Drug Programs ("NCPDP") of 4201 North 24th Street, Phoenix, Ariz. 85016–6268. NCPDP provides standard formats for many electronically transmitted message formats, including, for example, the following formats which specify field number, field name, field type, field format, and field length positions: (1) transaction format for prescription, which includes fields such as BIN, version number, transaction code, processor code, pharmacy number, group number, cardholder identification number, date of fill, and prescription number; (2) response format for eligibility verification or prescription claim, which includes fields such as BIN, transaction code, response status, and response data; and (3) claim reversal format, which includes fields such BIN, transaction code, processor code, pharmacy identification number, date of fill, and prescription number. Other NCPDP standard message formats include a worker's compensation claim format, a medicaid claim format, a claim payable response format, and a claim captured response format.

The present invention utilizes these NCPDP standard formats in implementing new functionality into the current online claim adjudication network. The applicants refer the reader to the manuals available through NCPDP for a detailed description of the standard message formats, including the NCPDP Telecommunication Standard Format Official Release and the NCPDP Data Dictionary which are hereby incorporated by reference into this disclosure.

2. Processing the Claim

The existing pharmaceutical on-line claims and payment processing network generally operates as follows (see FIGS. 2-3):

After a patient or customer presents a pharmacy with a prescription, the pharmacist utilizes his in-house prescription system and gathers the necessary information about the prescription, the patient, and his insurance coverage. FIG. 13. The pharmacist inputs this information into his personal computer. This information is then transmitted in one of three ways: (a) direct transmission to a high volume obligor; (b) direct transmission to a processor who represents one or more TPAs or plan sponsors (most processors handle input data for a variety of TPAs and plan sponsors); or (c) transmission over the on-line network via switches which direct the outgoing messages to the appropriate processors. See FIGS. 7a, 7b, and 7c.

In response to the pharmacy's claim, an NCPDP formatted adjudication message is then transmitted by the processor receiving the claim back through the same channels to the originating pharmacy, usually within seconds. An adjudication is an evaluation of the validity of a claim by reference to the patient eligibility and formulary rules of a plan, such as drug products allowed, types of permitted drug interactions and dosages, and drug prices which will be reimbursed by the particular plan. The adjudication message normally contains adjudication/authorization information, the unique prescription number and the previously agreed upon price for that prescription. An adjudication message transmitted by a processor indicates the following three items of information about the claim: (i) that it has been received by the processor; (ii) that it has been reviewed by the processor against specifications established by the TPA and agreed upon by the obligor; and (iii) that it has been indicated for disposition in one of three ways: approval, rejection or suspension.

Processors may perform over 50 edits on each claim to insure that the precise parameters of the plan are met. A claim which passes all of the processor's system edits is deemed "approved" and receives "claim payable" status. As explained in detail below, approved claims are subject to subsequent, often inappropriate, payment adjustments by a processor. Claim messages which do not contain all of the required plan parameter inputs in acceptable form are rejected during processor system edits and returned to the service provider with an identification of the plan parameter(s) causing the rejection. These claims may be immediately amended by the service provider and resubmitted for adjudication. Suspended claims are those which the processor neither approves nor rejects but rather holds while it requests additional information from the service provider or pre-approval from the plan sponsor.

Once a service provider receives a positive on-line adjudication response to a claim, it logs the claim as an approved claim receivable, dispenses the drug based on instructions from the doctor and awaits payment from the payor. See FIG. 13. Almost all processors rule-off each pharmacy's account every thirty days using the claim submission date as day one (except for PCS, which operates on a 14 day cycle, and certain other processors, which operate on a 40 day cycle), and payments in the form of checks are usually made to the pharmacy three to five days after rule-off. The checks represent payment for all the approved claims payable for a single pharmacy less a processing fee and/or adjustments.

A review of a number of receivables portfolios by some of the inventors has revealed an average of 35 days for payment to be received by many service providers. Although each portfolio is unique for each pharmacy because each has a different operating plan, it is likely that the overall receivable time frame will not vary significantly because the major TPAs have structured the same program for most or all of their plan sponsors. Thus, even though any given pharmacy could end up with a claim transaction relating to any one of 3,500 obligors that the pharmacy honors, there is much homogeneity due to the uniform nature of the TPAs' plans.

After receiving payment, service providers may attempt to reconcile what they received from the payor with the amounts of the claims approved by the processors. Based on investigations by the inventors, many pharmacies do not bother to reconcile, and, for those that do, if the amount of the payment (the combined total payment from many plans) is within a few hundred dollars of the claimed amount, they usually choose to accept any discrepancy and not reconcile because, as explained below, it may cost them more to precisely reconcile an RA than to accept the discrepancy in the payment.

As explained above, each formatted message and response in the on-line system adheres to standard specifications set by the NCPDP. All responses therefore share a number of common functional traits. Generally, all responses verify a match between the information submitted and the terms of the plans. They also check for drug interactions and appropriate dosage levels. In addition, they provide the price of the prescription based upon the National Drug Code's prescription identification system and the industry standard prices published by companies such as Medispan of Indianapolis, Ind.

3. Problems With the Current System

The existing pharmaceutical claims processing and payment system presents several problems for service providers, including the following: (i) delays in receipt of payment; (ii) difficulty in reconciling accounts and payments; (iii) unilateral adjustments by processors of approved adjudications; (iv) increasing credit risks among payors and obligors; and (v) assorted charges per claims transaction. Each of these problems is explained more fully below and is substantially solved by the present invention.

The first problem for service providers is the delay in receiving payments. As explained above, the processor ruleoff period ranges from 14 to 40 days with an average period of 35 days. Pharmacies of all sizes are suffering from the regular financial problems of being a modern retailer and the compounding impact of increasing costs of pharmaceutical inventories and third party receivables. Small pharmacies have a continuing shortage of cash and have very few alternative funding sources. Large pharmacies, having the debt burdens resulting from the expansion and acquisitions of the 1980's, are cash squeezed and have few opportunities to "bank" their receivables.

Prior to the present invention, pharmacies have almost never been systematically offered the opportunity to finance their accounts. The primary reason for this failure is that those in the industry in a position to offer financing, such as TPAs and processors, have never been motivated to pay pharmacies faster because the plan sponsors whom they represent have no interest in accelerating payments. Only one processor, PCS, ham attempted to offer a financing program in the past. This effort has been relatively unsuccessful, in part because of the large discounts (5% or greater) charged to service providers and because the financing only covered claims processed by PCS. Although some banks offer loan programs to service providers in exchange for their accounts receivable, these programs are inadequate because: (1) the banks require that the loans be fully collateralized; (2) the banks have full recourse against providers in case the payor or obligor fails to pay; and (3) the banks only give providers 30–50% on their accounts receivables. In general, banks lack understanding of the industry and do not have the capability to manage the servicing and evaluation of these special receivables and accordingly hesitate to provide appropriate financing for them to retailers.

In addition to the usual delay by processors, another problem with the current system is that TPAs and obligors often "game the system," making reduced or slow payments. This happens because (i) no entity aggressively polices TPAs and plan sponsors; (ii) service providers do not have the resources to monitor and correlate every payment with every claim; and (iii) some TPAs and obligors have their own cash flow problems.

Another problem faced by service providers under the existing on-line system is the difficulty and expense involved in reconciling claims with payments received. The reconciliation process regularly involves the identification and correction of the following issues: (1) lateness of the check; (2) failure to deliver the check and statement together; (3) failure of the check and statement to match; (4) lack of synchronization between the processing period covered by the check and statement and the processing period in the service provider's files; (5) errors in the statement, such as missing items, wrongly posted items, spurious charges, reversals and items from another period; (6) errors in the service provider's files; and (7) illegitimate post-adjudication adjustments.

The inventors estimate that the average pharmacist dispenses 2,457 prescriptions per month, 43% of which (or 1,056 prescriptions) service patients from 30 different plans, at an overall average value of $23.90 (in 1991) per prescription. The types of instances requiring investigation and/or reconciliation, listed above, occur on average 60 times a month against 1,056 third party claims and 30 different statements. It takes about 15 minutes per item to identify each of the above listed issues and then call, inquire, write, adjust and eventually resolve them each month. Since the going rate for a pharmacist is about $37.00 per hour, including benefits, it would cost a pharmacist about $579 a month to fully reconcile the 1,056 claims—about $.55 per claim, or 2.3% of the pharmacist's monthly activity. According to a recent survey done by Faulkner & Gray to evaluate medical payments, the top 40 pharmacies report an average cost of $.50 per transaction to cover internal efforts that primarily surround reconciliation and collection.

Another problem pharmacies face under the existing on-line processing system is that, as mentioned above, an adjudication response approving a claim is often unilaterally modified later. Errors in payment or miscellaneous charges may result in subsequent payment adjustments by a TPA or plan sponsor. Also, the processor, after the initial adjudication response, may change the dollar amount of the claim based on what it believes is the correct dollar amount for a particular prescription drug. The types of errors or transactions that result in post-adjudication adjustments include the following: (i) lost transactions—apparent duplicate claims that result if a service provider resubmits transactions lost by the telecommunications or processing systems; (ii) payments to the wrong pharmacy; (iii) miscellaneous charges and credits initiated by and related to the processor, including terminal lease fees, telecommunication charges and electronic as opposed to paper submission credits; (iv) manual claim reversals entered by the processor at the service provider's request; and (v) correction of plan parameters in the processor's system resulting in an approved claim being rejected during the processor's end-of-cycle batch processing. Thus, for these reasons, service providers, under the existing on-line system, can not rely on always receiving full payment for approved claims.

Another problem faced by service providers under the existing claims processing and payment system is the increasing credit risk among payors and obligors as a group. This is due primarily to the increasing failure by insurance companies beginning in the late 1980s, and to an increasing proportion of self-insured plan sponsors. Many service providers are not even aware of this increasing credit risk because they do not have a direct relationship with the obligors.

This misconception has become more important as the mix of obligors has changed. Initially, all plans were "insured," that is, obligors were either private insurance companies or governmental agencies. As insurance premiums continued to rise, however, many employers investigated the costs and risks of self-insurance, and there are now a growing number of self-insured plan sponsors. This changes the ultimate credit nature of third party claims because (i) self-insurers do not have to follow the same financial guidelines and regulations as insurance companies; and (ii) although many self-insured plans are administered by insurance companies, the insurance companies do not assume contractual liability for payments under these plans. Therefore, while the processing systems to support third party payments were evolving, the creditworthiness and ability to pay of obligors was changing for the worse. Therefore, there is now a new credit risk that few service providers are aware of, let alone prepared for.

This credit exposure problem has been addressed to some extent, from the perspective of TPAs, by PCS and other TPAs that have begun screening out risky obligors. However, despite the very different credit ratings and payment capabilities of obligors, the on-line claims processing and payment system, by design, does not give service providers the ability to discriminate based upon the creditworthiness of the obligor. Historically, on-line network TPAs have required service providers to accept claims from all of their plans when presented. Only recently has any network allowed its service providers the option not to accept a claim with a pre-specified plan, and some of the newest contracts between pharmacies and TPAs now allow service providers to so identify specific plans they will not service. However, the on-line processing system still does not facilitate this discrimination because the limited resources of most service providers prevents them from properly researching the creditworthiness of obligors.

As the pharmaceutical third party payment system has been evolving, considerable effort has been spent on establishing the infrastructure to improve processing accuracy and timing; however, there has been little or no improvement with respect to adjudication, funding timing and evaluating payor and obligor creditworthiness. In fact, most pharmaceutical retailers (with the exception of their "house accounts", i.e., plans operated by the pharmacies themselves) have never considered issues such as outside funding or actual credit exposure. Even the most diligent of modern retail service providers are not able to adequately establish a prudent reserve for loss because they have no prior loss experience and because the systems in place do not facilitate discrimination by obligor.

Finally, there are significant costs related to the third party payor process. The inventors estimate that the average pharmacy currently incurs a total cost of $1.02 per claim transaction, based on the following expenses: (1) $.10 per transaction in data communications and switch charges; (2) $.50 per transaction in internal reconciliation costs, as discussed above; (3) $.18 per transaction in cost of funds based on current borrowing rates and an average receivable time of 35 days; and (4) $.24 per transaction for reserve for losses and delayed payments calculated at 1.0% of sales. In addition, there are processing charges to both parties in the transaction—service providers are charged per electronic transaction, and plan sponsors are charged by the processors according to the number of conditions that must be confirmed in order to approve a claim, the number of individuals covered, and the number of database analyses the plan sponsor requires. Reduction of some of these costs, such as reconciliation and cost of funds, will be a major benefit to service providers as well as to other industry participants.

The present invention is a computerized method and system which substantially solves the problems service providers have with the existing on-line claim processing and third party payor system described above by providing the means for quickly purchasing selected accounts receivables from service providers, collecting on those receivables directly from the obligors or their agents, and reconciling the claims and payments. See FIG. 11.

SUMMARY OF THE INVENTION

The computerized method and system of the present invention provides service providers such as pharmacies with the capability of using their current computer system and their access to the on-line adjudication network to obtain, in some instances, overnight payment for insurance claims arising from the provision of health care services to their customers. See FIG. 8. Additionally, the computerized method and system of the present invention implements the inventors' recognition of an untapped opportunity to collateralize and to fund third-party prescription receivables. The present invention's unique approach to this opportunity is based, in part, on the use of the existing Automated Clearing House (ACH) system currently utilized by thousands of banks to credit their merchants for credit card sales combined with the well-established securitized asset financial market.

A service provider wanting to take advantage of CHARMS enters into a contractual arrangement with a system operator (the "System Operator") such as The Pharmacy Fund, Inc. ("PFI") of New York, N.Y., assignee of the present invention. After establishing a contractual relationship with a service provider, the provider and the System Operator notify the relevant payors and obligors that future payments for that service provider are to be made to the System Operator. The service provider continues to transmit insurance claim messages to the switch, which forwards the messages to the designated processor and now also retains a copy for CHARMS. See FIGS. 9 and 10.

If the processor approves an insurance claim, CHARMS accesses a database retrievably stored by CHARMS containing records which indicate the credit status of the relevant payors and obligors. CHARMS creates and regularly updates this database by analyzing the creditworthiness of payors and obligors on the basis of compiled data such as past and present payment practices and standard credit agency ratings. CHARMS decides which insurance claims, or accounts receivables, to be purchased by the System Operator from participating pharmacies on the basis of, inter alia, the credit status of the relevant payors and obligors. CHARMS calculates a discount rate, in one preferred embodiment of the present invention, based on the provider's outstanding accounts receivable portfolio, or, in another embodiment, by approximating the provider's best negotiated credit card discount rate, or both. CHARMS credits the service provider's bank account by utilizing, in one embodiment of the present invention, a new interface through existing ACH interchanges. CHARMS arranges for a credit to the service provider's account within a day or two of purchase of the receivable, in contrast to the 18 to 45 days before pharmacies receive payment under the existing systems. In effect, therefore, the present invention finances pharmacies' receivables.

CHARMS keeps track of payments received, and provides the means for the System Operator to aggressively pursue payment when it is not received in a timely manner. Once payment is received, CHARMS reconciles the claims and payments.

In accordance with the present invention, a new financial vehicle has been created for use in conjunction with CHARMS. The purpose of the new financial vehicle is to help the System Operator obtain the funds needed to purchase the receivables from the service providers. CHARMS provides the means for purchase at a discount of a diversified pool of third-party pharmacy receivables which can be used to collateralize a series of short and medium term unique financial instruments of a Special Purpose Vehicle ("SPV"). SPVs are bankruptcy-remote corporations formed for the singular purpose of holding specific collateral assets supporting the obligations of the SPV. As such, they serve the useful purpose of reducing investor risk. To minimize the risk in the creation of this new instrument, CHARMS assembles a unique combination of resources and infrastructures already proven effective in financial environments. By adapting commercially available securitization management software that is currently supporting credit card and mortgage-backed securities operations, this new securitization process is positioned to fit within existing industry standards.

A. Major Components of CHARMS

The inventors have adapted and integrated pre-existing business disciplines and technologies into CHARMS in a unique and effective manner. The following are seven primary operating functions performed by one embodiment of CHARMS: (1) message switching and customer service; (2) evaluation of service provider portfolios; (3) credit scoring and payor and obligor selection; (4) transaction processing; (5) funds collection; (6) funds management and reconciliation; and (7) receivables securitization. See FIG. 11. In another embodiment, the message switching function is carried out by a third party Each function is discussed in more detail below.

1. Message Switching and Customer Service

Switches currently provide the means to transfer electronic claim messages and their adjudicated responses between thousands of service providers and dozens of processors. In one embodiment of the present invention, CHARMS incorporates a switch which captures all on-line transactions as they are originated by service providers, copies all transactions that relate to a client provider, time-stamps them, and forwards them to the appropriate processor designated by the BIN. In addition, CHARMS also captures and copies all on-line adjudicated transactions as they are approved by the processors and routed back to the originating pharmacy by the switch. These claims and replies are retained for further CHARMS processing. The captured claims and responses are "cleaned" of duplicates and other system-related anomalies such as time-outs, and reversals are processed. In another embodiment of the invention, all or some of these switch functions are performed by a third party such as NDC. See FIG. 12.

There are a large and growing number of on-line adjudication processing systems due to the availability and portability of the applicable software. Pharmacists need access to all. A special purpose switch provides a cost efficient mechanism for handling the flow of industry standard format messages.

CHARMS also provides the means for service providers to request information from CHARMS regarding their transaction and payment activity and payor, obligor, and plan coverage, and for CHARMS to respond quickly and supply the information, without the need to modify the existing NCPDP standard protocols. One means used in one embodiment of the present invention is an electronic bulletin board to which service providers can call using their computers and modems to obtain general and deposit account information, as well as to exchange messages with other on-line industry participants. In addition, CHARMS utilizes a unique on-line inquiry and response system by which service providers transmit NCPDP compliant inquiries over the on-line network requesting information such as how much money the System Operator has transferred via the ACH or how many claims have been approved or declined. See FIGS. 25–25A.

To facilitate the operation of this on-line inquiry subsystem, service providers create a new "dummy" record in their in-house computer system which looks like a patient record and which contains the information, such as a BIN, necessary for the switch to channel the record to CHARMS. All the data fields for claim information in this dummy claim are set by the service provider to zero. All the necessary fields, such as the version number, the transaction code, the processor control number and the provider number ("NABP number") are filled with the usual data. The group number or cardholder identification number fields are used by the service provider to indicate what request it is making, and the date of fill field is used to indicate which day's information is being requested. The response sent back to the service provider is in the form of a NCPDP standard rejected claim response, and the specific information requested is sent in the free-form message text fields of the response.

CHARMS also provides the means for service providers to receive answers to questions over the telephone. CHARMS contains a variety of help desk screens and procedures that provide the means for the System Operator to access specific desired information stored in CHARMS's memory components. See FIGS. 17–17P.

These three means give service providers the new and important capability of obtaining immediate, up-to-date information regarding their claims transactions. The service providers' use of CHARMS is compatible with all the software programs used by pharmacies. Essentially, CHARMS "piggy-backs" on the one portion of the several hundred programs that is the same, namely, the electronic message control protocols established by the NCPDP, as explained above. Thus, CHARMS will be transparent to service providers, and subscribing providers will not be required to learn how to operate new software programs or interfaces.

2. Evaluation of Service Provider Portfolios

Any service provider wishing to use CHARMS will subscribe with the System Operator. In accordance with one embodiment of the present invention and in conjunction with the service provider's financial management procedures, CHARMS first extracts a transaction history of all recent third party payables processed by the subscribing service provider. This history is converted into a database that is used to determine the list of processors and creditors being used by the subscribing service provider and to identify TPA and plan sponsor concentrations. In one embodiment, CHARMS also extracts from the service provider data regarding the provider's payor and obligor payment histories for use in its creditworthiness scoring process.

To accurately assess the value of the provider's potential stream of receivables, all of the transactions are run through a regular credit screening. With this information as a base (and highlighting creditors deserving careful monitoring), CHARMS decides, based on an algorithm developed by the inventors, set forth below, which service provider receivables to purchase, and establishes pricing for the service provider. On the targeted effective date of the agreement between the service provider and the System Operator, CHARMS provides for the purchase of the existing portfolio of approved claims. During a transition period, which in one preferred embodiment is the first 30 days after the effective date, CHARMS sorts out the allocation of payments received from payors through the regular reconciliation process.

3. Creditworthiness Scoring and
Payor and Obligor Selection

CHARMS creates and maintains an on-line creditworthiness scoring database for all payors and obligors recognized, in one embodiment of the invention, by the on-line adjudication systems or, in another embodiment, in the System Operator's client and accounts receivable portfolio. The creditworthiness score and status of each payor and obligor is stored, with other information, in a profile record for that entity. As each claim is adjudicated and routed from the processor back to the originating pharmacy, CHARMS checks the status of each payor and obligor against its profile record, as well as the status of providers and plans stored in other profile records. Based on the status of the plan, payor, obligor, and provider, CHARMS decides whether the claim should be marked for purchase, and then, if marked for purchase, CHARMS prices and discounts it accordingly. Based upon the financial evaluation of the claim, the discounted amount is transferred to the pharmacy's bank account. In one embodiment of the present invention, information as to whether a claim is purchased or declined and the discount rate applied is added to the on-line message that is returned to the pharmacy via the switch. In another embodiment of the invention, that information is available to the service provider through the electronic bulletin board or on-line inquiry systems.

The tables in FIGS. 28–29 set forth the claim buy/decline logic used in two different embodiments of CHARMS. A "+" in the table indicates that a given plan, payor or obligor has a favorable creditworthiness score, and a "–" indicates an unfavorable score.

There are several embodiments of creditworthiness scoring systems. FIG. 24 shows one embodiment. In one preferred embodiment, CHARMS creates a creditworthiness scoring database for payors and obligors by utilizing information gathered about past and current payor and obligor payment experience, and combining this information via a heuristic weighting algorithm with the credit evaluations of existing credit rating and reporting agencies, including A.M. Best Company, Inc., of Oldwick, N.J.("A.M. Best"), Dun & Bradstreet Information Services, N.A. Inc., of Murray Hill, N. J.("D&B"), Standard & Poor's Corporation, of New York, N. Y. ("S&P"), Moody's Investors Service, Inc. of New York, N. Y. ("Moody's"), Fitch Investors Service, Inc., of New York, N.Y.("Fitch"), Weiss Reports ("Weiss"), the National Association of Insurance Commissioners, of Washington, D.C., and Duff & Phelps Credit Rating Company, of Chicago, Illinois ("Duff & Phelps"). As CHARMS's payment experience accumulates, it uses the algorithm to adjust the creditworthiness scores on-line to more accurately reflect the payor's and obligor's current ability to pay. In addition, various qualitative factors are taken into consideration in the scoring algorithm.

In another embodiment, direct banking credit reviews are used to supplement the scoring evaluation. In yet a further embodiment, to score the creditworthiness of lesser-rated entities, CHARMS gathers information about credit enhancements such as escrowed deposits held by third parties such as banks, stand-by letters of credit of approved institutions, corporate guarantees, payment by ACH debit, or other arrangements. Further, for entities that are not rated by the agencies listed above, such as the Blue Cross/Blue Shield entities, CHARMS uses data from audits performed by state insurance superintendents. This raw data is then converted into a creditworthiness score for each payor and obligor, as explained in more detail elsewhere in this disclosure.

Because the on-line adjudication system has been operating several years, there is a strong historical record establishing precedents for processing and payment terms for most TPAs and plan sponsors. Although there are over 3,500 obligors operating plans in the United States, almost all of their plans are serviced by a limited number of TPAs, which makes processing operations reasonable.

CHARMS's on-line creditworthiness verification capability is unique in the art. By creating this much needed on-line creditworthiness scoring system, for the first time pharmacists, as well as anyone else subscribing to CHARMS's rating services, will have the ability to screen prescription claims for an "ability to pay."

4. Transaction Processing

On a daily basis, CHARMS summarizes and prepares records of all transactions. At the end of daily processing, CHARMS initiates a series of funds transfer transactions for all approved claims that have been marked for purchase. In one embodiment of the present invention, CHARMS credits the pharmacy's designated bank account through the existing ACH system in accordance with the agreed upon discounting schedule and debits the SPV's funding account. In conjunction with one embodiment of the present invention, the agreements between the System Operator and the service providers will be for at least one year at a fixed contracted "target" discount rate that can be altered based on fluctuations in a specific market index and on changes in the mix of payors and obligors. CHARMS also updates the automated account reconciliation system for each pharmacy. Each claim transaction CHARMS decides to buy has a specified value and an authorization code that has been issued by the plan sponsor or its agent. This is a significant difference from all other receivables in the health care industry.

CHARMS treats each purchased claim transaction in a manner similar to the treatment of credit card transactions. This allows service providers to treat their third party transactions similar to their existing credit card processing and reconciliation. Eventually this will also allow for the elimination of all the separate accounting systems that were developed for third party transactions. This is an important component of the present invention and is a dramatic change from the paper-based detailed statements provided by most payors, processors, TPAs, and plan sponsors to support the existing funds transfer and internal reconciliation effort.

At the present time, Medicaid receivables are not saleable, assignable or lienable. In one embodiment of the present invention, CHARMS includes Medicaid receivables by incorporating one of the solutions currently embodied in already established hospital receivable securitization packages.

As explained further below, CHARMS structures a variety of funding facilities with investment bankers and commercial bankers to secure all of its matched borrowings with the asset stream of receivables purchased from the pharmacy, further enhanced with a credit guarantee. This provides the means for the issuance of commercial paper, debentures, notes, and commercial bank obligations—each with varying terms and covenants.

5. Funds Collection

Upon the establishment of a relationship between the System Operator and a newly subscribing service provider, notice is sent to all relevant payors that all future payments and supporting data for approved claims should be sent directly to the System Operator. CHARMS directs payors to make payments directly to an SPV lock box account. CHARMS monitors the compliance of the payors with their contracted payment terms to insure both the accuracy and timing of the funds flow. FIG. 46. Using pre-defined protocols that are constantly tuned to achieve the most effective payment results, CHARMS provides the means to systematically contact payors and obligors when timely payment has not been received.

6. Funds Management and Reconciliation

Effective cash management is important to the successful operation of CHARMS. The proper balancing of receipts with funding alternatives in order to match the daily "buying" of receivables is the essence of the art. Forecasting, funding decision processes and meticulous reconciliation is required to maximize returns.

On a daily basis CHARMS provides for at least the following cash management functions: (1) the purchase of new service provider receivables; (2) the collection of payments from payors; and (3) the funding or redeeming of market securities. CHARMS processes RAs as they are received along with payments from payors. CHARMS then reconciles previously retained claims against data received in these RAs, uses predefined parameters to determine disposition, and identifies, reports, and stores any exceptions in an exception database file. The volume of transactions CHARMS processes, which will be in the hundreds of millions of dollars, is manageable because of the homogeneity of the transactions and the existing infrastructures of electronic healthcare message switching, credit card processing, and securitization management systems. In addition, CHARMS monitors daily cash available from funding efforts and receipts from payors and obligors, as well as funds used to buy receivables. Combinations of short term funding vehicles, commercial paper, and medium term notes are used to match cash needs while at the same time obtaining the best possible "pooled" interest rate against the overall portfolio.

The use of CHARMS will provide significant reconciliation savings to the provider. Processing third party payments through the service providers' existing system will dramatically reduce the staggering processing and reconciliation expenses currently associated with the growing stream of third party paper-based reconciliation reports. This operational savings may be as important to the service providers as the present invention's funding component.

CHARMS efficiently converts collateralizable assets—in this case receivables—into cash, forecasts cash flow needs, and matches them to available funding sources at competitive market interest rates.

CHARMS's ability to have just the right amount of cash available primarily reflects its ability to accurately forecast the flow of third party claims. Both an unexpected excess and shortfall in cash diminish profitability. By obtaining a history from each service provider prior to beginning funding, the inventors believe that the forecasts are sufficiently accurate.

Importantly, the entire operation of CHARMS's financial processing is transparent to almost all of the regular participants in the health care distribution system. The only incremental items of data CHARMS requires are a group number, which identifies the plan and in turn the payor and obligor who are the credit sources CHARMS scores, and a new BIN to identify CHARMS in on-line claim messages.

7. Receivables Securitization

CHARMS provides the means to obtain the funds needed to purchase the account receivables through securitization, (i.e., borrowing the money and using the receivables as collateral). CHARMS provides for the securitization of the receivables as follows. CHARMS provides the means for the purchase by the System Operator of all of the adjudicated and approved third party receivables from the contracted service providers. CHARMS utilizes historical third party payment data and standardized ratings of the relevant payors and obligors to present rating agencies a conventional underwriting package that will be very easy to rate. Once a rating is established, a broad range of highly competitive markets will be available in which to obtain funding.

Using the service provider's investment grade third party receivables, CHARMS provides the means to create a portfolio of asset backed securities. The asset backed securities will be sold by one or more SPVs that will be the obligors of the securities. If appropriate, CHARMS will incorporate the services of a liquidity and credit enhancer to improve the ratings of the portfolios, provide access to the commercial paper market, add extra funding flexibility and thereby reduce the overall cost of funds.

CHARMS and the SPVs make use of a variety of securitized financial instruments. The most common are commercial paper and short to medium term notes. To gain access to the commercial paper market, CHARMS, in one embodiment of the present invention, provides the means to obtain through a commercial bank a liquidity capability to promptly retire the short term maturing commercial paper. Further, to facilitate the requisite AA or better rating that creates a steady demand from the commercial paper market, CHARMS, as an unknown sponsor of a securitized asset, may require a credit enhancement.

Each SPV will have a clean balance sheet with no liabilities other than the collateralized security. Any fees due to CHARMS as services will be subordinated to the interests of the security holders. A collateral agent or trustee will monitor and control the collateralized assets to protect the investors.

As explained above, CHARMS offers service providers a variety of pricing and discount scenarios, and most service providers will incur a blended discount rate. Also as explained above, CHARMS will screen all adjudicated claims to determine their creditworthiness and in turn to adjust the target discount rate. By utilizing a broad range of financial instruments ranging from commercial paper to medium term notes, CHARMS, in one embodiment of the present invention, selects the most appropriate mix to match the term of the underlying collateral assets.

To facilitate the securitization process, CHARMS employs a securitization system to manage the treasury functions and to automate most of the administration and accounting required for the SPVs. The primary function of this system is to provide detailed information and reports to support the sale of marketable securities backed by the cash flows generated by, and the value of, the underlying receivables. In addition, this system provides for SPV financial management, credit enhancement, and liquidity monitoring facilities. In one embodiment, CHARMS utilizes a securitization management system developed by Deloitte & Touche of Wilton, Conn., which, in the preferred embodiment, is the Financial Administration and Structuring Technology (FAST), an integrated issuing entity origination and management software package which addresses the financial and operational aspects of creating and managing an asset securitization entity. FAST is an IBM® PC based system that can also be operated on a PC local area network. FAST guides trading activities, forecasting functions, accounting entries, and management information systems to support pricing and other management decisions. In one preferred embodiment, FAST is modified and customized to streamline the analysis and administration functions for the program features that are unique to CHARMS.

B. Objects of the Present Invention

It is an object of the present invention to offer service providers relatively immediate (within 24–72 hours) cash for their creditworthy third party receivables.

It is an object of the present invention to provide service providers an easy way to obtain liquidity while fitting into the existing claim processing system with few, if any, operating changes at the service provider level.

It is an object of the present invention to provide service providers with the facility for reconciliation of third party transactions.

It is an object of the present invention to provide service providers, by processing third party claims payments like credit card payments, with the ability to substantially reduce the paper payments process from their overhead.

It is an object of the present invention to provide the means for service providers to obtain quick responses to requests for information regarding claim transactions.

It is an object of the present invention to reduce service providers from credit exposure by providing a third party who will buy the receivables and by ceasing to deal with non-creditworthy payors and obligors in a timely manner.

It is an object of the present invention to reduce the uncertainties service providers face with the cash flow variations that have become commonplace with insurer payments.

It is an object of the present invention to provide the means to infuse new cash into the drug distribution system and to allow pharmaceutical retailers to purchase inventory or pay down their largest payable obligations more readily.

It is an object of the present invention to provide the means to alleviate the tension between service providers, processors, TPAs, and plan sponsors which has arisen as the service providers seek lower processing fees and faster funds flow.

BRIEF DESCRIPTION OF THE DRAWINGS

FIG. 1 shows the overall structure of the on-line pharmaceutical claim processing system after the addition of one embodiment of CHARMS.

FIG. 3 shows the flow of messages in the prior art on-line pharmaceutical claim processing system.

FIGS. 4–6 show the data fields in databases created, updated, stored, and used by one embodiment of CHARMS.

FIGS. 17–17P show the help desk display screens in one embodiment of CHARMS.

FIGS. 28–29 are truth tables showing the buy/decline decision logic in two embodiments of CHARMS.

FIG. 30 is a truth table showing the logic for handling the decline and inactive indicators in one embodiment of CHARMS.

FIGS. 31–32A are tables showing the logic for handling duplicates, reversals, and other anomalies in one embodiment of CHARMS.

FIGS. 33–35 show the data fields in the provider, payor, obligor, processor, and plan profiles in different embodiments of CHARMS.

FIGS. 36–41 show the formats for summary and detail reports generated by one embodiment of CHARMS.

FIGS. 43–44A show the inputs used and outputs generated by one embodiment of CHARMS's reconciliation system.

FIGS. 45–45A show the invoice generated by one embodiment of CHARMS.

FIGS. 45B and 45C show the report generated by one embodiment of CHARMS.

FIG. 48 is a table showing the logic for handling adjustments made during the reconciliation process in one embodiment of CHARMS.

FIG. 49 is a creditworthiness scoring table used by one embodiment of CHARMS.

DETAILED DESCRIPTION OF THE INVENTION

Figure 25A:
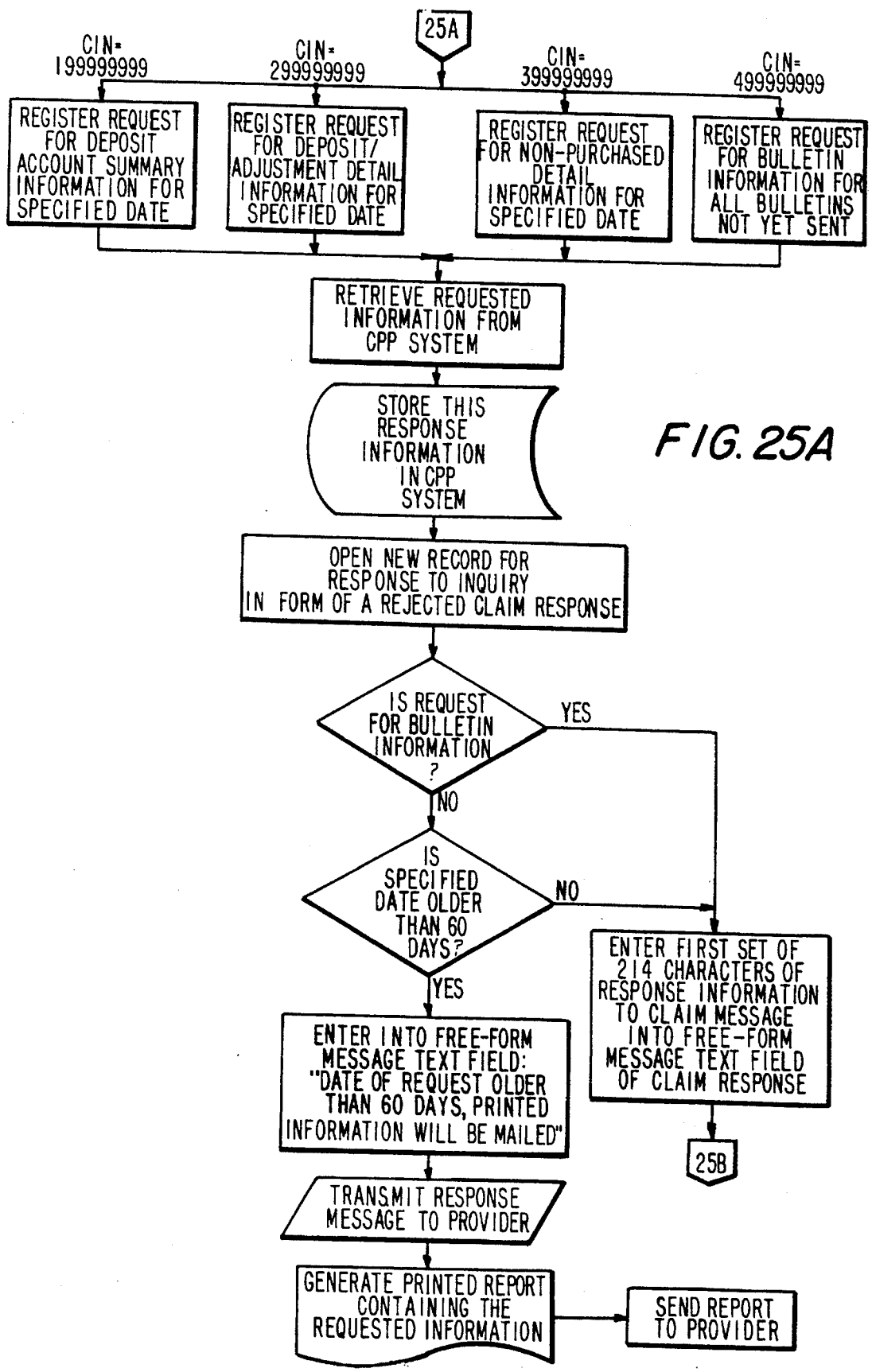
FIGS. 20–27 are flow chart showing the logical flow of one preferred embodiment of CHARMS.
Figure 2:
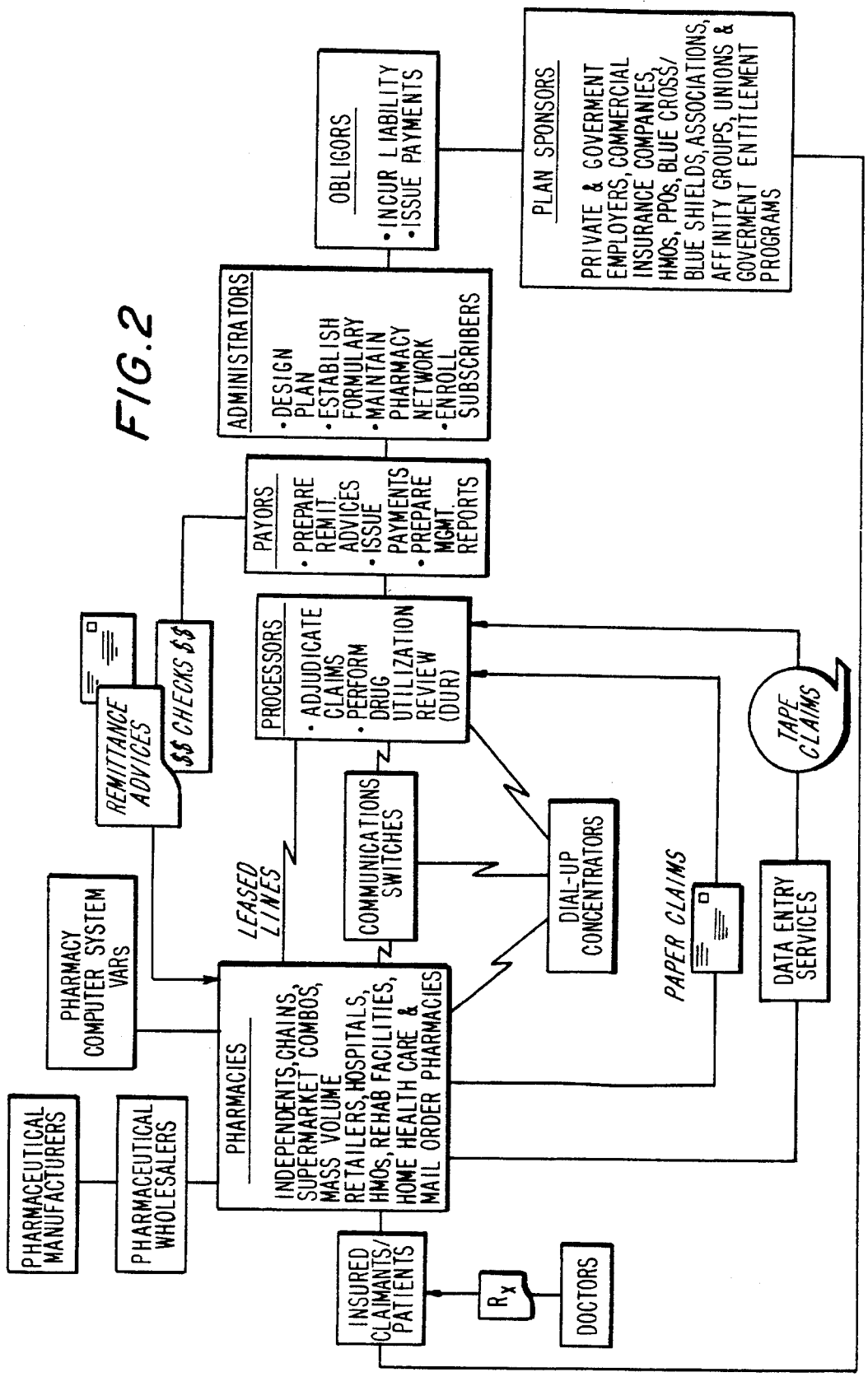
FIG. 2 shows the overall structure of the prior art on-line pharmaceutical claim processing system.
Figure 7:
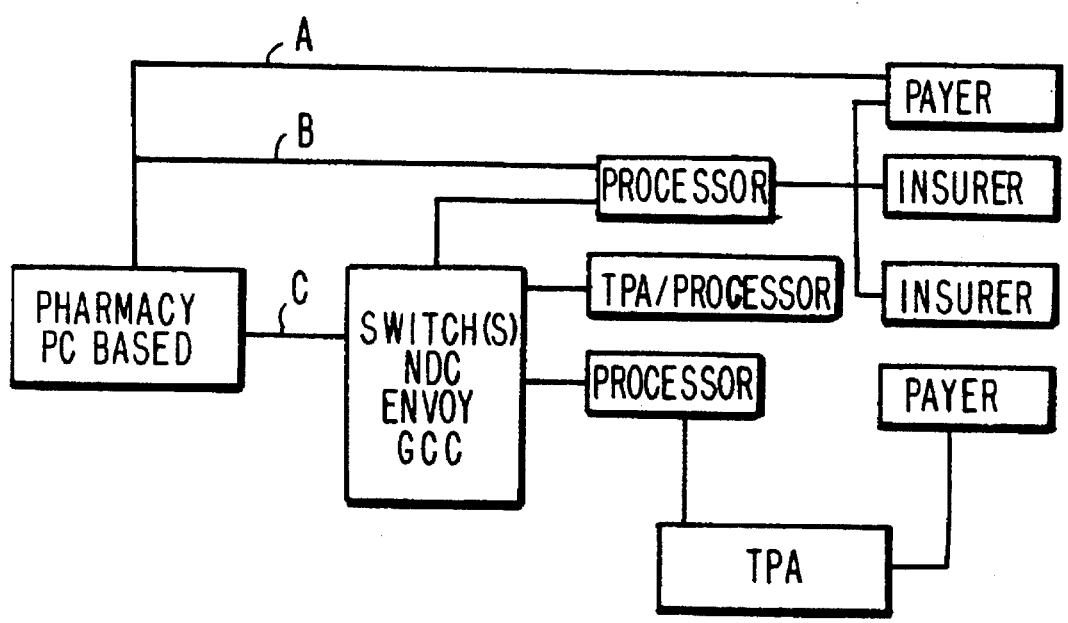
FIG. 7 shows the three possible routes that claim information is transmitted in the prior art claims processing system.
Figure 8:
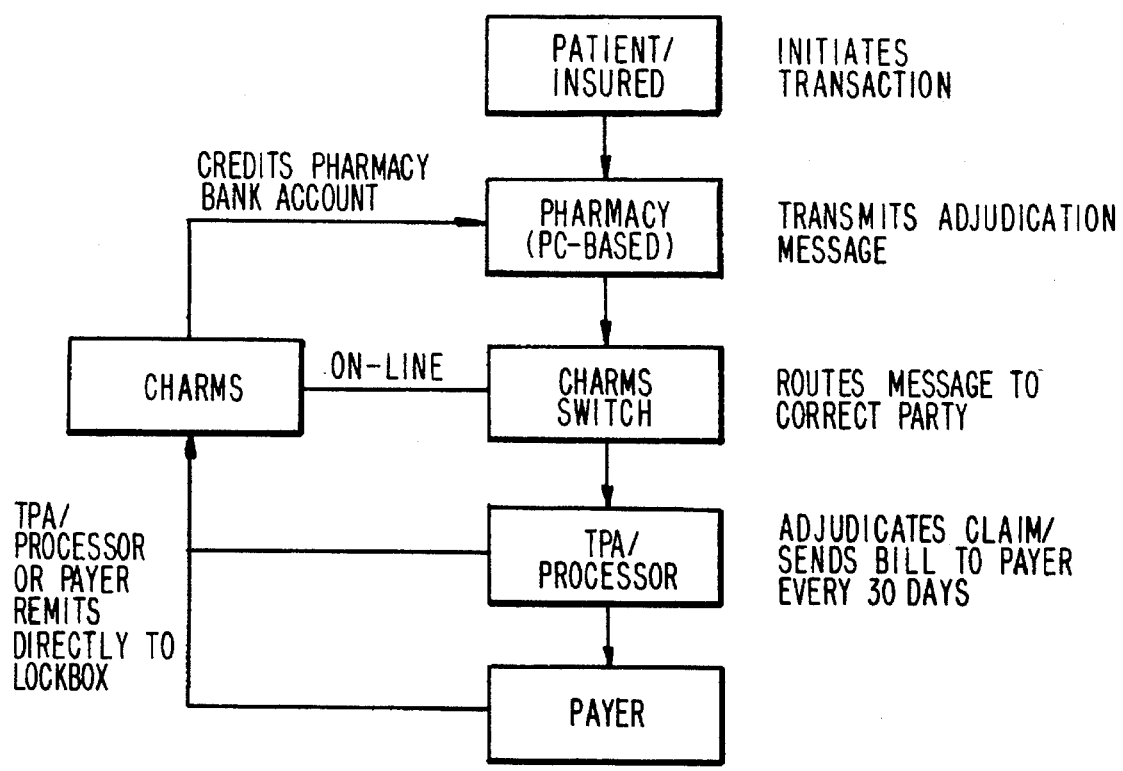
FIGS. 8, 9 and 10 show the flow of claim messages in the pharmaceutical third party adjudication system after the addition of the present invention.
Figure 9:
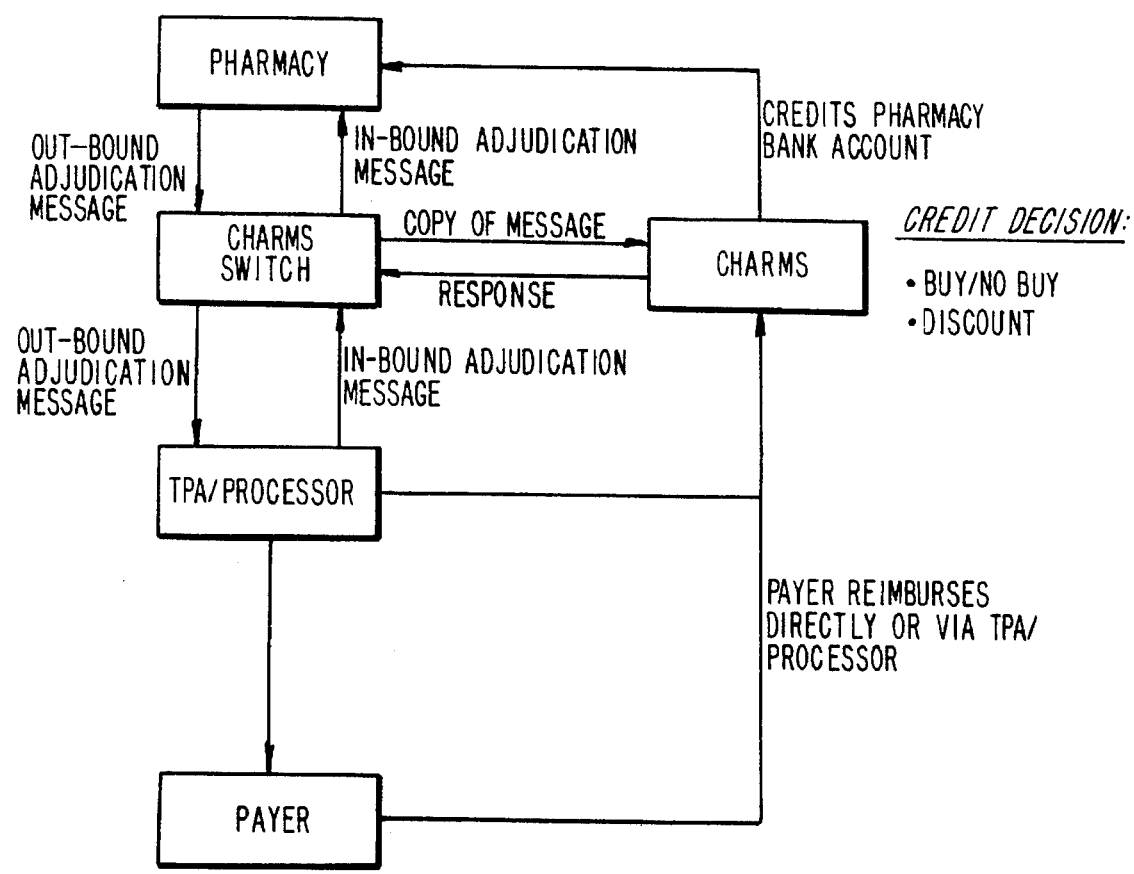
Figure 10:
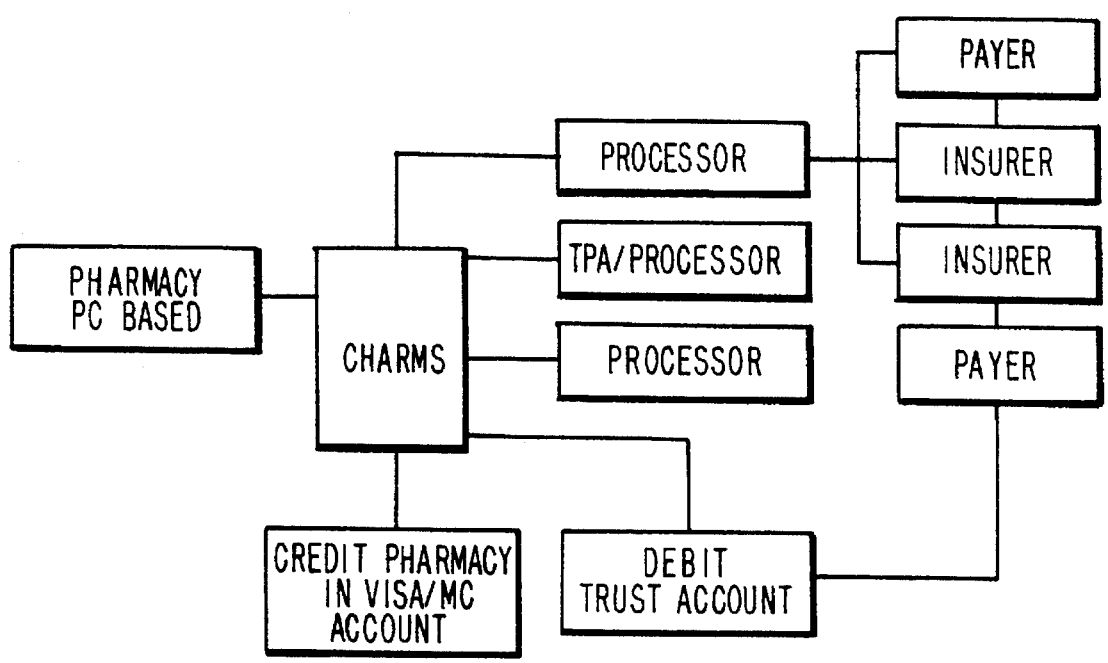

The present invention deals with the problems discussed above by blending a financial rationale into the healthcare claims adjudication process. Though the focus of this disclosure has been and will continue to be on the pharmaceutical industry, the invention disclosed herein is applicable to other healthcare areas utilizing computerized, on-line accounts receivable adjudication, reimbursement, and reporting processing, including hospitals, doctors and dentists, as well as to industries other than the healthcare industry.

CHARMS is comprised of a variety of hardware and software elements. CHARMS's hardware elements include one or more mainframe computers, terminals and workstations, personal computers, display devices such as monitors and printers, input devices such as keyboards and mouses, communication devices such as modems, and the requisite cables and electrical connections. In one embodiment, CHARMS is comprised, in part, of mainframe computers available through Tandem Computers, Inc. of Cupertino, Calif., which are used to process most of the functions including transaction capture, database maintenance, summarization, customer service systems, and report production. In this embodiment, CHARMS utilizes a compatible, fault-tolerant operating system on the mainframe computer, such as GUARDIAN 90™, and a data base and file management system such as NONSTOP SQL™, both available through Tandem Computers, Inc. CHARMS also utilizes a 3270 terminal emulation system for the terminals and workstations, such as SNA 3270™ Communications Software available through Tandem Computers, Inc.

CHARMS is also comprised of personal computers such as those available though International Business Machines Corporation of Armonk, N.Y., running on an operating system such as MS-DOS® available through Microsoft Corporation of Redmond, Wash. The personal computers are used to process certain functions including, in one embodiment, the creditworthiness scoring, securitization and funds management systems. To facilitate this processing, a data base management programming language is used such as dbase IV™ available through Borland International, Inc. of Scotts Valley, Calif., along with a data base compiler such as CLIPPER® available through Nantucket Corporation of Culver City, Calif. A person of ordinary skill in the art would be able to properly assemble these hardware and software elements.

A. Periodic System Functions

At the start of CHARMS operation, and on a regular basis thereafter, CHARMS provides the means for the performance of the following functions:

1. Provider Profiles

Information is collected and inputted into CHARMS in the form of provider profile records regarding each of the service providers whose receivables are being considered for purchase. CHARMS collects the information contained in FIG. 33, and organizes and retrievably stores that information in a provider profile database. The provider profile records are linked to each other through their affiliation, such as stores within regions within chains within buying groups. In addition, provider profile records are linked to the payor, obligor, and plan profile records. In another embodiment, the data for the provider and payor, obligor, and plan profile records is formatted as displayed in FIG. 35.

Figure 15:
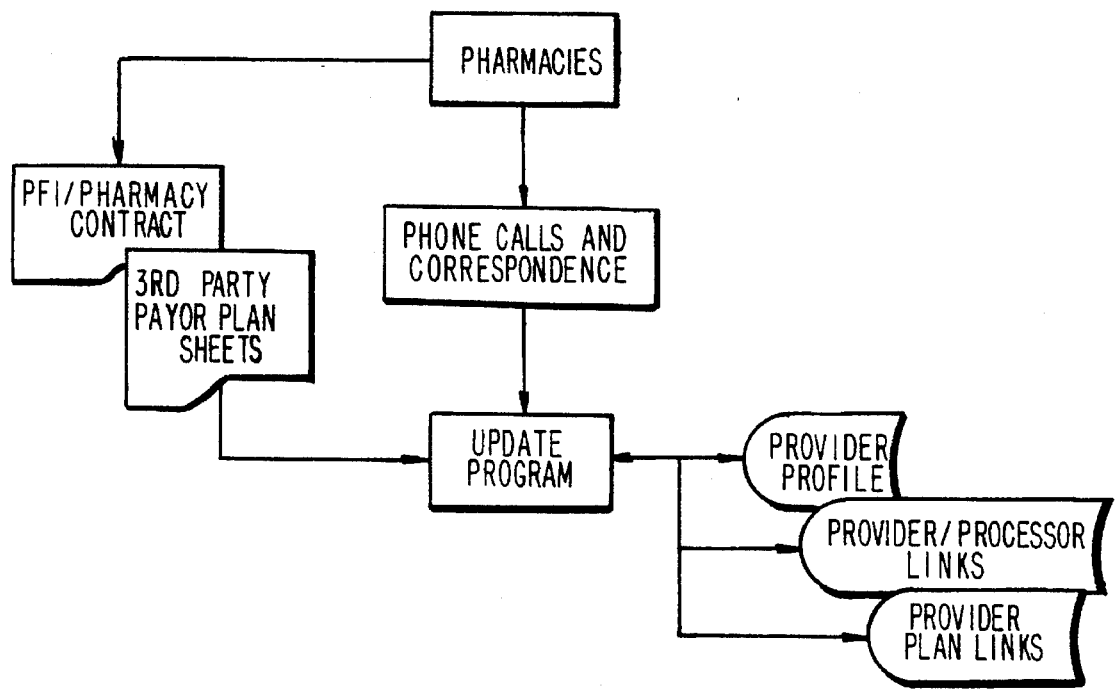
FIG. 15 shows the structure of the provider profile database creation process in one embodiment of CHARMS.

The service provider can update his provider profile record by contacting the System Operator via telephone or other correspondence, including, in one embodiment of the present invention, via the electronic bulletin board. The provider profile records are updated from the Pharmacy Profile Maintenance Screen, FIG. 17B. In addition, provider profile records are also updated with information from TPA and plan sponsor plan sheets. See FIG. 15.

The provider profile records are accessed during a number of CHARMS processes, including: transaction and provider cut-off processing; daily summarization processing; payor RA reconciliation; ACH processing; customer services operation; and System Operator management requirements and internal functions.

In one embodiment, CHARMS determines whether to consider a subscribing service provider's receivables for purchase using an algorithm developed by the inventors which is described below. After CHARMS determines that a provider's receivables are eligible for purchase, it marks them as existing receivables, and modifies the provider's profile record accordingly. Notice is sent to the payors and obligors associated with the provider's receivables that all future payments and supporting data for this service provider are to be sent to the System Operator. CHARMS then conducts the same buy/decline analysis it does for all transactions it received through the switch, determines the applicable discount rate, and reflects the receivable in the daily summary report described below. After a provider has subscribed, CHARMS analyzes all its daily receivables automatically on-line, as further described below.

2. Help Desk Subsystem

Figure 17:
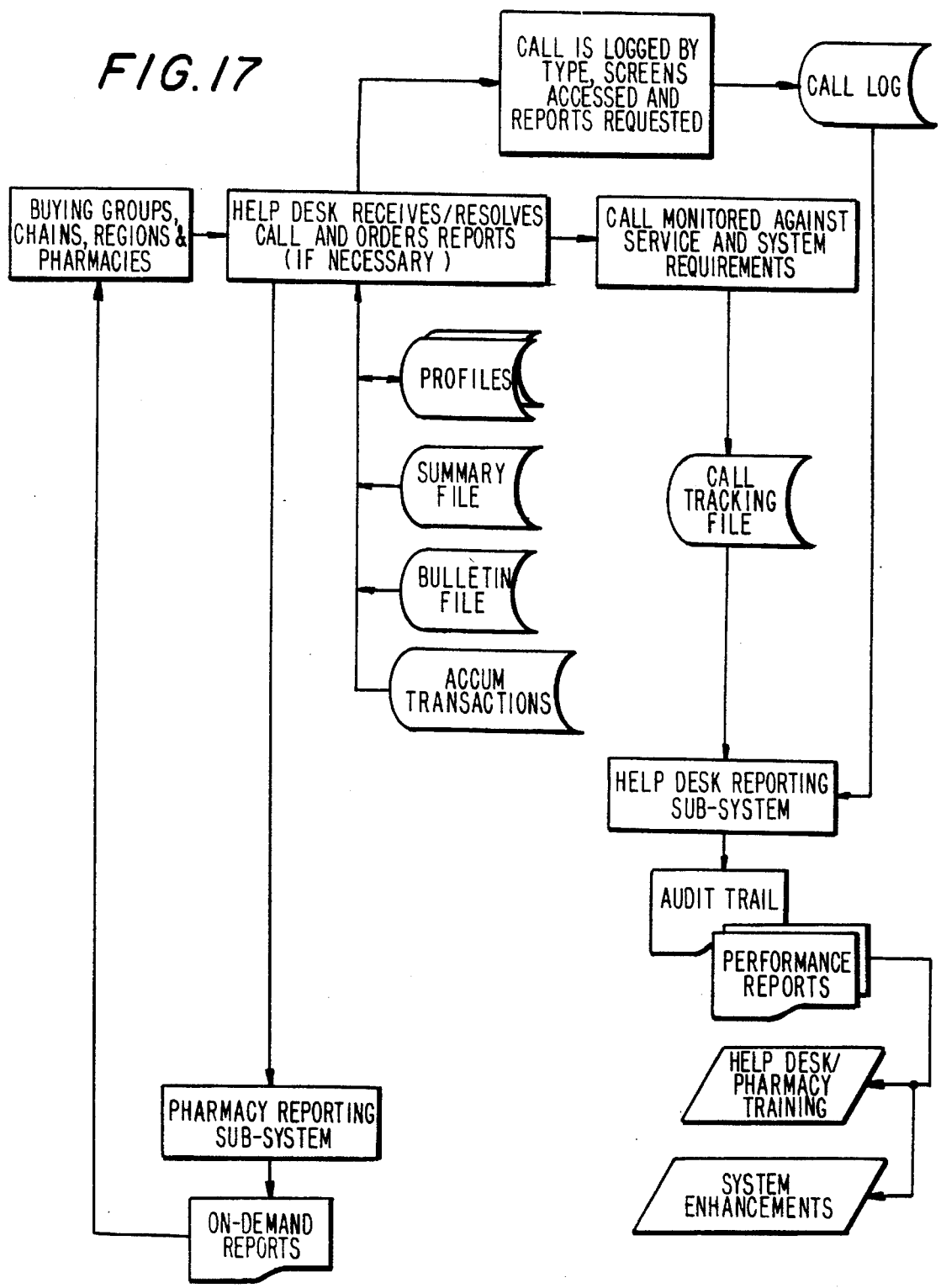
FIG. 17 shows the structure of one embodiment of CHARMS's help desk system.

One embodiment of CHARMS contains a help desk subsystem that provides the means for the operation of a customer services help desk by the System Operator. When the System Operator receives telephone calls or other correspondence from service providers, it resolves the caller's request and/or orders a report to be sent to the service provider, when necessary. See FIG. 17. To help resolve a service provider's request for information, the System Operator has access, through a series of help desk display screens, FIGS. 17A–17P, to a number of databases stored by CHARMS, including the provider and payor profile records, the summary file, the bulletin file, and the accumulated transaction file. FIG. 17. The information available through the help desk display screens is updated on a regular basis, which in one preferred embodiment is daily.

FIG. 17A is the "main menu" screen at which each help desk call begins. To perform any function on this or the other screens, the System Operator enters the necessary information using his keyboard or other input device into the appropriate field on the screen and presses the ENTER or RETURN key. From the main menu screen, the System Operator selects the appropriate screen functions by a combination of entering specific date information, entering the caller's name, and marking the appropriate inquiry type on the call tracking portion of the screen. This not only records the type of call, but also automatically displays the screen(s) most likely to contain the information needed to answer the caller's inquiry. CHARMS carries detail information entered at this screen throughout all screen inquiries and does not delete it until the call is ended and recorded.

CHARMS's help desk subsystem also provides the means for the System Operator to quickly perform functions and access a variety of information through the use of "Hot Keys". The Hot Keys available from the main menu screen in one embodiment of the invention are shown in FIG. 17A as beginning with the character string "PFxx", where "xx" is a numerical string assigned to each particular screen. The PF keys are used to transfer directly from screen to screen without the need to return to the main menu. For example, to go to any screen for a specific pharmacy, transaction date, deposit number, or report, the System Operator enters the necessary information and presses the appropriate PF key, and to display a claim summary for a provider chain, the System Operator enters the chain code and presses the appropriate PF key. To facilitate the use of this Hot Key system, the PF key assignments are substantially consistent throughout the screens, and any variations in PF key assignments are indicated at the bottom of each individual screen. The System Operator may "Hot Key", i.e., automatically transfer, from the main menu screen to other screens without returning to the main menu, and CHARMS's call tracking system logs all screens accessed until the call has ended and the PF key for END/RECORD CALL has been pressed.

The default function on the main menu is to enter only the NABP number, which causes CHARMS to display the deposit summary screen, just as pressing the deposit summary PF key does. This function is the default because the inventors believe the deposit summary screen contains the information most often requested by service providers. If the NABP and prescription numbers are entered, the system displays the appropriate screen where the claim designated by those numbers resides. If the NABP number and deposit date fields are selected, the System Operator then presses the appropriate PF key to display summary or detail information.

The PF key for NON-PURCHASE CLAIM DETAIL is pressed to display claims that have been adjudicated and logged as "approved" by the processor but which CHARMS did not decide to buy. This information is used in resolving inquiries by the pharmacy, and is necessary because the System Operator also acts as a clearing house for all of the client provider's third party claims, whether CHARMS decides to purchase them or not.

In cases where a provider calls regarding the CHARMS bulletin currently being sent to the providers via on-line transactions, CHARMS allows the System Operator to display the current message as well as previous messages by entering the transaction date and marking the PFI BULLETIN REVIEW field on the menu. A monthly statement can be ordered for a provider by entering the NABP or chain numbers and selecting MONTHLY STATEMENT field from the menu.

The PF key for CALL END/RECORD is pressed once the call has ended. This causes CHARMS to record all items of information from the menu such as NABP number, chain code, prescription number, dates, deposit information, the date and time of the call, the caller's name, all categories marked, which screens were accessed during the call, if an exception entry was made, or if a report was requested. At the same time, CHARMS returns to the main menu screen and awaits the next call.

The INQUIRY INACTIVE LIST field is used to produce a listing of those providers which have not transmitted an inquiry request in over a specified length of time.

FIG. 17B is the "pharmacy profile" screen, through which CHARMS provides service provider information, bank information, and year to date transaction information. If a provider is part of a chain or buying group, the chain or group codes are also entered, which link the data in the provider profile record to the data in the specified chain or group record. The MEDICAID NO. field is used as a cross reference to link it with the NABP Number.

To add a record for a new provider, the System Operator enters the NABP number and presses the PF key from the main menu screen to display a blank pharmacy profile screen. Once all of the relevant information is entered, the PF key to add the record is pressed. To update the record, the System Operator goes to the specific profile, makes the necessary changes, and presses the PF key to UPDATE. To delete the record, the System Operator goes to the specific profile and presses the PF key to DELETE. CHARMS then displays the inquiry "CONFIRM DELETION Y/N", to which the System Operator responds by entering CONFIRM or CANCEL. Once this has been done, CHARMS transfers the record and all detail information to a history file.

To update the chain or buying group information, from this screen the System Operator verifies the chain or buying group codes are indicated on the screen and presses the PF key for CHAIN/BG PROFILE to bring up the appropriate screen. Any changes made to that screen apply to all providers for the chain or buying group. In cases where a provider is part of both a chain and a specific buying group, the chain profile is the default.

CHARMS generates hard copy files of the provider profiles on a periodic basis which, in one preferred embodiment, is monthly. This same information is available by manually requesting the profile history (audit) report to be run over night and delivered the next day.

The following are the data types for the fields on the pharmacy profile screen: (1) the pharmacy data fields include name, address, city, state, zip code, phone number, fax phone number, first and second contact person, and time zone; (2) the PHARMACY TYPE field indicates the type of store such as grocery store pharmacy, super store pharmacy, and stand alone pharmacy; (3) the CHAIN CODE No. field indicates the three digit NCPDP chain code for the chain; (4) the BUYING GROUP No. field indicates a CHARMS internal buying group number which is used for grouping providers or chains under a single buying entity; (5) the SOFTWARE VENDOR NAME and PHONE NO. fields are used to indicate who the particular provider software vendor is and a contact telephone number; (6) the CONTRACT DATE field indicates the date the provider enrolled in the CHARMS program; (7) the FIRST BUY DATE field indicates the date of the first transaction between the provider and CHARMS; (8) the TERMINATION DATE field indicates the date the pharmacy is no longer participating in the CHARMS program—this date can be added in advance of the effective date and used as a key for pharmacy eligibility edits; (9) the REMIT TO field is used to indicate if payments are to be made to the individual provider or a single payment made to the chain headquarters—if the payments are to go to the headquarters, this data is blank on this screen, and displayed on the chain profile screen instead; (10) the AVG. DAILY RECEIVABLES field indicates the individual provider's daily third party receivables—this information is used for monitoring and fraud protection, as explained elsewhere in this disclosure; (11) the BANK NAME, ACCOUNT NO., and BANK ROUTING fields are used by the System Operator to identify the provider's bank payment information—this is blank when the remittance goes to the chain headquarters; (12) the DISC. RATE 1 and DISC. RATE 2 fields indicate contracted discount rates, both the standard rate and a special rate if applicable; (13) the YTD# OF CLAIMS and YTD $ OF CLAIMS fields are used to shrew the provider's status as of a particular date, and could be used in determining if the discount rate requires renegotiating—this same data is included in the chain profile screen; (14) the ADJUSTMENT AUTHORIZATION levels are used to guide the System Operator in determining what level of escalation is required to process a specific adjustment amount; and (15) the CLIENT STATUS CODE field indicates when special attention is required—for example, a value of "1" would indicate "MONITOR ACCOUNT", and a value of "2" would then indicate "AUDIT REQUIRED" and identify this provider as a potential termination should the audit confirm fraud or other abuses.

FIG. 17C is the primary "deposit summary" screen which shows the deposit number, total dollar amount of purchased claims, total dollar amount of non-purchased claims, total dollar amount of adjustments, total amount due, discount fee amount, total net amount of deposit, negative balance indicator, wire transfer indicator, deposit date, and deposit time. By entering a NABP number or chain code and any of the following information: transaction date, from and to dates, deposit number, or deposit date, the System Operator then presses the appropriate PF key to pull up all of the above listed information.

If the deposit to the provider's account was made by wire transfer, the "WT" field is marked. In cases of a negative balance, the "NB" field is marked and the total net deposit field contains a zero ($0.00). The System Operator reviews additional information regarding the deposit summary and negative balance by pressing the appropriate PF key to display the negative balance re-payment summary screen. The System Operator toggles between these screens by pressing the same PF key.

Should a provider call regarding its on-line inquiry for deposit detail and adjustments regarding information for a specific processor, the System Operator brings up this deposit summary screen, moves the cursor to the line of information for a specific day's deposit, and then presses the PF key for the deposit summary by processor screen.

FIG. 17D is the "deposit summary by processor" screen which shows, by processor, the total number and dollar amount of purchased claims, total number and dollar amount of non-purchased claims, total number and dollar amount of adjustments, and total amount of discount fees for the deposit date or deposit number entered. To display this screen, the System Operator goes to the deposit summary screen for the specified provider, moves the cursor to any field on the line for a specific day's deposit, and presses the PF key for DEP SUMM BY PROCR.

This screen displays information for the one deposit date. Claims which were reversed the same day are not included in this information as the claim and corresponding reversal cancel each other out. Pressing the PF key for RETURN TO DEP SUMM causes CHARMS to return the screen to the deposit summary screen.

FIG. 17E is the "negative balance re-payment summary" screen which shows the deposit number, total number of purchased claims, total number of non-purchased claims, total number of adjustments, total amount due, negative balance amount, discount fee amount, total net amount of deposit, deposit date, and deposit time. From the deposit summary screen, the System Operator Hot Keys to this screen by pressing the assigned PF key to display this additional information regarding the provider's deposit, which is useful when a negative balance condition occurs and the provider is calling for an explanation of why its deposit is less than its records indicate. CHARMS posts any remaining negative balances after the day's deposit to the next day's totals and repeats this procedure until the negative balance is cleared. The System Operator toggles between the summary screens by pressing the assigned PF key.

FIG. 17F is the "claim detail" screen showing prescription number, processor, carrier/group, date of fill, amount paid, discount fee, posting date, and posting time for all claims CHARMS decides are to be purchased. These claims include standard claims, zero payable claims, and captured claims with no actual dollar amount to purchase. Claims which have been reversed are indicated by the letter "R" placed at the end of the prescription number field. Example: 1234567P . After the System Operator enters a NABP number and either transaction date or from and to dates, it then presses the PF key that pulls up all of the above listed information.

The claim detail screen is used for individual provider information. Should a chain request this information, CHARMS generates an off-line report which is sent to the chain. The same selection criteria is used for either provider or chain requests.

FIG. 17G shows the "adjustments" screen. CHARMS is notified of adjustments on monies due the provider by the processor or payer. These adjustments are received in various ways such as by an adjustment advice report, a RA, memos, modem to modem transmission, tape, or disk. These updates are incorporated into CHARMS, which updates and displays on the adjustment screen for inquiry. The PROCSR field indicates which processor initiated the adjustment. This screen displays the adjustment information in adjustment date order. For the same information to be sorted and displayed by processor, the System Operator presses the PF key assigned to LIST ADJ BY PROCSR, which screen is described below. Any further requests require an off-line batch report to be sent to the requester.

CHARMS provides the means to identify at least the following five types of adjustments: (1) a processor/payer charge-back or positive adjustment; (2) a CHARMS charge-back or positive adjustment; (3) a CHARMS discount fee adjustment; (4) processor transaction fees; and (5) miscellaneous fees. CHARMS totals the number of adjustments along with the total dollar impact to that day's totals for balancing. These adjustments are carried forward in totals only to the claim summary screen.

CHARMS transmits a message to providers during the balancing process to inform them of the number of adjustments and dollar impact to their daily accounts receivable third party totals. Providers can transmit inquiry messages if more adjustment detail on these are needed. The last page of an adjustment message or report ends with the total number and net adjustment amount for the period requested. Chain inquiries display only the totals information for the current day's date, and any additional information requires an off-line batch report to be generated and sent to the chain. To inquire, the System Operator enters the NABP number or chain code, and any of the transaction date, from/to dates, deposit number, or deposit date.

The following are the codes used for the TYPE field in one embodiment of the invention which indicate the reason for any adjustments: (1) PTWP—Paid to the Wrong Pharmacy; (2) COST—Ingredient Cost (AWP) Paid; (3) DISP—Dispensing Fee Paid; (4) COPA—Copayment from Patient; (5) TAX—Sales Tax; (6) CHBK—Charge Back; (7) PRVL—Claim Reversal Done By Processor; (8) RVSL—Claim Reversal Out of Cycle; (9) DISC—Change in Discount Fee; (10) AUDT—Pharmacy Audit; (11) EFT—EFT Payment Correction; (12) TRAN—Processor Transaction Fees; (13) MISC—Miscellaneous Fees; and (14) PREV—Correction of Previous Adjustment.

If the System Operator needs to generate an adjustment manually and post it to the on-line files, the System Operator presses, on the adjustments screen, the PF key for ADJUSTMENT ENTRY to display the adjustment entry screen. Once an adjustment has been entered, CHARMS returns to this screen automatically.

FIG. 17H shows the "adjustments by processor" screen, which is the same as the adjustments screen but the information is sorted and displayed alphabetically by processor. Use of this screen is helpful in researching problems with specific processors. By pressing the assigned PF key, the System Operator toggles the display between the two screens, adjustments and adjustment by processor.

FIG. 17I shows the "adjustment entry" screen, which is used for manually entered adjustments. The information entered by the System Operator is the same as is displayed on the adjustment inquiry screens. By use of this screen, the System Operator can input the adjustment into CHARMS just as it was received from a processor. CHARMS provides for security by limiting the amount of a possible adjustment according to the personal identification number ("PIN") of the user. For example, in one preferred embodiment, CHARMS permits the System Operator to input adjustments of up to $25.00, and for supervisors at the System Operator to input adjustments of up to $100.00. The PIN is entered into the ENTERED BY field. The PIN does not appear on the screen as actual characters, but displays as a series of other dummy characters such as asterisks. This screen allows for entering of multiple adjustments, each requiring the personal identification number of the person making the entry. Once all adjustments are entered, the System Operator presses the ENTER or RETURN key to post the adjustments, and this screen returns to the adjustment screen. In addition, CHARMS provides the means for supervisors and higher security level personnel to display, for review purposes, adjustments entered. CHARMS displays this screen and includes the PINs entered in the "ENTERED BY" field. This is done by pressing the assigned PF key for ADJUSTMENT ENTRY LOG. If someone whose PIN is not authorized to access this information presses the PF key, CHARMS displays the message "NOT AUTHORIZED" and keeps the screen at its present display.

FIG. 17J shows the "alert notes" screen, which is used to document any exception to normal activity for providers. This screen contains "open" exceptions which can be generated either by CHARMS or by the System Operator, as well as exceptions that are "resolved" up to seven days prior to the current date. Whenever an exception exists for a provider, the word "ALERT" will display in the middle of the pharmacy or chain profile screens. Once there are no more "open" exceptions, this flag is no longer displayed.

The exception screen entries are listed by sub-class with the open issues first and then the resolved issues. Within each class, the individual entries are in order of most recent date, with the most recent entry displayed first. CHARMS assigns a unique reference number to every exception which displays with every entry for that exception.

When CHARMS generates an alert during processing, as described fully elsewhere in this disclosure, such as a daily deposit that is outside of established variables, negative balance situations, or re-occurring negative balances, it posts the exception using the sub-class "PFI" to this screen along with taking whatever specific action is required for the alert, like withholding the daily bank deposit until it can be verified.

A manual alert may be opened manually by the System Operator whenever a problem can not be handled and resolved on that call or requires research and follow-up. This may also require a call-back to the pharmacy. CHARMS classifies these types of exceptions under sub-classes of "HD" for help desk or "SYS" for system problem.

Escalation notes are also carried on the alert notes screen and use a sub-class of "ESC". These are used by the System Operator when calls cannot be resolved and the problem or request should be handled by management. These are monitored by bringing up the alert notes screen and entering the subclass without entering any NABP number. All open "ESC" items are displayed in order of time stamp, with the most recent listed first.

To display an existing exception or to open a new one, the System Operator presses the PF key for the alert notes screen from any screen. If the System Operator is accessing this screen from the pharmacy profile screen, the NABP number is automatically entered, or the chain code for a chain. The System Operator enters the reference number of a specific exception item to update or resolve the item, or enters the sub class to display all items for that sub-class and then perform the same functions. When opening an item, the System Operator enters the sub-class, but leaves the reference number blank and indicates this is a new item. CHARMS assigns the reference number automatically.

To assist the System Operator in researching open exception items, CHARMS displays all entries for the selected sub-class. Each entry logs whether it was entered by the system (SYS) or by the System Operator (using its representative's initials). Also, system generated exceptions and those manually opened pertaining to the credit department have a reference number beginning with a "C" to indicate a credit alert.

Once an exception item is resolved, CHARMS writes it in its entirety to the alert history file and also displays it on-line for seven days. Resolved exceptions are tagged by the addition of an "R" to the reference number. If resolved exception reports are requested, the System Operator produces an off-line report by going to the exception screen, entering the NABP number, sub-class, and reference number if it is available, and pressing the PF key for the detail report. Also, the entire history may be printed for a specific provider by entering the NABP number and pressing the assigned PF key. Also, if a report is needed regarding all providers with exceptions for a specific sub-class, that sub-class is entered only and a report is generated sorted by provider numbers. If a report is needed for all exception items, the System Operator does not enter any NABP number or sub-class, and presses the assigned PF key.

FIG. 17K shows the "non-purchased claim detail" screen showing prescription, processor, carrier/group, date of fill, amount paid, posting date, and posting time. This screen displays those claims that have been adjudicated and paid by the processor, but which CHARMS declined to buy. Since the System Operator operates as a clearing house for all of the provider's third party claims, these claims are paid once the funds from the payer have been received and verified. This screen contains any non-purchased (declined) claims, including captured ($0.00 amount) claims.

After the System Operator enters a NABP number and either transaction date or from and to dates, it then presses the assigned PF key to bring up all of the above listed information. The last page of any message or report sent to providers includes total volume and dollar amount for the requested period. This screen is used only for individual provider information. Should a chain request this information, an off-line report is generated and sent to the chain. The same selection criteria is used for either pharmacy or chain requests.

The STATUS field in this screen indicates the source of the claim record. The three status codes used in one embodiment of the invention are: (1) "TX"—claim transmitted and captured by CHARMS, but not purchased; (2) "NTX"—claim not captured by CHARMS. These claims would be generated by RA notification of the claim, paper submission of claim, tape submission of claim, un-matched duplicate claim, or claim transmitted directly to the processor instead of being transmitted via the switch; and (3) CR—payment has been received by the System Operator for this claim and payment has been included in the next ACH to the provider.

The REASON field in this screen indicates why the claim was declined by CHARMS. For example, "CR" in this field indicates CHARMS declined the claim for credit reasons relating to the payor or obligor, "UMD" indicates unmatched duplicane claim, and "NEG" indicates a negative balance greater than claim dollar amount.

FIG. 17L shows the "chain profile" screen, which provides information regarding the pharmacy chain, bank information, and year to date transaction information for the entire chain. To add a new chain, the System Operator calls up a blank chain profile screen by bringing up the main menu screen, entering the chain code, and pressing the PF key assigned for this screen from the main menu screen. Once all of the information is entered, the System Operator presses the PF key to add the record. To update the record, the System Operator goes to the specific profile, makes the necessary changes, and presses the PF key to update. The update also takes place on all individual pharmacy profile screens. To delete a record, the System Operator goes to the specific profile and press the PF key to delete. CHARMS then inquires "CONFIRM DELETION Y/N", and the System Operator then either confirms or cancels the deletion process. Once this has been done, the record and all detail information is moved to a history file.

The profile history is generally available immediately by contacting the System Operator directly for the information. CHARMS generates hard copy files of the profiles on a periodic basis, which in one embodiment is monthly. This same information is available by manually requesting the profile history (audit) report to be run over night and delivered the next day.

At least the following data fields appear on this screen: (1) the CHAIN TYPE field indicates the type of chain such as grocery store chain, or super store chain; (2) the SOFTWARE VENDOR NAME and PHONE NO. fields are used to indicate who the particular provider software vendor is and a contact telephone number; (3) the CONTRACT DATE field indicates the date the chain enrolled in the program; (4) the FIRST BUY DATE field indicates the date of the first transaction with CHARMS; (4) the TERMINATION DATE field indicates the date the chain is no longer participating in the program—this date can be added in advance of the effective date and used as a key for pharmacy eligibility edits; (5) the REMIT TO field is used to indicate if payments are to be made to the individual pharmacy or a single payment made to the chain headquarters; (6) the AVG. DAILY RECEIVABLES field indicates the chain's total daily third party receivables—this information is used for monitoring and fraud protection, as described elsewhere in this disclosure; (7) the BANK NAME, ACCOUNT NO., and BANK ROUTING fields are used to identify the chain's bank payment information; (8) the DISC. RATE and PREM. RATE fields indicate contracted discount rates, both the standard rate and premium rate if applicable; (9) the YTD# of CLAIMS and YTD $ OF CLAIMS are used to show the chain's total status as of a particular date, and could be used in determining if the discount rate requires re-negotiating—when the chain belongs to a special buying group, there may be a need to access that screen from one. To do this, the System Operator makes sure the BUYING GROUP No. has been entered on the chain profile screen, and presses the PF key assigned for PHARMACY/BG PROFILE.

FIG. 17M shows the "buying group profile" screen, which provides information regarding the specific buying group to which the providers belong. In some cases, pharmacies and chains join with others in order to negotiate better rates from suppliers. These buying groups may also negotiate as a single entity with the System Operator for better discount rates and services. The buying group code is assigned by the System Operator and used as a reference number to associate each member with the buying group, whether a chain or individual pharmacy.

FIG. 17N shows the "PFI bulletin" screen, which is used to generate and display any System Operator bulletins which would be sent out to all member providers during daily on-line inquiries. To display the bulletin, from the main menu screen the System Operator enters the date in question and marks the PFI BULLETIN REVIEW section to display this screen. For review of previous bulletins, the System Operator need only change the transaction date, or return to the main menu screen to inquire on another bulletin.

The BULLETIN ENTERED BY field contains the identification of the person entering new bulletin information and indicates to the system to replace any existing bulletin with this new information. The previous bulletin is then moved to a history file. In one embodiment, CHARMS restricts entry of bulletin information to particular PINs such as those for the supervisor level or higher.

FIG. 17O shows the "inquiry inactive list" screen which is used by the System Operator to list providers which have not transmitted any inquiries for deposit information in over a specified time frame. In cases of chains, the chain profile/pharmacy profile files provide a cross reference. As long as the chain has accessed this data, all associated pharmacies will be considered to have done the inquiries.

Based on the information on this screen, the System Operator calls the provider and inquires as to why it has not transmitted inquiries, offers assistance if needed, and records the reasons should they elect not to transmit these at all. In these cases, an exception would be opened for future reference.

FIG. 17P shows the "payor profile" screen, which provides payor information to the System Operator pertaining to the specific provider indicated. This information describes the relationship between the provider and the processor, plan and obligor for the specified prescription number. To display this screen, the System Operator enters the NABP number and the prescription number, and selects PAYOR PROFILE from the main menu screen.

If a report is required to fully respond to the request from the service provider, the System Operator transmits a request for a report through the help desk main menu screen. FIG. 17A. In one embodiment of the invention, summary and detail information is available on-line for 60 days or two billing cycles. Any additional data is retrievable from historical files. If a date is entered by the System Operator that is more than 60 days prior to the current day's date, the System Operator receives the following error message: "DATA NOT AVAILABLE ONLINE, PRESS PFxx FOR SUMMARY REPORT, OR ORDER DETAIL REPORT VIA MAIN MENU". Once the appropriate PF key is pressed, the message would read "REPORT REQUESTED". For a standard detail report, the System Operator enters the NABP number, marks the "ORDER DETAIL REPORT" item, and presses ENTER. If the chain code is entered, the only options available are summary reports for the date(s) entered or the chain profile screen.

Figure 18:
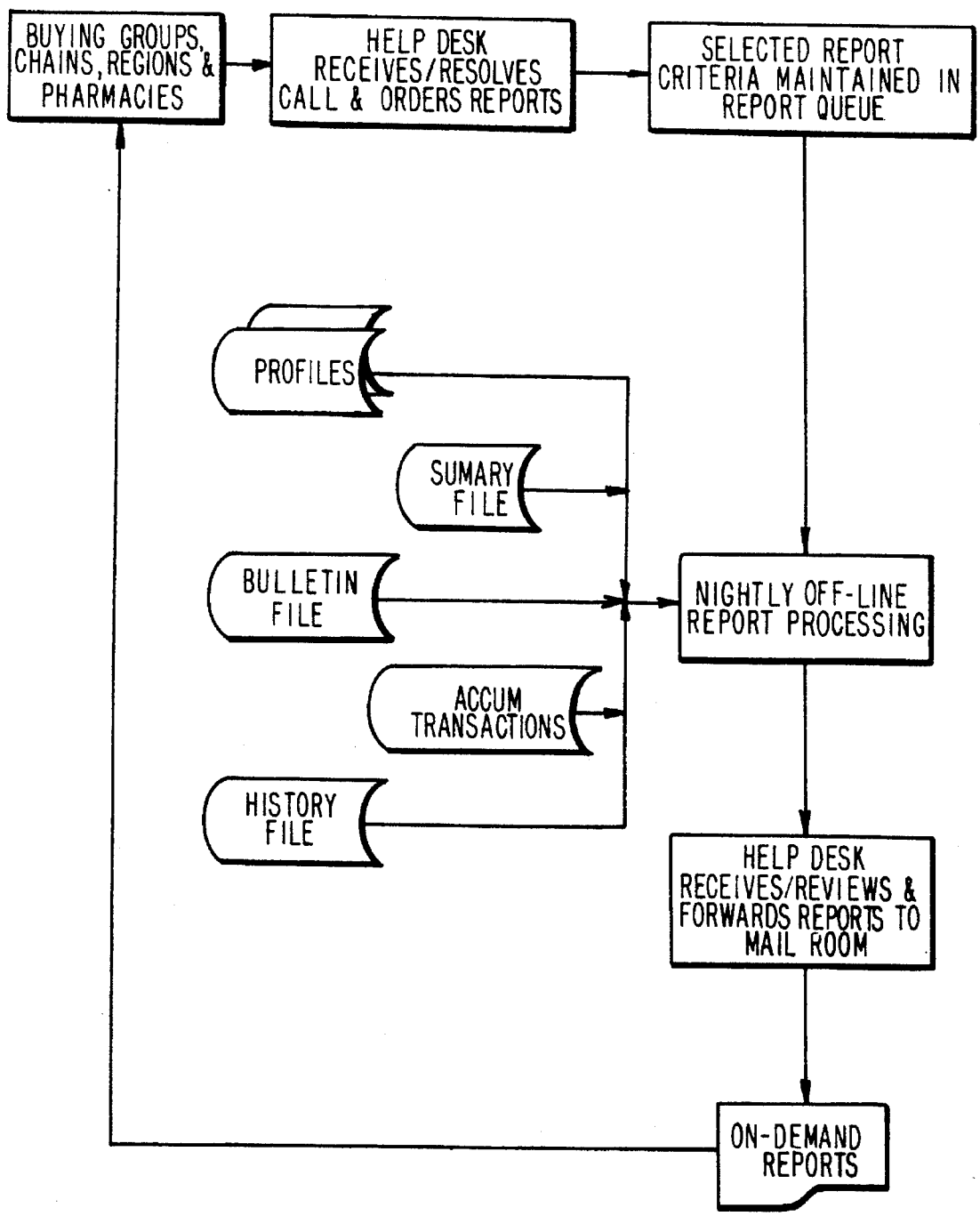
FIG. 18 shows the structure of one embodiment of CHARMS's demand report system.

All standard detail reports and summary reports are formatted the same way as the inquiry screens. To generate a report, CHARMS accesses a number of database files, including the provider and payor profile records, the summary file, the bulletin file, the accumulated transaction file and the history file. FIG. 18. To minimize system utilization, CHARMS generates the report during off-line processing, and prints out a hard copy to be forwarded to the help desk for mailing to the service provider.

3. Provider On-Line Inquiries

Figure 19:
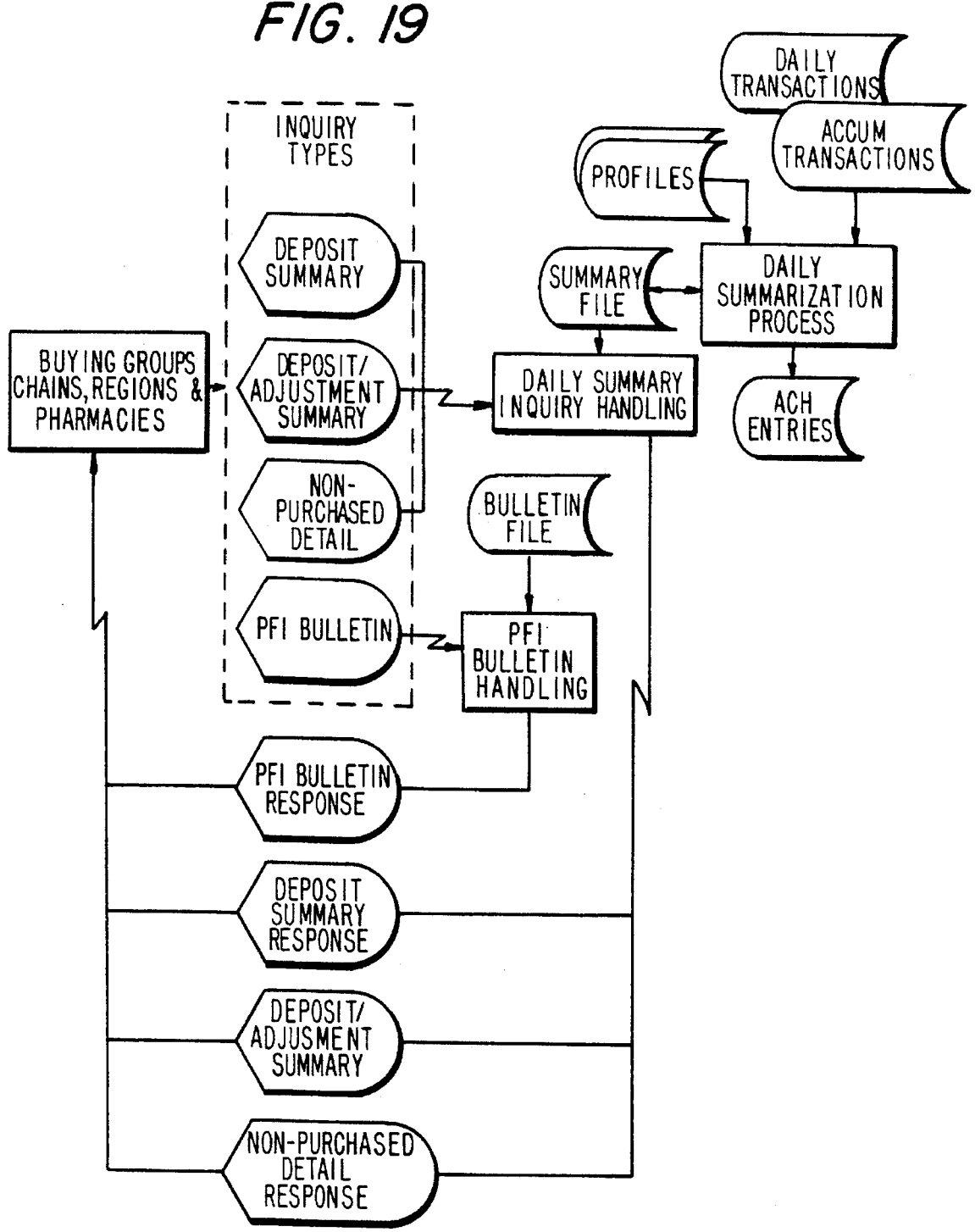
FIG. 19 shows an the structure of one embodiment of CHARMS's on-line inquiry and response system.
Figure 25:
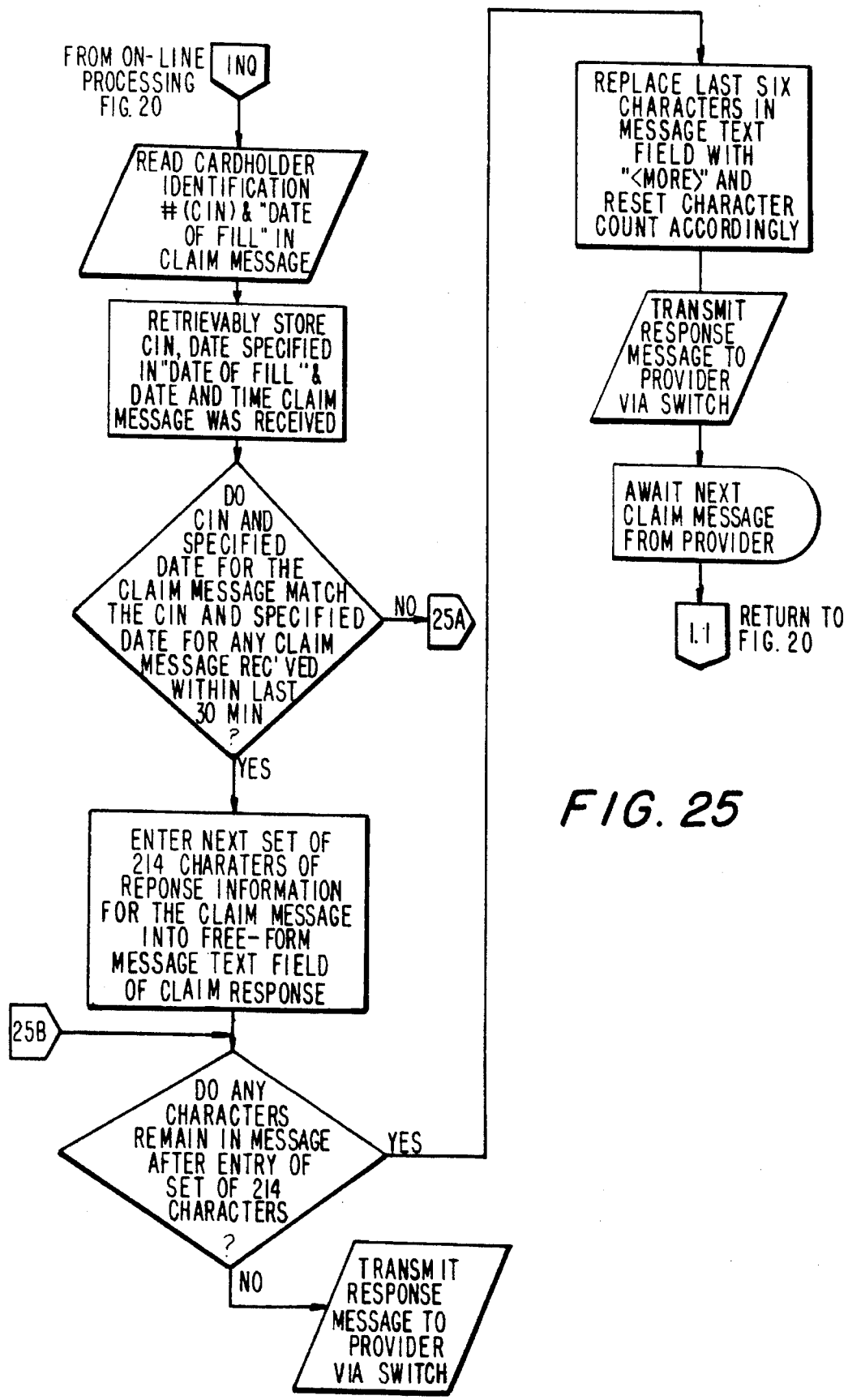
Figure 25A:
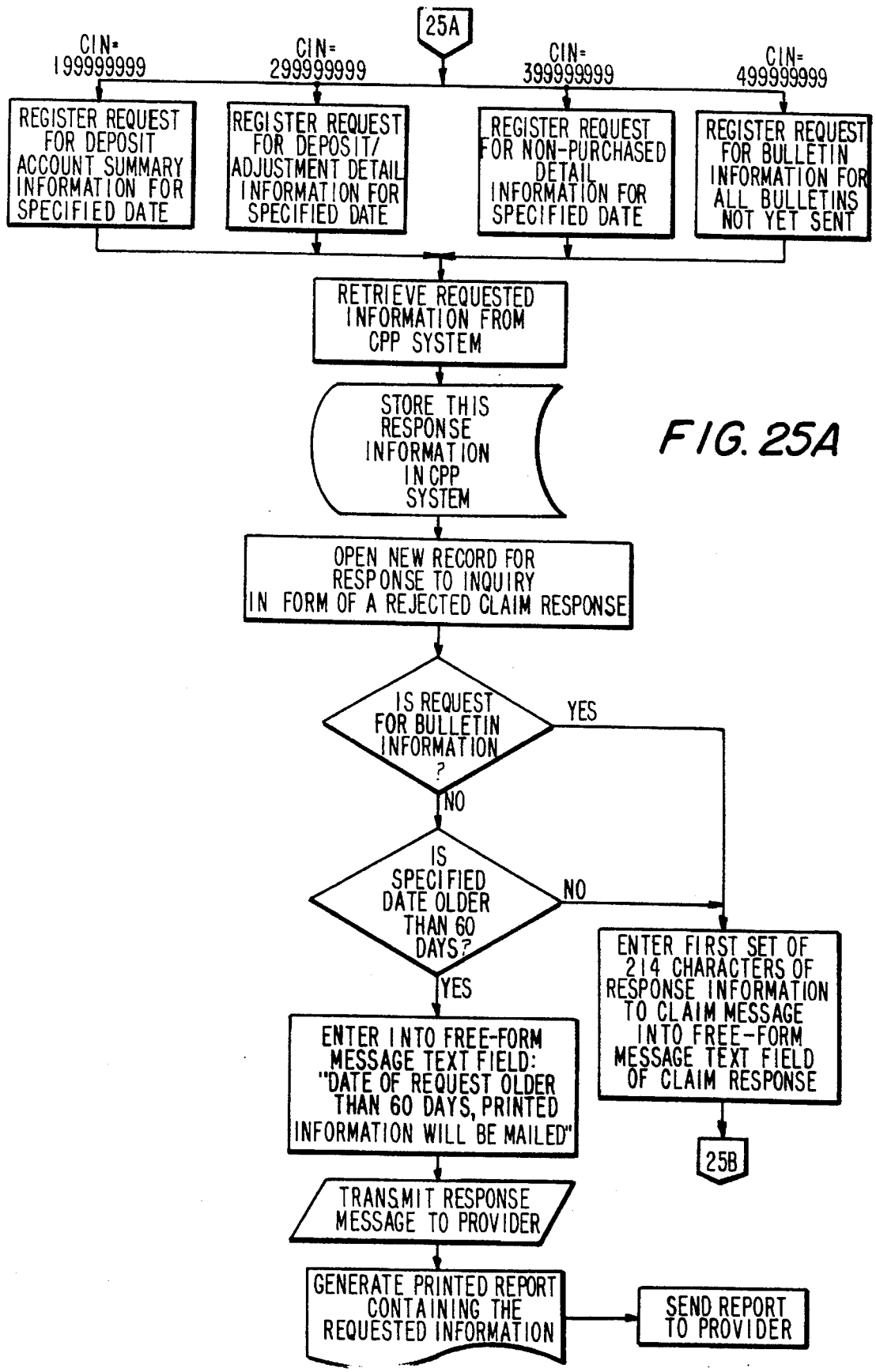

CHARMS also provides the means for service providers to request and obtain information stored in CHARMS through online inquiry. FIG. 19 provides an overview of the structure of one embodiment of the on-line inquiry and response subsystem, and FIG. 25–25A is a flow chart representing the on-line inquiry and response process.

In one embodiment of the present invention, there are four (4) types of information available through on-line inquiry: summary deposit information; deposit/adjustment detail information; non-purchased detail information; and bulletin information. Each type of information is associated with a particular code that is placed in the patient cardholder identification number field in a claim message. The codes in one preferred embodiment are: "199999999" for a deposit summary inquiry; "299999999" for a deposit/adjustment detail inquiry; "399999999" for a non-purchased detail inquiry; and "499999999" for a bulletin inquiry.

The deposit summary inquiry is used by the provider to view summary information regarding his daily deposit. In one embodiment, this information contains: (1) total dollars and number of transactions for purchased claims; (2) total dollars and number of reversals pertaining to purchased claims; (3) total dollars and number of transactions for non-purchased claims; (4) total dollars and number of transactions for credits; (5) total dollars and number of transactions for adjustments; (6) total dollars and number of processor fees; (7) total dollars for discount fee; (8) total dollars of net deposit; (9) deposit number (ACH Tracer Number); (10) prescription number of the last purchased claim for the specific transaction date; and (11) a bulletin indicator, which indicates when bulletin information is available for inquiry.

In another, preferred embodiment, the deposit summary information transmitted by CHARMS in response to a deposit summary inquiry from a provider includes: (1) the date of the information requested; (2) page numbers, represented as "PAGE n OF n", for each inquiry; (3) total dollars and number of transactions for purchased claims; (4) total dollars and number of reversals pertaining to purchased claims; (5) total dollars and number of transactions for non-purchased claims; (6) total dollars and number of transactions for credits; (7) total dollars and number of transactions for adjustments; (8) total dollars for a System Operator service fee; (9) total dollars for net deposit; (10) prescription number of the last claim for the specific transaction date; (11) a MORE/END indicator, which indicates when there are additional pages to follow or when the last page has been sent; and (12) the bulletin indicator.

The deposit/adjustment detail inquiry is used by the provider to view detail information regarding his daily deposit. In one embodiment, this information contains: (1) total dollars and number of transactions for purchased claims by processor; (2) total dollars and number of reversals pertaining to purchased claims by processor; (3) total dollars and number of transactions for non-purchased claims by processor; (4) total dollars and number of transactions for credits by processor; (5) total dollars and number of transactions for adjustments by processor; (6) total dollars and number of transactions for purchased claims; (7) total dollars and number of transactions for adjustments; (8) total dollars and number of processor fees by processor; (9) total dollars for discount fee; (10) total dollars of net deposit; (11) deposit number (ACH tracer number); (12) prescription number of the last purchased claim for the specific transaction date; and (13) the bulletin indicator.

In another, preferred embodiment, the deposit/adjustment detail information transmitted by CHARMS in response to a deposit/adjustment detail inquiry from a provider includes: (1) the date of the information requested; (2) the page numbers for the inquiry; (3) total dollars and number of transactions for purchased claims by processor; (4) total dollars and number of reversals pertaining to purchased claims by processor; (5) total dollars and number of transactions for adjustments by processor; (6) total net dollars by processor; (7) the MORE/END indicator; and (8) the bulletin indicator.

The non-purchased detail inquiry is used by the provider to view detail information not included in his daily deposit. In one preferred embodiment, this information contains: (1) total dollars and number of claims not purchased by group number within each processor; (2) total dollars and number of transactions for adjustments by group number within each processor; (3) total dollars and number of non-purchased claims; (4) total dollars and number of adjustments; (5) total dollars and number of processor fees by processor; (6) total dollars of net deposit; (7) deposit number (ACH tracer number); and (8) the bulletin indicator.

In another, preferred embodiment, the non-purchased detail information transmitted by CHARMS in response to a non-purchased detail inquiry from a provider includes: (1) the date of the information requested; (2) the page numbers of the inquiry; (3) the prescription numbers of each claim not purchased by CHARMS within each processor; (4) the MORE/END indicator; and (5) the bulletin indicator.

The CHARMS help desk uses the bulletin screen, FIG. 17N, to enter bulletin information to be transmitted to providers upon on-line request. The beginning and ending dates are entered and the message remains available for inquiry until the ending date, or until the message is manually removed or updated. In one preferred embodiment, the bulletin information includes: (1) the date of the information requested; (2) the page numbers for the inquiry; (3) the bulletin information in free-form text; and (4) the MORE/END indicator.

After each daily summarization process, the daily summaries and accumulated transaction files are updated with detail information regarding each provider's daily activity. To facilitate a quick response to an on-line inquiry, CHARMS accesses the daily summaries and accumulated transaction files and writes to files in 214 character blocks the four types of information available for inquiries in one embodiment of CHARMS. Whenever the information exceeds 214 characters, the characters "<MORE>" are written into the last six (6) positions of each page except for the last to indicate to service providers that they need to submit a new inquiry message to receive the remainder of the information. In the last page, the characters "END" are written into the last three (3) positions of the message.

To prepare to transmit on-line inquiries, service providers create in their respective systems a new processor profile for CHARMS. They also create patient profile records with patient cardholder identification numbers corresponding to the codes for the different inquiry types set forth above, e.g., "199999999" for a deposit summary request. To transmit an inquiry, providers open a claim record using the desired patient profile record and insert the date of the information requested into the "date of fill" field. In one embodiment, the default for the date of fill field is the current day's date. The balance of the claim fields are zero or space filled, or may contain data which CHARMS will ignore. When the switch receives the claim message, it identifies it as a request by the System Operator's BIN "004675" and the cardholder identification number, and forwards the message to CHARMS.

Upon receiving the claim message, CHARMS reads the file containing the requested information, opens a record in the form of a NCPDP-standard rejected claim response, and writes the requested information into the message text and extended message text fields of the rejected claim response. If the requested information is greater than 214 characters, CHARMS transmits the response to the provider which includes the characters "<MORE>" at the end of the message, and sets a flag to queue up the next block of 214 characters in anticipation of the next inquiry for additional pages from the provider. CHARMS marks the time that the flag is set, and if a specified time period, which in one preferred embodiment is 30 minutes, expires without additional inquiries for the additional pages, the flag is dropped and responses to any subsequent requests for the information begin with the first page. If the provider re-inquires with the same claim transaction within the time limit, CHARMS responds with another standard reject response and the next page of information. This process continues until the last page is received by the provider and the message text no longer contains the "<MORE>" indicator. Once all pages of the requested information have been transmitted, CHARMS marks the NABP number as having received the information. In another embodiment the invention, CHARMS does not wait to receive additional inquiry messages from the service provider, but transmits the additional pages in consecutive response messages.

In one embodiment, the System Operator provides newly subscribing pharmacies with an installation kit which provides instruction on how to modify existing records, as set forth above, so that it will be able to transmit an inquiry to CHARMS. Importantly, the records that are being modified still adhere to specifications set by NCPDP and therefore no changes need be made to providers' software which already adheres to those specifications. Although NCPDP has provisions for making changes to its standard specifications, such changes often take years to be implemented. CHARMS, by using the current specifications, is capable of implementing its on-line inquiry and response system without waiting for such NCPDP changes. Nevertheless, if such NCPDP changes are made so as to incorporate CHARMS's inquiry requirements and alleviate the need for any record changing, the practice would still fall within the present invention.

As stated above, service providers can take advantage of CHARMS using their existing in-house software packages, and do not need to purchase new software. However, service providers will have the option of purchasing additional software for use in file transfer operations. This software will work instead of, or in addition to, CHARMS's inquiry and response system described herein. In one embodiment of the invention, this software is an asynchronous file transfer service, such as the Generic File Transfer AFT Service available through NDC, which transfers files using an asynchronous protocol directly into an async pad. Other commercially available asynchronous file transfer services may also be used.

4. Electronic Bulletin Board

In one embodiment of the present invention, CHARMS incorporates an on-line electronic bulletin board system to facilitate communications between and among on-line industry participants including service providers, payors, software developers, and the System Operator. The on-line bulletin board includes the following functions: (1) access to transaction, bulletin, and management information; (2) general access to business and public information such as stock prices and healthcare industry news; and (3) message service among on-line industry participants such as providers, TPAs, and software developers. In one embodiment of the invention, CHARMS incorporates a commercially available electronic bulletin board system such as BBS WILDCAT®, available through Mustang Software Company of Bakersfield, Calif.

5. Provider Reports

CHARMS generates periodic summary reports for service providers. These reports are generated automatically on a regular basis, such as at the end of each month, or upon request from a service provider as shown in FIG. 18. They can be generated and sent to the service provider in paper form or via electronic media such as on magnetic disk or via modem over communication lines. In addition, CHARMS can generate the provider report in a print file, and claim detail in electronic media. Among other possible information, the reports can include all or some of the following: claims purchased; discount fees; processor fees; credits and adjustments; deposits; ACH number; and claims not purchased. The statement layout in one embodiment of the invention is in the same format as an approved claim NCPDP format version 3.2. See FIGS. 36–41 for examples of reports generated by one embodiment of CHARMS.

To generate the statement, CHARMS accesses a number of databases, such as the provider and payor profiles, the reconciliation exception file, the history file, the summary file, the bulletin file, and the transaction files.

6. Payor, Obligor, Processor and Plan Profiles

Before CHARMS can authorize the purchase of any service provider's accounts receivable, the initial payor and obligor's creditworthiness scoring databases should be established. The procedure for establishing such database involves: (a) identifying and prioritizing the initial list of payors and obligors—In one embodiment of the present invention, this list is developed from payor sheets supplied to pharmacies. In another embodiment, payors and obligors are identified from the records of prospective subscribing pharmacies. In yet another embodiment, information for this list is obtained directly from the payors and obligors themselves; (b) determining the data fields for the payor, obligor, and processor profiles—see FIG. 34 for an example of the data fields used in one embodiment of the present invention; (c) identifying the data sources—the sources include NDC's and pharmacies' files, credit rating agencies and the payor and obligor records; and (d) gathering the data and inputting it into CHARMS.

This process is repeated on a regular basis to update these profile databases with information obtained from: payor or processor notices to service providers of plan changes; CHARMS creditworthiness scoring changes; unidentified payor transactions discovered during daily processing resolved through research; and verifiable information obtained from industry sources, news media, and industry journals.

In one embodiment of CHARMS, the payor, obligor, and processor profile databases are accessed during the following functions: transaction processing; daily summarization processing; payor RA reconciliation; and customer services. CHARMS also provides the means to produce reports of the payor\obligor\processor databases for review of data accuracy and completeness and for management information.

In one preferred embodiment, CHARMS also creates and updates a plan profile database which is used during daily processing to make buy/decline decisions and for determining summarization levels in reporting. Because certain payors use multiple rule-off and payment schedules for certain obligor clients, CHARMS should be able to distinguish claims by payor and plan to effectively manage the claims processing, credit, and reporting functions. The plan profile records contain at least the following data fields, which represent the attributes that define the relationships among the obligors, payors and processors: (1) plan name; (2) plan number; (3) obligor name; (4) obligor number; (5) payor name; (6) payor number; (7) processor name; (8) processor number; (9) cycle rule-off schedule; (10) payment schedule; (11) RA receipt schedule; and (12) buy/decline code.

To create and update the plan profile database, CHARMS accesses data from the payor, obligor, and processor profiles, and incorporates data retrieved from the cycle rule-off, payment, and RA schedules. CHARMS provides for the production of reports showing any changes made to the plan profile database.

Figure 26:
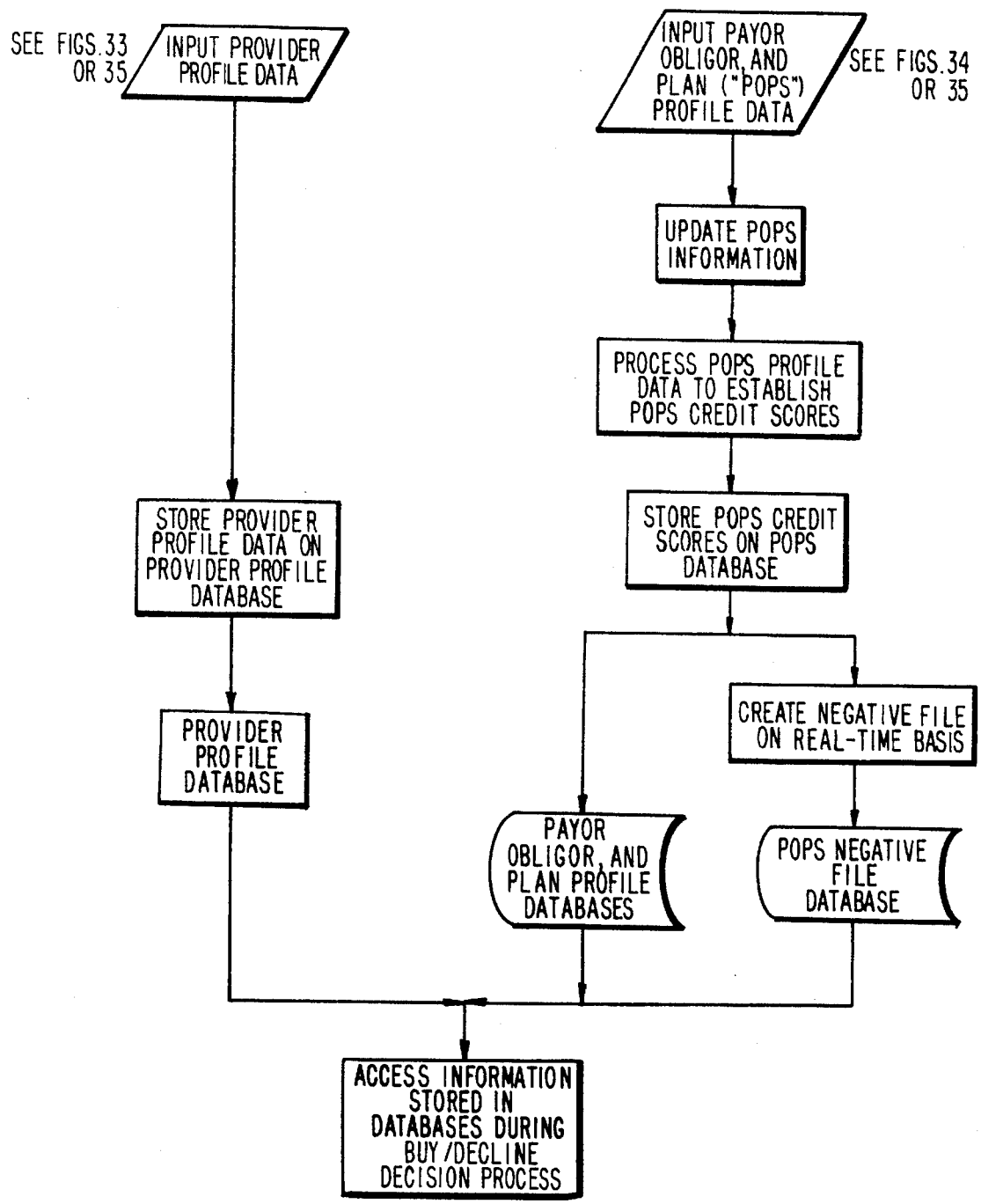

See FIG. 26 for a flow chart representing one embodiment of the database creation process.

7. Database Design

CHARMS creates and regularly updates a suite of database files to facilitate the data requirements of CHARMS's securitization, cash management and forecasting, general accounting, management information, and collections systems. FIGS. 4–6 show the database file formats for field by field layouts in one embodiment of the present invention. In one preferred embodiment, the database files are in an IBM®—compatible ".DBF" database format.

The primary source of the data for the database files are, in one embodiment of the invention, the following files: (1) the RR Trans file, which stores the transactions processed before the current day; (2) the Daily Summary file, which is created as a result of the daily summarization process discussed in detail below; (3) the ACH Detail file; (4) the provider profile file; (5) the payorobligorprocessor profile; and (6) the Lock Box Receipts file, which stores data received from the System Operator's lock box bank, enhanced by converting the Processor_NBR or Payor Name fields into a BIN_NBR. In addition, the Batch_NBR will match the lock box receipt with the corresponding RA Tape.

The Daily RR-NABP file stores the current day's transactions summarized by Bin_NBR for each NABP_NBR, Group_NBR, or Chain_NBR, whichever is the highest level. The Daily RR—Obligor file stores the current day's transactions summarized by Bin_NBR/Plan_NBR/Obligor_NBR within each BIN. The RA Receipts Summary file stores the daily run of RA tapes processed and matched against the RR Trans file. Each record represents a summary of one RAtape. The Diff_from_LB field, a comparison to the Lock Box receipt, is made based on Batch_NBR. The Accounts Receivable Summary file stores the summary amount by Plan_NBR/Obligor_NBR within each BIN, all unreconciled purchased claims, adjustments, and RA amounts. It is also used for cash projections and budgeting by CHARMS. The Accounts Receivable Detail file stores the same as the Accounts Receivables Summary file, except that it also includes detail records at the transaction level.

The Cash Due/Past Due file lists by BIN the summary amounts due for the current day or past due amounts for which no cash was received, regardless of amount, or with an amount open from prior cutoff dates greater than some modifiable dollar amount, which in one preferred embodiment is $50,000. The ACH Detail file stores a detail listing of all ACH transfers made. The PFI Provider Profile Update file stores all records updated in the past day. The BIN#/Plan#/Obligor# Profile Update file stores all records updated in the past day. The Daily Summary file stores the summary records for the past day.

The Provider Adjustments file stores the current day's detail adjustment transactions to be passed through to a provider. The Payor Adjustments file stores the current day's detail transactions of all reconciliation exceptions to be charged back to the payor. In the Negative Balance Summary file, the PRIOR_DAYS_BAL field is zero after the first instance. of a negative balance, and the END_NEG_BAL field may be zero if the negative balance is reduced to zero in the current day.

8. Creditworthiness Scoring System

Figure 24:
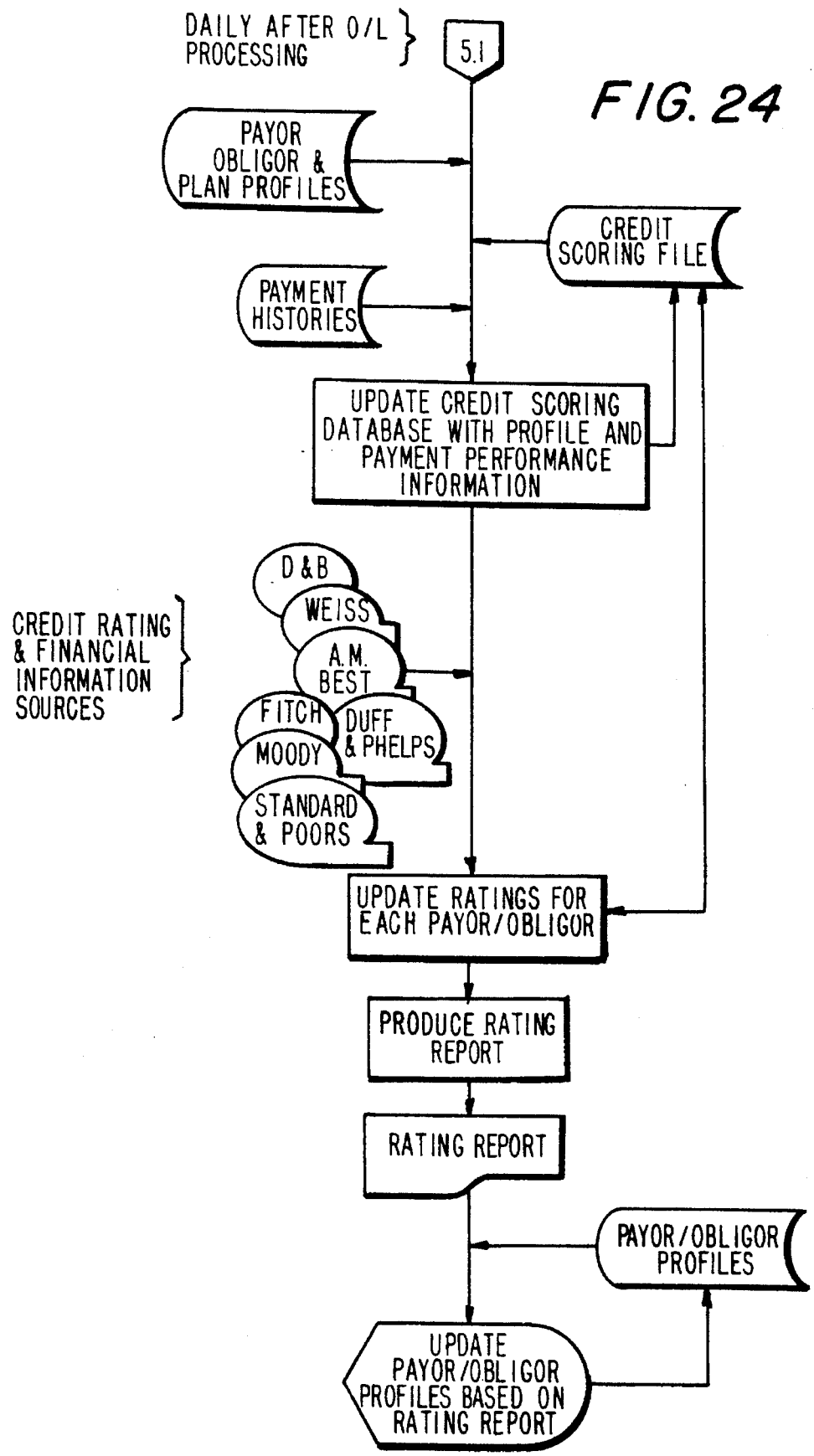

To establish the database of creditworthiness scores and statuses for payors and obligors, CHARMS utilizes, in one embodiment of the present invention, a creditworthiness scoring computer software system ("Creditworthiness Scoring System" or "CSS") which, among other things, examines credit agency ratings tapes that relate to the payors and obligors. In this embodiment, CSS utilizes an algorithm, set forth below, developed by the inventors. FIG. 24 shows an overview of CHARMS's creditworthiness scoring process for one embodiment of the present invention.

CHARMS's CSS uses two general steps in calculating a creditworthiness score and status for each payor and obligor. One step is the calculation of a performance indicator which represents the payment performance and other quantitative attributes of the payors and obligors. Another step is the calculation of an overall score for each payor and obligor using a weighted total of the performance indicator in conjunction with creditworthiness indicators available through public sources such as A.M. Best, Weiss, D&B, and others. See FIG. 24.

In one embodiment, CHARMS calculates the performance indicator for a given payor or obligor using the following formula:

$$PI=((AD*ND)-SF)/FD,$$

where PI is the performance indicator, AD is the amount of money due during a given payment cycle from the payor or obligor, ND is the number of days such amount is overdue from the payor or obligor for the given payment cycle, SF is the total of any secured funds on deposit such as escrow and other guarantees from banks or parent corporations such as letters of credit or corporate guarantees, and FD is the average amount due from the payor or obligor over an average cycle.

In one preferred embodiment of the invention, CHARMS calculates the performance indicator using the following formula:

$$PI'=(100) \cdot (DDO-SF)/FD,$$

where DDO is the Dollar-Days Outstanding, which is the product of the number of days that payments currently due are late and the amounts due from a given payor or obligor, and SF and FD are as defined above. PI is then obtained by rounding PI' to the nearest multiple of five.

CHARMS sets negative values of the performance indicator (i.e., those in which the secured or guaranteed funds exceed the dollar-days outstanding) to zero.

The variables used to calculate the performance indicator are stored in the profile databases (see FIGS. 33–35) and regularly updated by CHARMS for use in calculating up to date performance indicators for all payors and obligors.

In general, the performance indicator represents the ratio of the unsecured, unguaranteed amounts currently due from a payor or obligor to the payor's or obligor's historical debt load (as determined by the amount due during previous specified periods of time). A low PI (e.g., 0–15) indicates that the amount currently overdue and unsecured from a payor is relatively small in relation to the average volume of activity of that payor. Conversely, a high PI (e.g., 80–100) is indicative that a payor is currently overdue on a relatively large sum that is not secured or guaranteed. In general, the lower the performance indicator, the more willing CHARMS is to extend credit to a payor or obligor.

For the other step in calculating the creditworthiness scores and statuses, CHARMS uses publicly available credit ratings which it converts into numerical form according to a pre-defined scheme. For instance, in the numerical rating scheme used in one preferred embodiment of the invention, FIG. 49, each of the publicly available ratings is converted into a scale of 21 rating categories, ranging in value from 0 to 20. The highest rating category of 20 is equivalent to a S&P AAA rating, a Moody's Aaa rating, a Fitch AAA rating, a Duff & Phelps AAA rating, an A.M. Best HIA rating, and a performance indicator equal to zero. Similarly, the other ratings are assigned to other, proportional rating categories. For rating schemes which utilize a range of ratings smaller than the range of rating categories, certain categories would not be assigned. a rating. For example, in FIG. 49, the Weiss ratings have no entry in the 20, 16, 15, 11, 10, 6, 5, and 2 rating categories. In addition, there is a rating category assigned for payors and obligors that are not rated by the rating agency (rating category of 1 in FIG. 49), and for payors and obligors that are listed by the rating agency as having defaulted or failed. The performance indicator is also converted into the same numerical rating categories, as shown in FIG. 49.

Using the rating categories, CHARMS, in this embodiment, determines the creditworthiness scores of the payors and obligors in accordance with the following formula:

$$CS(q) = \sum_{i=1}^{n} w_i \cdot R(q)_i$$

where q is a given payor or obligor, CS(q) is the creditworthiness score for the payor or obligor, $w_i$ are weighting factors assigned to each of the individual rating agencies determined, in part, by their anticipated importance to the relevant investor market, $R(q)_i$ are the numerical rating categories to which the payor's or obligor's ratings are assigned for each of the individual rating agencies used, and n is the number of individual ratings used, including the performance indicator.

To illustrate, one preferred embodiment of the present invention uses n=8 ratings: S&P, Moody's, Fitch, Duff & Phelps, A.M. Best, Weiss, D&B, and the performance indicator. The weighting factors $w_i$ are: 0.5 for S&P, 0.5 for Moody's, 0.375 for Fitch, 0.25 for Duff & Phelps, 0.25 for A.M. Best, 0.0625 for Weiss, 0.0625 for D&B, and 1.0 for the performance indicator. See FIG. 49. Using these values, the creditworthiness scores CS(q) range from 0.0 to 60.0. To determine the creditworthiness score for a given payor or obligor, CHARMS multiplies the rating categories for each rating by the weighting factor, and sums these products. The creditworthiness score for the entity with the ratings and performance indicator as highlighted on the table in FIG. 49 would be 43.5625, thus putting it in the second 25% of the score range.

The exact value of a creditworthiness score is generally not as important to CHARMS as the creditworthiness status, which is obtained from the percentage that the creditworthiness score represents out of the total range of possible creditworthiness scores permitted by the particular rating scheme used (see, e.g., FIG. 49, column J). In one preferred embodiment, there are three ranges: top, mid and bottom range. In this embodiment, a payor or obligor with a creditworthiness score in the top 25% of the score range (e.g., scores of 45–60 in FIG. 49) is considered by CHARMS as a good credit risk, and interaction consists of persistent follow up to continually improve collection results. A payor or obligor with a creditworthiness score in the second 25% or mid range is considered a moderate credit risk, is notified that it should improve its performance, and is followed closely to insure immediate action if its financial condition deteriorates. A payor or obligor with a creditworthiness score in the bottom 50% of the range is considered a poor credit risk and is notified that any late payments should be cured immediately and that failure to cure within 48 hours of notice results in its being "cut-off" at the end of that time, i.e., that CHARMS will decline to purchase claims related to that payor or obligor.

In addition to the quantitative value of the performance indicator and creditworthiness score, CHARMS can utilize qualitative negative information regarding payors and obligors received from news reports that warrant consideration in credit decisions. In this embodiment, the wire service reports field of a creditworthiness database file is updated to indicate the existence of negative information, and a negative sign is added to the value of the PI stored in the creditworthiness database file. The negative sign in the performance indicator field is carried through to the records in the payor and obligor profile databases, indicating that additional, negative information should be considered by the System Operator along with the overall quantitative value of the creditworthiness score.

As explained above, based on the CSS algorithm, CHARMS determines whether to continue buying receivables related to particular payors and obligors. If CHARMS determines that certain receivables should not be bought, it notifies those payors and obligors that their accounts are under review and that CHARMS will no longer purchase their claims unless within 48 hours they: (1) improve their credit ratings in some acceptable fashion; (2) pay all outstanding amounts; or (3) in general, begin to act more creditworthy (e.g., by satisfying their obligations in a timely manner). CHARMS generates a notice to the pharmacy as soon as the 48 hour time limit has elapsed that CHARMS will no longer purchase claims proffered on account of those payors and obligors who have not satisfactorily responded within 24 hours. Finally, the CSS will indicate in the payor and obligor profile databases or, in one embodiment, in the Negative File, defined below, that such claims will be declined in the future.

9. Payor Services Procedures

Figure 46:
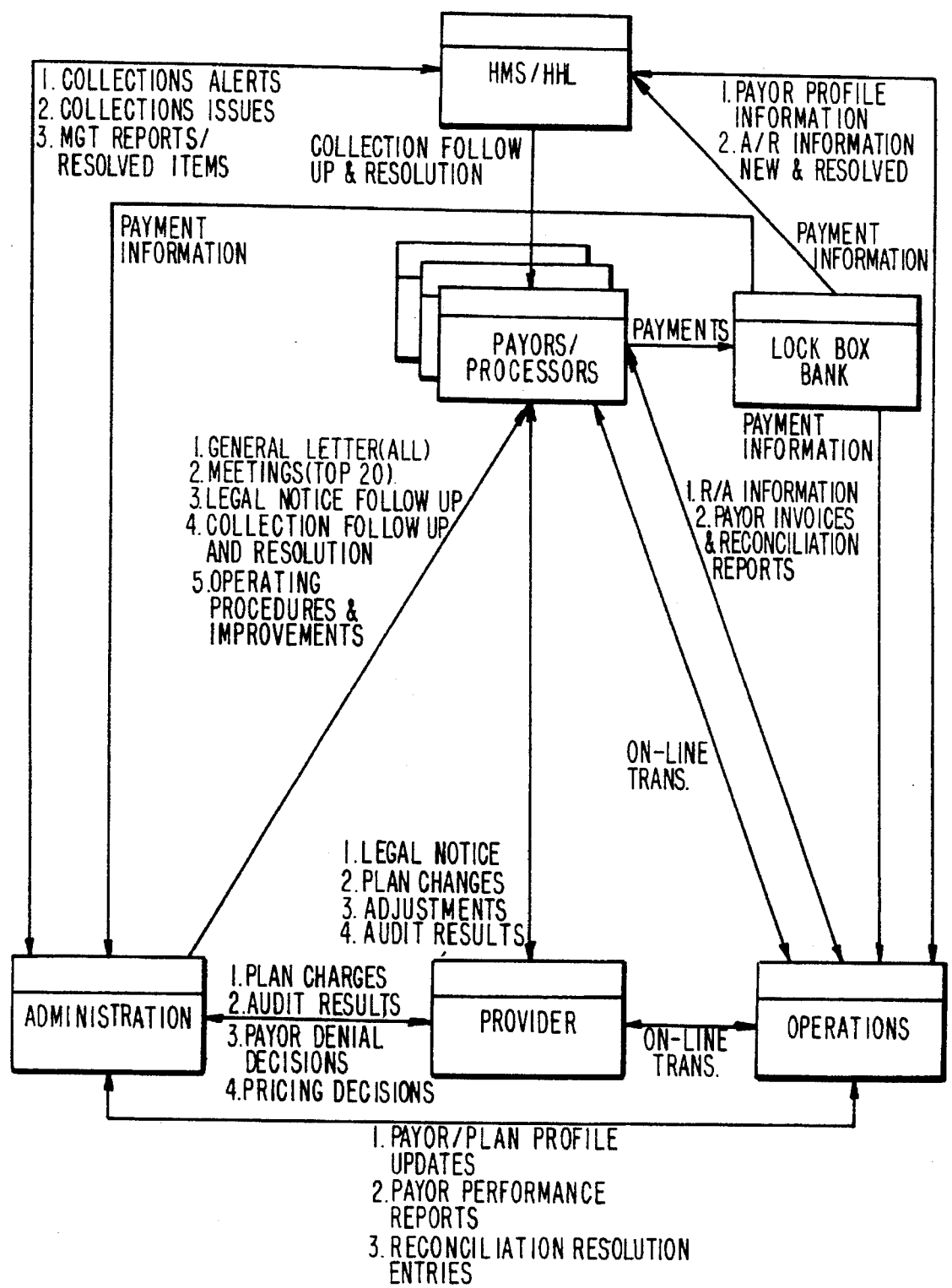
FIG. 46 shows the structure of the payor services transaction flow in one embodiment of CHARMS.
Figure 47:
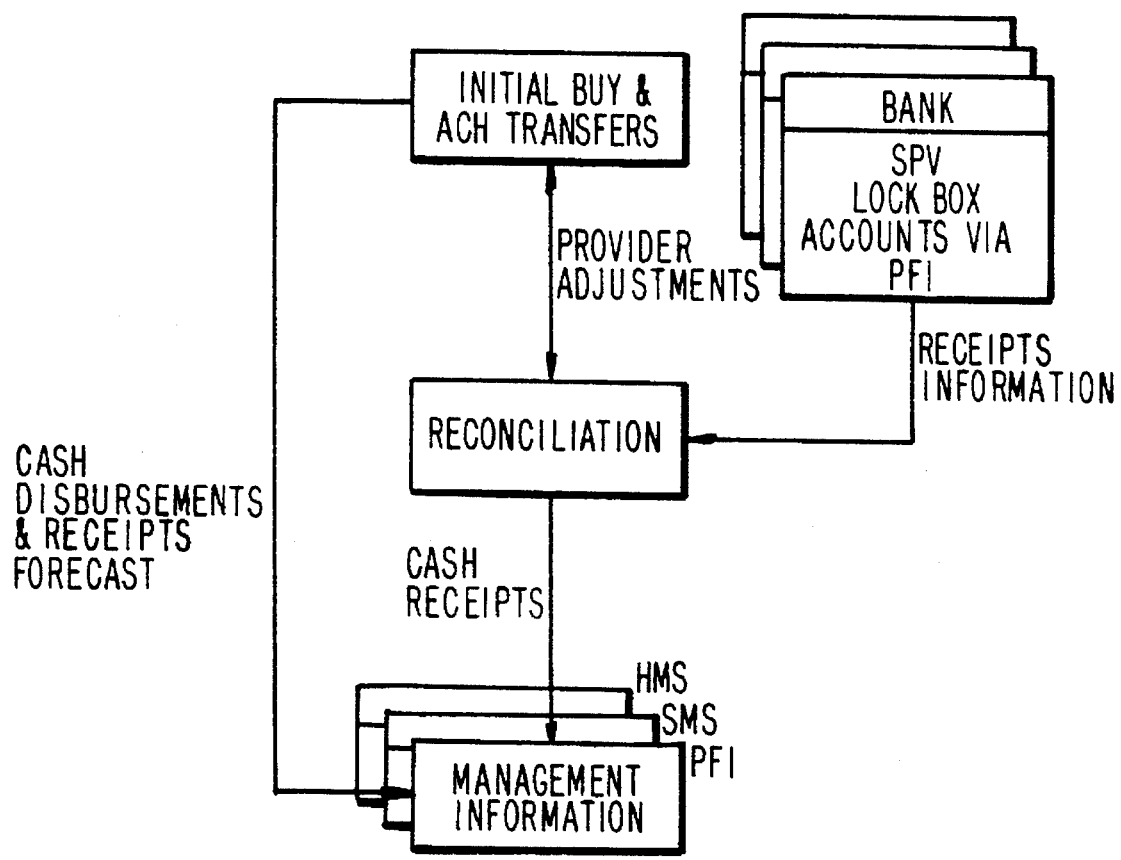
FIG. 47 is a structural chart of the funds management functionality in one embodiment of CHARMS.

CHARMS provides the means to effect and maintain efficiently operating relationships with processors and payors to insure timely payments while minimizing credit and operating risk. The means include the functions providing for creation and update of the profile databases, the generation of reports, the reconciliation of RAs and payments, and the collections protocols. In addition, updated payor and processor information is used to update the HMS/HHL file, which is used to implement the collections procedures according to pre-defined protocols. The payor and processor identification information transferred by CHARMS to the HMS/HHL file includes the following data fields: (1) name; (2) identification number; (3) address—routine; (4) contact name—routine; (5) contact phone number—routine; (6) address—escalated; (7) contact name—escalated; (8) contact phone number—escalated; and (9) cycle rule-off dates. FIG. 46 shows an overview of the payor services transaction flow.

B. CHARMS Claims Processing Procedures

Figure 11:
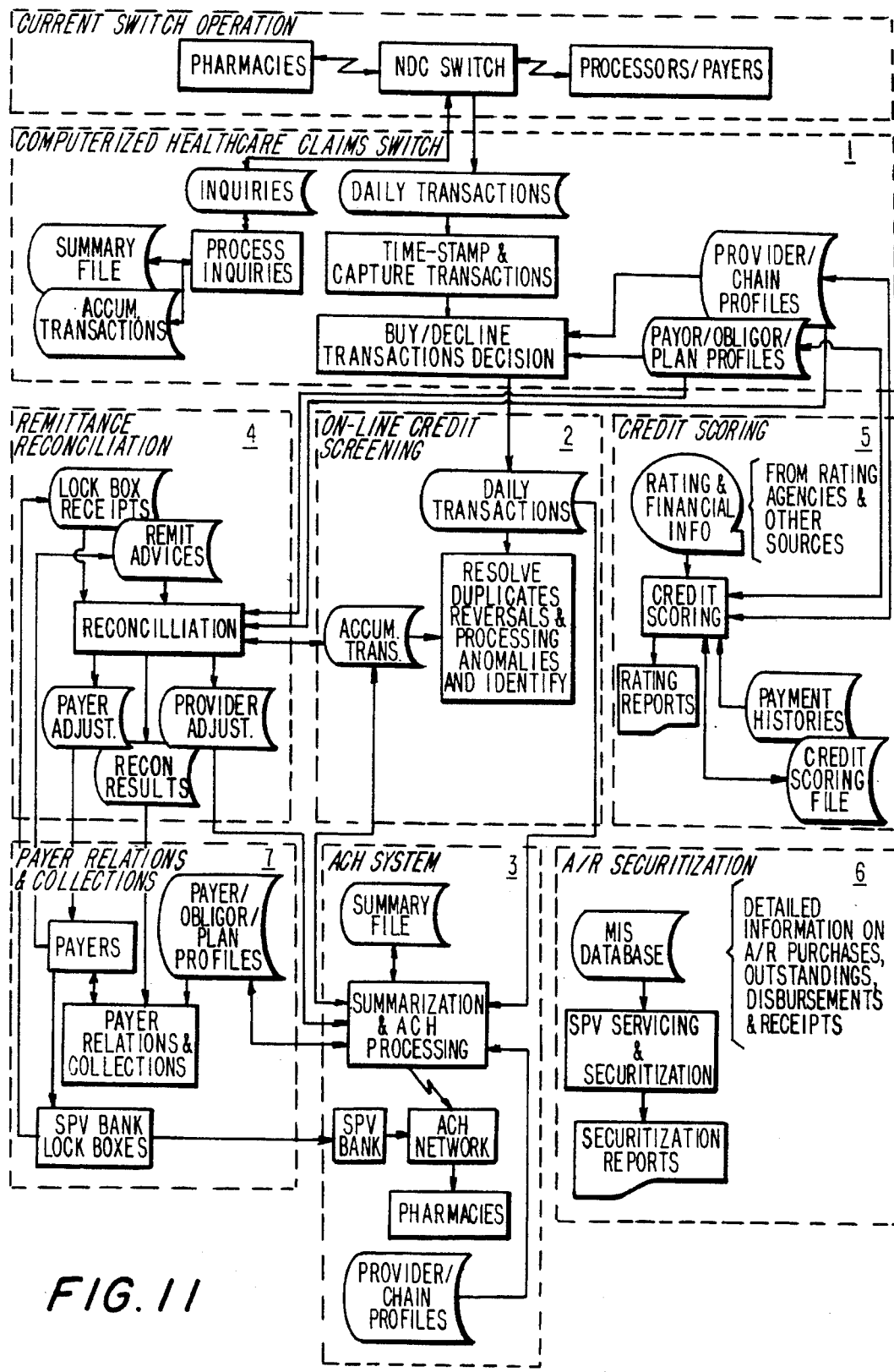
FIG. 11 shows the interaction of the major components of one embodiment of CHARMS.

Daily claims processing for CHARMS deals with capturing transaction data from providers and processors and, based on a number of considerations, results in provider payments for the System Operator's purchase of third-party health care claims. As shown in FIG. 11, daily processing is composed of the following inter-related processes and procedures: (a) transactions are received from providers and adjudicated by processors; (b) the resulting adjudicated transactions are captured, time-stamped and passed against payor, obligor, plan and provider profiles and certain date constraints to determine whether or not they are eligible to be bought—those that are not eligible are marked declined; (c) the eligible transactions are then matched internally to the daily transaction file and against accumulated prior days' transactions (both reconciled and unreconciled) to handle duplicates, reversals and certain processing anomalies, e.g. time-outs and bad blocks, and to identify bought claims; (d) the daily processor/payor reconciliation process updates the accumulated transaction file based on RA information (marking paid transactions as reconciled and classifying other items as provider or payor exceptions) and generates provider exception transactions for daily summarization and subsequent ACH entry; (e) reconciliation-generated amounts are combined with daily bought claim amounts and CHARMS-generated adjustments, and summarizations are developed for daily ACH entry, provider-initiated inquiry response, and help desk access; (f) ACH transactions by provider are generated based on predetermined cut-off times and are passed to the ACH; and (g) internal controls supporting an audit trail are developed and maintained, and summary totals for funds management and management reporting purposes are prepared.

1. Transaction Capture

Figure 20:
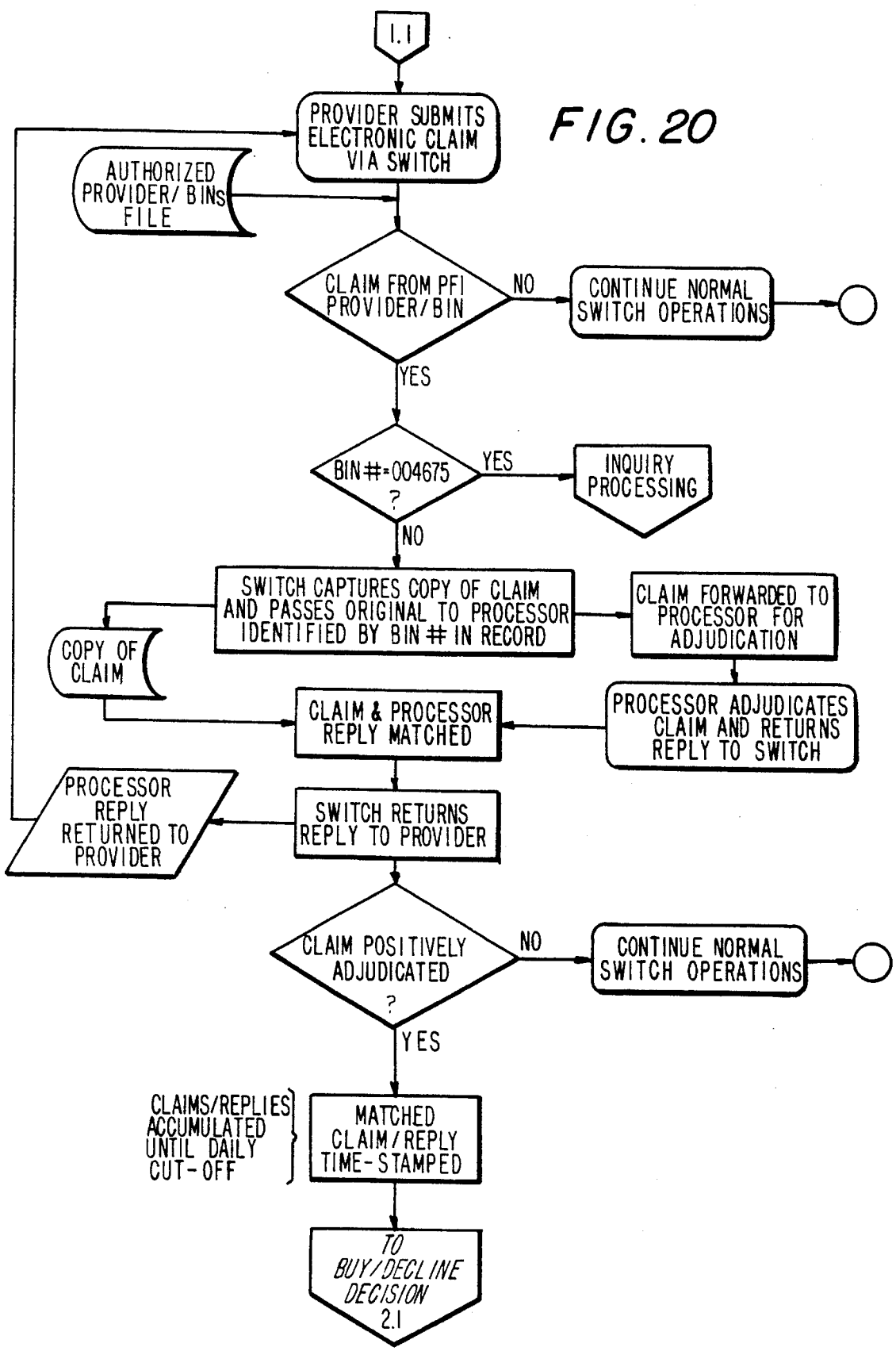

FIG. 20 shows an overview of the transaction capture process in one embodiment of the present invention.

Figure 13:
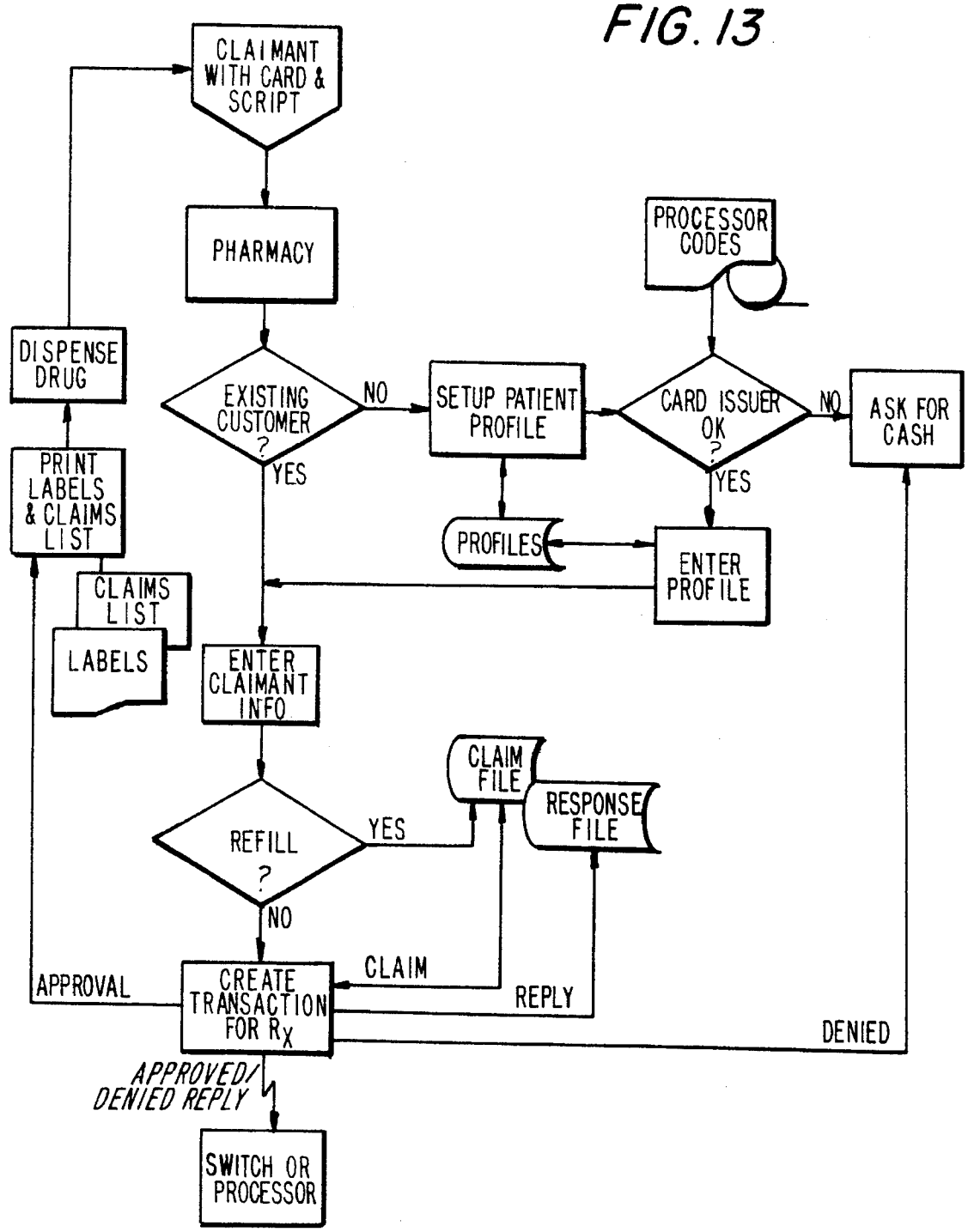
FIG. 13 shows the overall flow of a prior art in pharmacy claim processing procedure.
Figure 14:
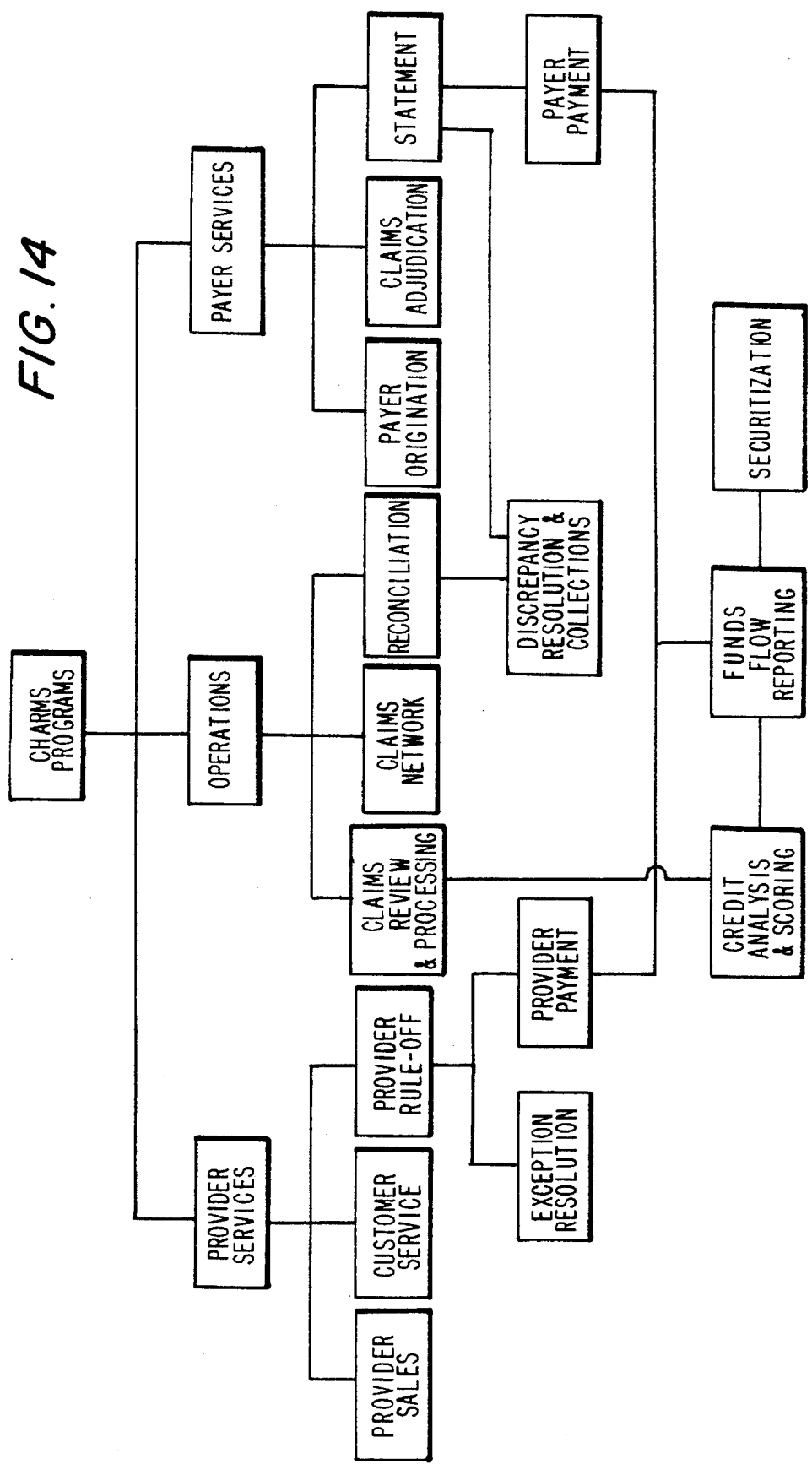
FIG. 14 shows the major functional components in one embodiment of CHARMS.

A claim is initiated when an insured claimant takes an eligible prescription to a pharmacy, and the pharmacy enters the relevant information about the claim into its in-house computer system. FIG. 13. Using one of the commercially available software packages, as discussed above, the pharmacy then submits the claim electronically to a switch. The switch reads the BIN of the claim message. If the BIN is "004675", the message is identified as an on-line inquiry request, and on-line inquiry processing begins, as described above. If the switch identifies the claim as emanating from a CHARMS subscriber, the switch time-stamps the claim message (i.e., retrievably stores the date and time of receipt of the message), and routes the message to the appropriate processor. A copy of that submitted transaction is retained at the switch before it is sent on to the designated processor. The form of electronic claim messages is currently based on the industry standard formats, NCPDP versions 1.0 through 3.2, though new versions will likely appear from time-to-time and pharmacies' claims will conform to one or more of those new versions.

Claims sent to a processor are then adjudicated according to the processor's existing adjudication procedure discussed above. The processor transmits an adjudication response message to the switch, which is copied at the switch, which copy is routed to CHARMS. CHARMS captures and time-stamps all adjudicated responses relating to participating providers. The adjudicated response message is matched with the copy of the original claim message received from the service provider and retained by CHARMS. The time-stamp on the initial claim message is overridden with the new one on the response.

The adjudicated response message is then returned to the service provider. In one embodiment of the present invention, CHARMS conducts its buy/decline decision processing prior to transmitting the adjudicated response message to the provider, and includes information as to whether the claim was bought by the System Operator in the message text fields of the response message. In another embodiment, CHARMS returns the response message to the provider immediately after copying it, and stores and accumulates all the claim transactions until the daily cut-off time, at which time it conducts buy/decline decision processing.

2. Buy/Decline Decision Processing

Figure 16:
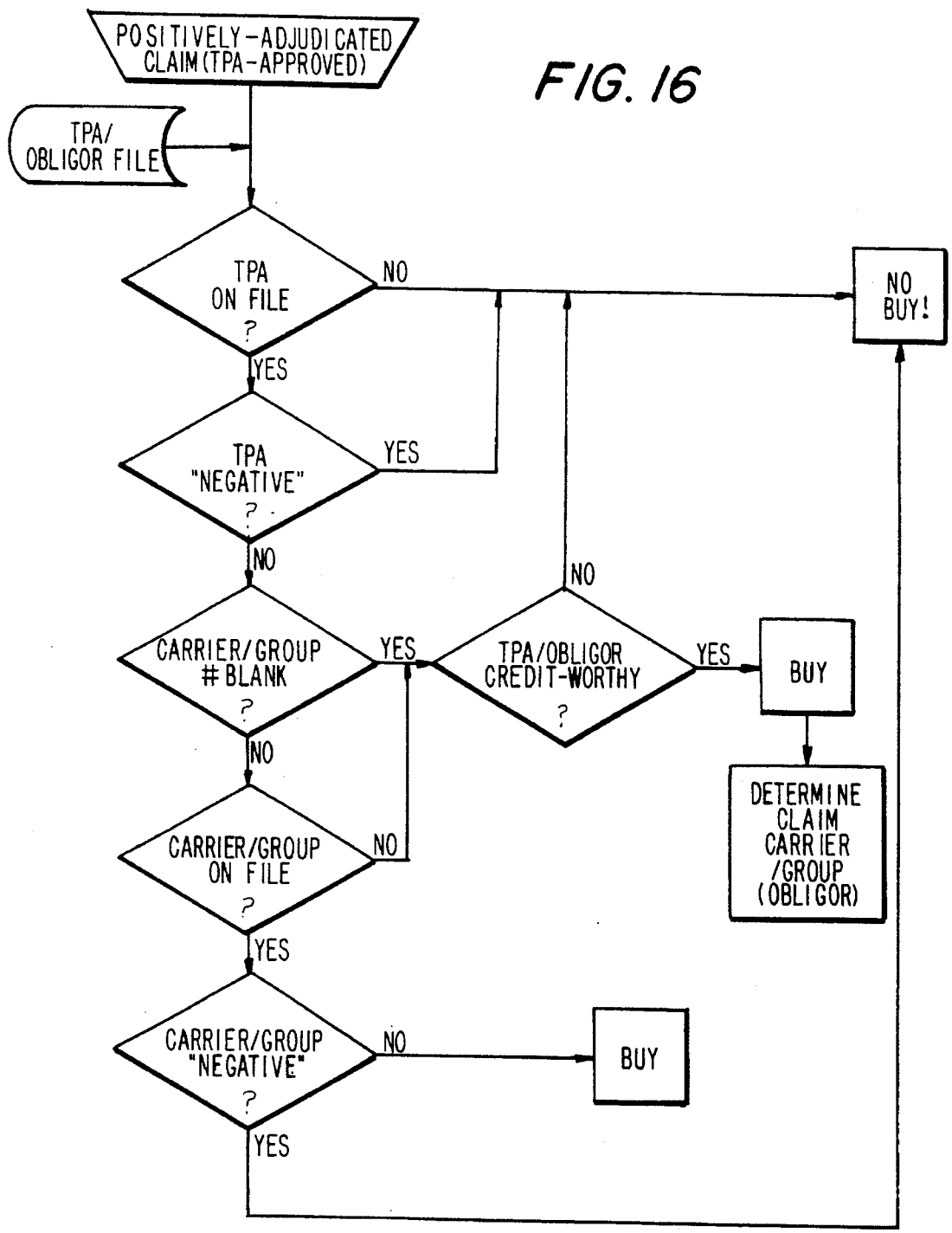
FIG. 16 shows the flow of the buy/decline decision making process in one embodiment of CHARMS.
Figure 21:
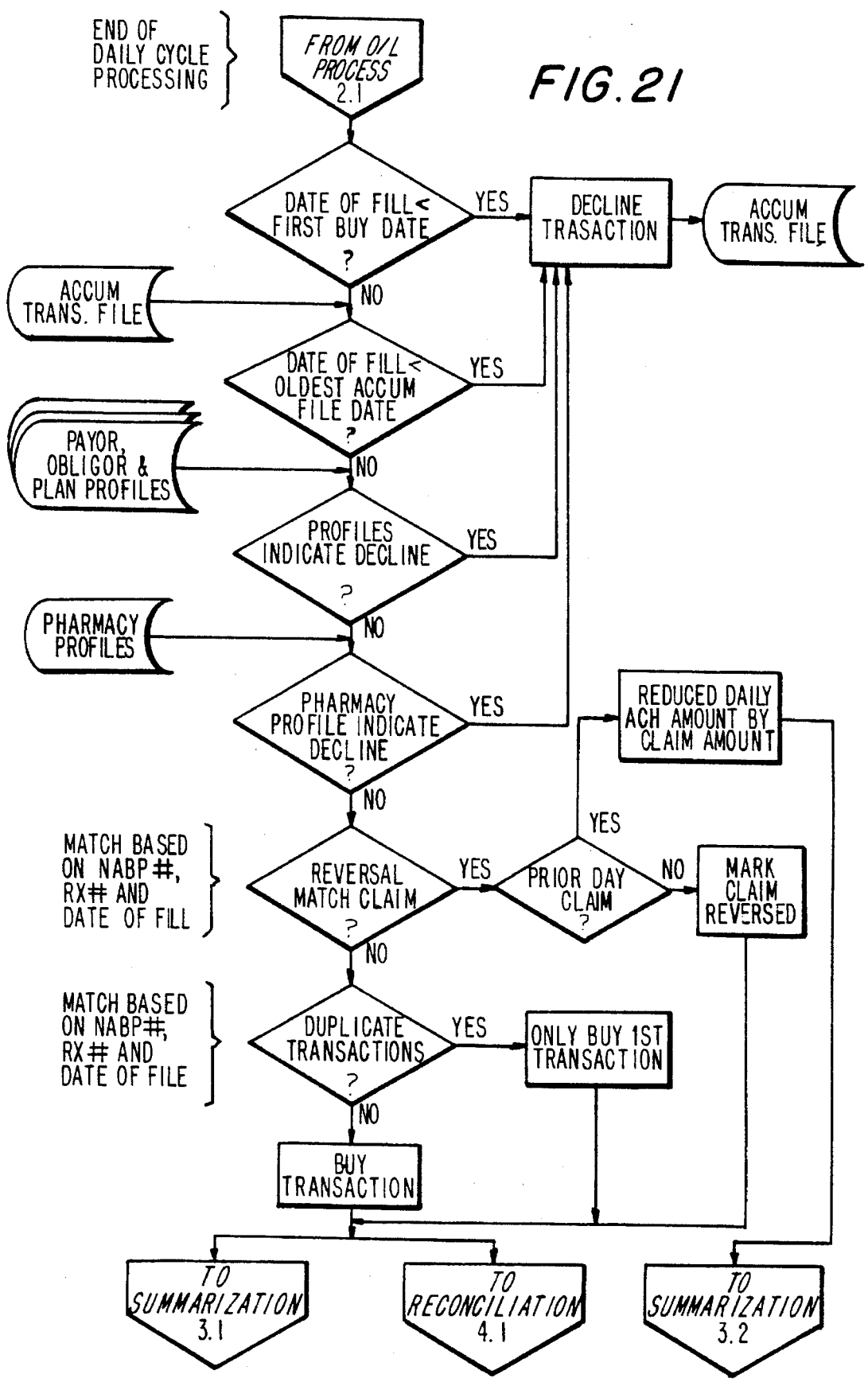

On a regular basis, at a time which, in one embodiment, accommodates daily ACH entries, CHARMS conducts buy/decline decision processing. This processing results in the determination of the buying or declining of claims. FIGS. 16 and 21 set forth the flow of the buy/decline decision making process in two possible embodiments of the present invention, FIG. 21 representing the preferred embodiment. In another embodiment, the sequence of checks shown in the FIG. 16 will vary based on the frequency of outcome occurrence and timing issues.

First, CHARMS marks as declined any transactions for which the date stored in the Date of Fill field in the claim message precedes the date stored in the First Buy Date field in the associated provider profile record. It also marks as declined any claims for which the date stored in the "Date of Fill" field precedes the oldest item stored in the accumulated transaction file.

Next, CHARMS compares each claim message to its corresponding records in the payor, obligor, and plan profile databases. If the payor, obligor, and plan records are marked to decline transactions, then CHARMS marks the transaction in question as declined. To determine the appropriate payor, obligor, and plan profile records, CHARMS treats the BIN as the payor number, unless the plan indicates otherwise. Specifically, CHARMS uses the data stored in the BIN and group number fields in the claim message to determine the NCPDP record positions containing the plan number, and then uses the plan number to identify and access the payor, obligor, and plan profile database records. If CHARMS can not identify the plan number or can not access a plan profile record, it treats the BIN as a payor number and uses it to access the payor, obligor, and plan profile records.

FIGS. 28 and 29 are tables that set forth two embodiments of the claims buy/decline logic for various combinations of the status of the payor, obligor, and plan, including the treatment of unrecognizable carriers or group numbers. In the tables in FIGS. 28 and 29: a "+" indicates a favorable creditworthiness score, or, in the case of a plan, that CHARMS accepts claims relating to that plan; a "−" indicates an unfavorable creditworthiness score, or, in the case of a plan, that CHARMS does not accept claims relating to that plan; the term "blank" indicates that the obligor or plan could not be determined from the claim message; the term "unknown" indicates that the carrier or group numbers indicated on the claim message were unrecognizable; and a "✓" indicates that CHARMS takes the referenced action.

Figure 12:
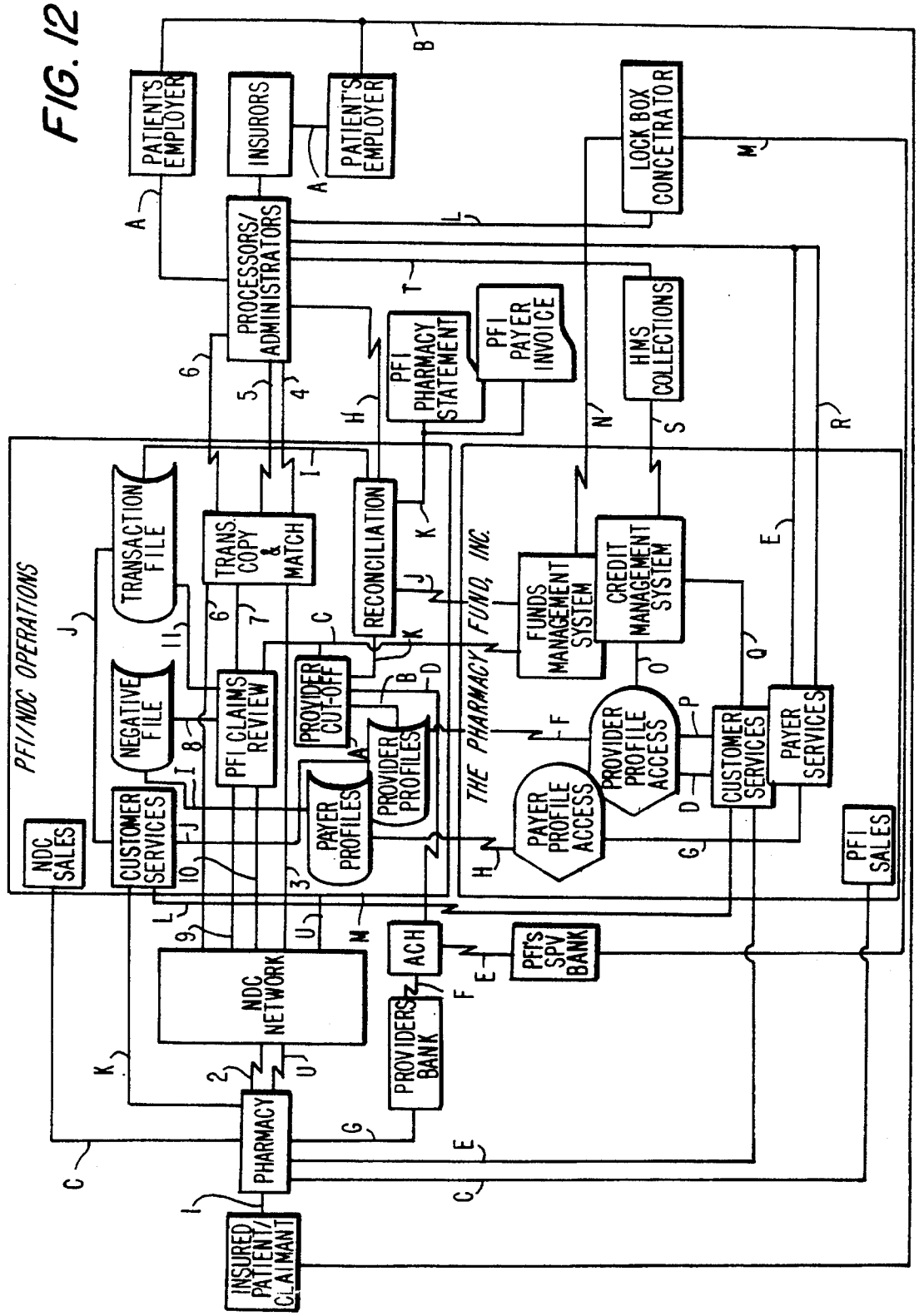
FIG. 12 shows the overall structure of the operation of one embodiment of CHARMS within the prior art pharmaceutical claims processing network.

In one embodiment of the present invention, the approved claims are processed against a "Negative File." FIG. 12(8). In that embodiment, CHARMS creates and regularly updates a Negative File indicating those payors and obligors whose record or creditworthiness score indicates their claims are to be declined. In this embodiment, CHARMS accesses the Negative File under five conditions: (a) on-line in response to submitted claims; (b) at the end of each day to respond to inquiries from pharmacies who have had claims declined or who have had plans added to the Negative File since their last inquiry; (c) automatically for these same pharmacies if they do not submit an inquiry within 48 hours, and CHARMS then generates a message to be immediately sent to the pharmacy; (d) for these same pharmacies on a monthly basis to annotate the monthly statement with an indication of declined claims and a list of payors or obligors whose claims will not be accepted; and (e) on a regular basis to update the Negative File.

Next, CHARMS uses two special service provider-related variables, a decline indicator and an inactive indicator, to provide at least three alternatives for making decisions whether and how to process a given service provider's claims. The decline indicator is used to provide short-term declining of all of a provider's receivables, regardless of the status of the designated payor and obligor. The inactive indicator is used to provide the ability to neither buy nor decline claims nor to retain records of the claims in CHARMS while maintaining the provider profile record and processing RAs until the payors have been notified to start remitting directly to the service provider. FIG. 30 is a table showing the steps taken by CHARMS for possible combinations of values for the decline and inactive indicators. In the table, a "✓" indicates that CHARMS performs the listed function, an "x" indicates that CHARMS does not perform the function, and a "*" indicates that CHARMS follows its normal buy/decline logic to determine whether or not to decline.

Next, CHARMS uses the following general approach for the handling of reversal claims: (1) CHARMS matches claims in the daily transaction file to claims previously received and stored in the existing transaction file using the NABP Number, Prescription Number and the Date of Fill fields; (2) If tile reversal matches a claim that has not already been bought, CHARMS marks the corresponding claim as reversed; (3) If the reversal matches a claim that has already been bought on a day prior to receipt of the reversal, CHARMS reduces the daily ACH amounts accordingly during the summarization process; (4) Reversals without matching claims are handled during reconciliation processing, described below.

To perform duplicate checking, CHARMS compares all claims sent with claims previously received and stored and identifies duplicate claims using the NABP Number, Prescription Number and the Date of Fill fields. The following important transaction sequence is used by CHARMS to accurately perform duplicate and reversal checking of NCPDP Version 1.0 formatted claims consistent with methods used by processors: (1) examination of duplicates and their related reversals in ascending time of receipt order; (2) consideration for buying only the first transaction in a sequential group of duplicates; (3) if a matching reversal is encountered subsequent to these duplicate claims, declining to buy any of the corresponding claims; and (4) if there is no reversal for this group of duplicates, only deciding to buy the first claim.

FIGS. 31–32A show a table that sets forth the transaction processing decision logic for specific rules for handling transactions depending on their status in the daily and existing transaction files, such as duplicates, reversals and other anomalies in one embodiment of the invention. All transactions listed on the table in FIGS. 31–32A which are shaded have been determined to be either impossible cases or of such rare occurrence that they are written to an exception file for unusual transactions designated for manual handling and investigation. In the table, the term "Log file" refers to the file of new transactions, the term "RR Trans" refers to the RR Trans database file which stores accumulated transactions, the term "Recon" refers to a reconciled claim for an amount paid on an RA, the term "NR" refers to a claim not reconciled for an amount not paid on an RA, and the term "Same Proc Day" refers to a transaction on the RR Trans file that has the same processing date as a transaction on the Log file, where neither have been run through the daily summarization procedures.

If, at the end of this series of steps, CHARMS has not decided to decline a claim, it marks the claim as bought and accesses the provider profile to determine the discount rates applicable for that particular pharmacy, its bank account number and other ACH information, any pharmacy specific offset conditions and information regarding claims at the time of cutoff. See FIG. 33.

In one embodiment of the invention, the System Operator targets the discount rate to match the best credit card discount price the pharmacy has obtained. In general, credit card discount rates reflect two components: the time value of money and the credit risk associated with consumer receivables. Similarly, CHARMS's discount rate is calculated to reflect the time value of the provider's receivables (averages of which were set forth above) and the quality of its plan sponsor pool, as well as other factors such as the volume of the provider's account and any negotiated recourse provisions.

In accordance with one embodiment of the present invention, the credit risk component is negotiable. An analysis by the inventors of the credit risks within the industry identified a potential credit exposure that is not well-understood by the market—hence, the possible difficulty in obtaining value for that component. Balancing this possible downside pressure on the discount rate is the inability of pharmacies to readily turn their third party receivables into cash through normal banking channels. High quality credit enhancements allow the System Operator to reduce the cost of funding and thus lower the discount rate.

After making the decision to buy a claim and determining the applicable discount rate, CHARMS arranges for the purchase of the claim by, in one embodiment of the present invention, making the ACH transfer determinations and then transmitting the transaction directly to the ACH. This action results in a debit to CHARMS's SPV bank account and a credit to the pharmacy's bank account. CHARMS uses the dollar amounts of the ACH transfers as well as ongoing cash usage information to project future financial requirements.

3. Daily Summarization

Figure 22:
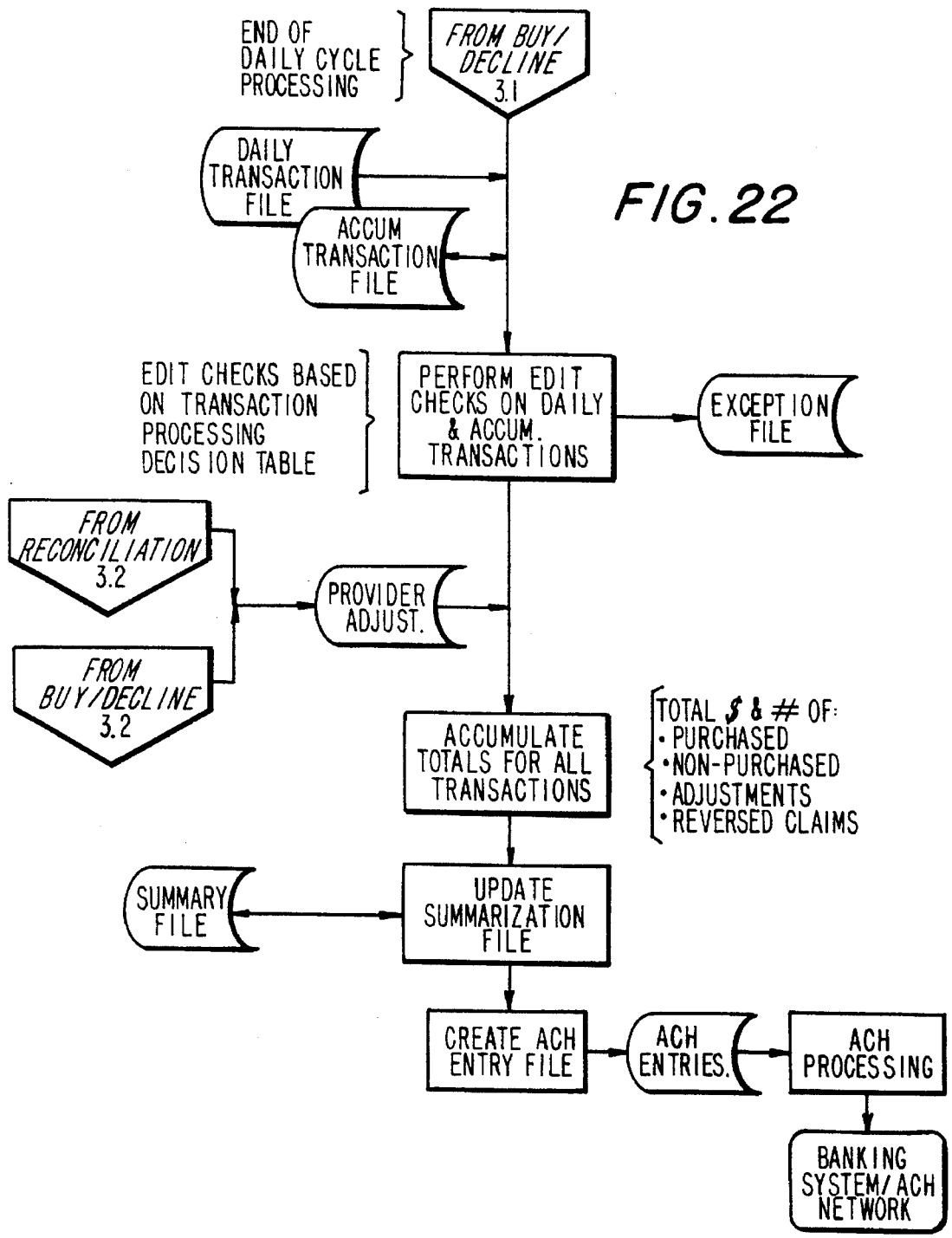

On a regular basis, which in the preferred embodiment of the invention is on a daily basis at a time which facilitates the daily ACH transfers, CHARMS processes, categorizes and summarizes all daily transactions for use in daily summary reports, in response to on-line and help desk inquiries, and in payment processing. FIG. 22 shows an overview of the daily summarization process in one embodiment of the present invention.

a. Daily Summarization Processing

During daily summarization, for the following items of information, CHARMS calculates the sums for the number of transactions and total dollar value for the current processing date by each BIN within each NABP number: claims purchased (including reversals); claims not purchased; credits (i.e., payments received on RAs for non-purchased claims); adjustments; and processor fees. The discount fee is calculated against the total purchased claims for each service provider. The net total of this figure, less any negative balance outstanding, is written to the ACH detail file for payment. CHARMS creates a daily summarization file, in which it stores the summarization information.

For all current transactions, CHARMS performs the following functions during daily summarization:

(1) subtracting the number and dollar amount of matching reversals;

(2) accumulating a summary total (dollars and number of transactions) for reversal of claims from prior days;

(3) accumulating summary totals by BIN within each NABP number for: (a) total dollars and number of transactions for purchased claims; (b) total dollars and number of transactions for non-purchased claims; (c)

total dollars and number of transactions for processor fees; (d) total dollars and number of transactions for credits; (e) total dollars and number of transactions for adjustments; and (f) total dollars and number of reversals pertaining to purchased claims;

(4) accumulating additional sets of summary totals by region, chain and group as indicated in the provider profile;

(5) applying the discount rate for each provider per provider profile against total dollars for claims purchased;

(6) comparing the average daily balance for each provider against the total dollars for claims purchased;

(7) summing up total dollars for claims purchased (including reversals), credits, adjustments, processor fees, and discount fee. The net result of this summation is the potential ACH amount. If the potential ACH amount is negative, it is added to the existing negative balance in the provider profile, and the ACH amount is zero. If the net result is positive, the provider profile record is checked for an existing negative balance. If the negative balance is greater than or equal to zero, the potential ACH amount becomes the ACH amount. If the negative balance is less than zero, the payment offset flag in the provider profile is checked. If it is set to "Y" for yes, which is the default setting, CHARMS offsets the potential ACH amount by the amount of the negative balance, reduces the existing negative balance by the amount of such offset, and, in one embodiment of the invention, updates the Negative File to indicate the work down of the provider's negative balance. If the payment offset flag is not equal to "Y", then CHARMS does not make an offset, the potential ACH amount becomes the ACH amount, and CHARMS issues an alert to the System Operator administration or generates an exception report for manual handling of the alternative repayment methods by the service provider;

(8) producing an ACH detail transaction for all positive ACH amounts; and (9) assigning a unique, consecutive ACH number to the ACH Tracer Number field in the ACH detail record and daily summary records.

As a result of the daily summarization and ACH transfer processes, CHARMS automatically generates electronic data sets on a periodic basis, which in one preferred embodiment is daily, containing certain management information which enables the System Operator to make management decisions and to record financial activity in the books of the System Operator and the SPVs. This summary data is also provided to a collection agency to facilitate collections activity, further described below. Cash disbursement information is also input into the securitization system to facilitate cash receipts projections.

To create these data sets, CHARMS accesses such data as new provider receivables, daily ACH transfers, and payments and RAs received from payors. One resulting data set, the claims purchased report, contains at least the following information: (1) date; (2) NABP number and provider name; (3) BIN and name; (4) obligor identification number and name; (5) number of transactions; (6) amount; (7) new provider or routine purchase; and (8) date of expected receipt from payor. Another resulting data set, the cash and RA receipt from payor report, contains at least the following information: (1) date; (2) BIN and name; (3) RA due date; (4) RA days late; (5) payment due date; (6) payment days late; (7) cycle control number; and amount.

b. ACH and Wire Transfers

After the daily summarization process is completed, CHARMS provides for the transfer to each provider of the ACH amount indicated in the provider profile record. In one embodiment of the invention, this transfer is done through existing ACH channels. In another embodiment, CHARMS makes this transfer through existing wire transfer channels for all or selected service providers. To effect the ACH transfer, CHARMS uses the provider profile database, including banking information, ACH alert limits and wire transfer information, the daily summary file, and negative balance information. As a result of this process, CHARMS produces an ACH disbursement tape, an ACH alert report, an ACH hold report, a wire transfer to transmit report, and a daily summary of disbursements by provider.

ACH transfers are made to each provider, regional headquarters, or chain headquarters, as indicated in the provider profile record. The daily ACH process is run every day, even when banks are closed. Separate transfers facilitate reconciliation by each provider to his bank statement. ACH transmissions are sent to the System Operator's bank on a daily basis or in the case of weekends and holidays, transmitted at the first available banking day.

In the case of those providers marked for wire transfers, CHARMS does not write an ACH record to tape. Instead, a report is generated listing those providers, their NABP or chain number, banking information, and the amount of the wire transfer. The wire transfers are then transmitted by the System Operator.

c. Average Daily Activity Alert Procedures

Figure 27:
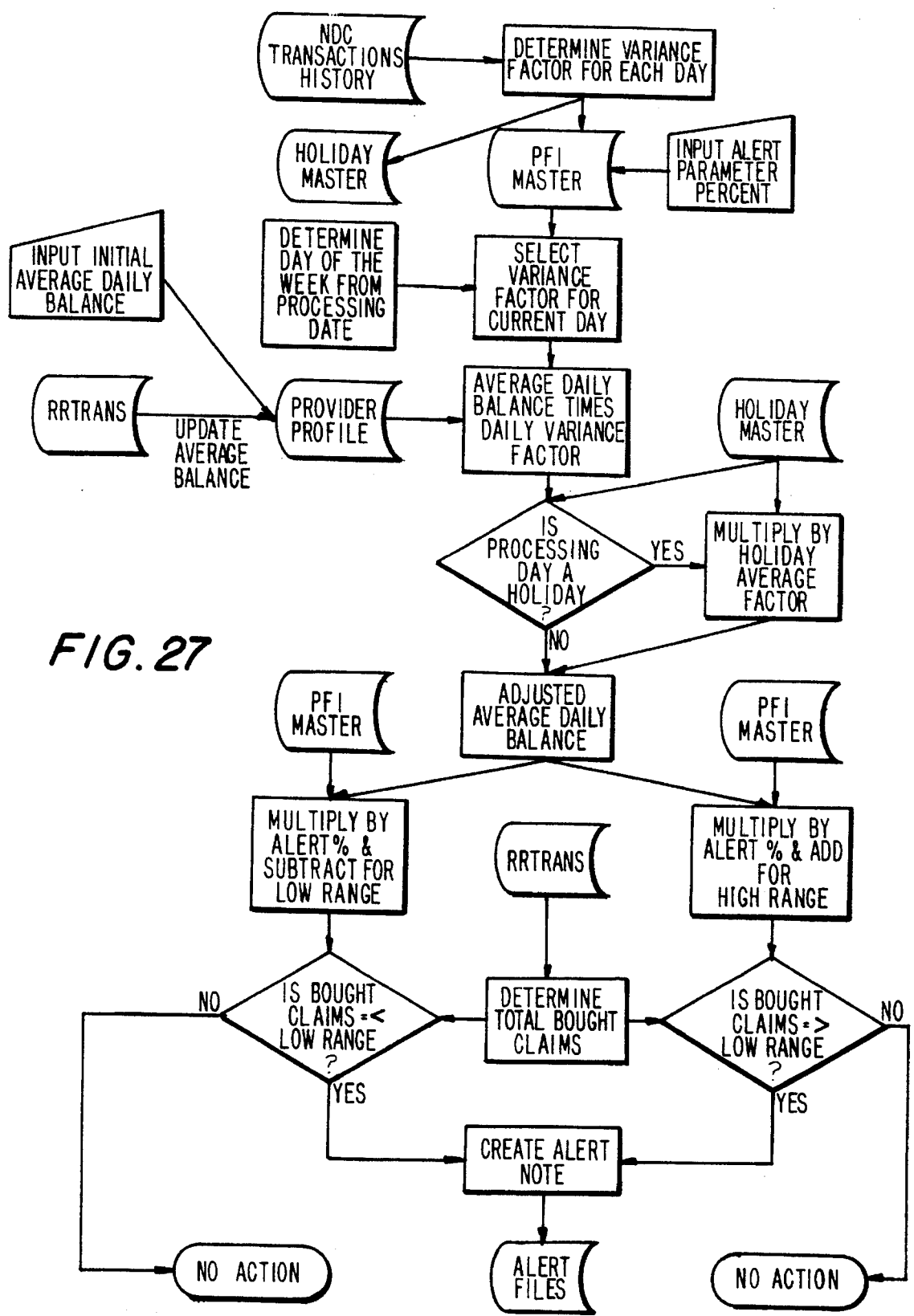

CHARMS monitors the level of activity for providers and produces daily alerts when such activity exceeds predetermined parameters. This monitoring takes place during daily summarization so as to provide the means to delete individual service providers from the ACH transfer tape and thus prevent an incorrect transfer of funds to the provider. FIG. 27 shows the flow of the average daily activity alert procedure in one embodiment of the present invention.

To facilitate the alert procedure, CHARMS calculates and stores in the provider profile record the average daily processing dollar volume for each provider. The initial value of this average is obtained from daily switch out activity for a given period, which in one preferred embodiment is the most recent 90 days. On a regular basis, which in one preferred embodiment is on a daily basis, CHARMS updates the average daily dollar volume field in the provider profile record with the current day's activity. CHARMS also calculates and stores in a table, for all of the switch's activity, an index representing the percentage that the average activity for each day of the year is of the average of all days in a year. This index table is initially created using data from a switch such as NDC for the most recent period of several months or years. It is updated on a regular basis, which in one preferred embodiment is monthly. Using these numbers, CHARMS calculates daily an expected daily dollar volume activity for each provider by taking the product of the provider's average daily dollar volume and the index for that day.

During daily summarization, CHARMS compares each day's actual dollar volume activity per provider to the expected dollar volume activity. If the actual activity is found to vary from the expected activity by more than a predetermined, adjustable parameter, which in one preferred embodiment is 50%, CHARMS creates and sends a notice to the System Operator indicating that the matter should be investigated before payment is made. In one embodiment, CHARMS provides this notice by setting an alert flag on the help desk screens, by posting a system generated notation in the alert notes screen, FIG. 17J, such as "OVER/UNDER DAILY AVERAGE, ACCOUNT NEEDS TO BE REVIEWED", and by generating an alert report. The System Operator then uses this alert report to decide whether to stop that day's ACH or wire transfer to the identified provider or to contact the provider to alert it of and discuss the variance.

CHARMS uses the following sources for alert processing: the index table, the provider profile records, and the ACH tape. As a result of alert processing, CHARMS generates an updated index table, an updated provider profile average daily dollar volume field, a report on providers exceeding the parameters, and an updated ACH tape.

4. Reconciliation and Collection Processes

Figure 23:
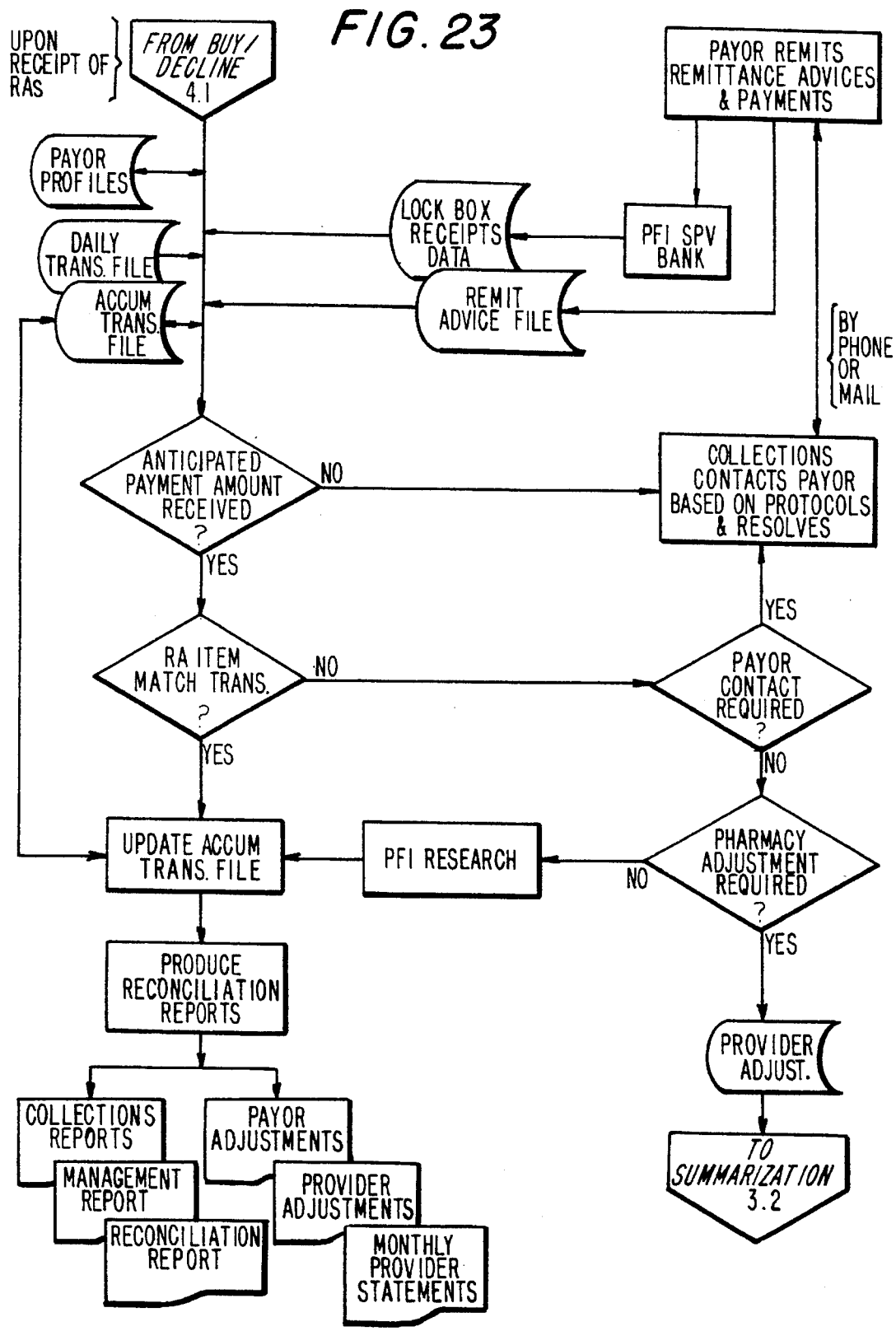
Figure 42:
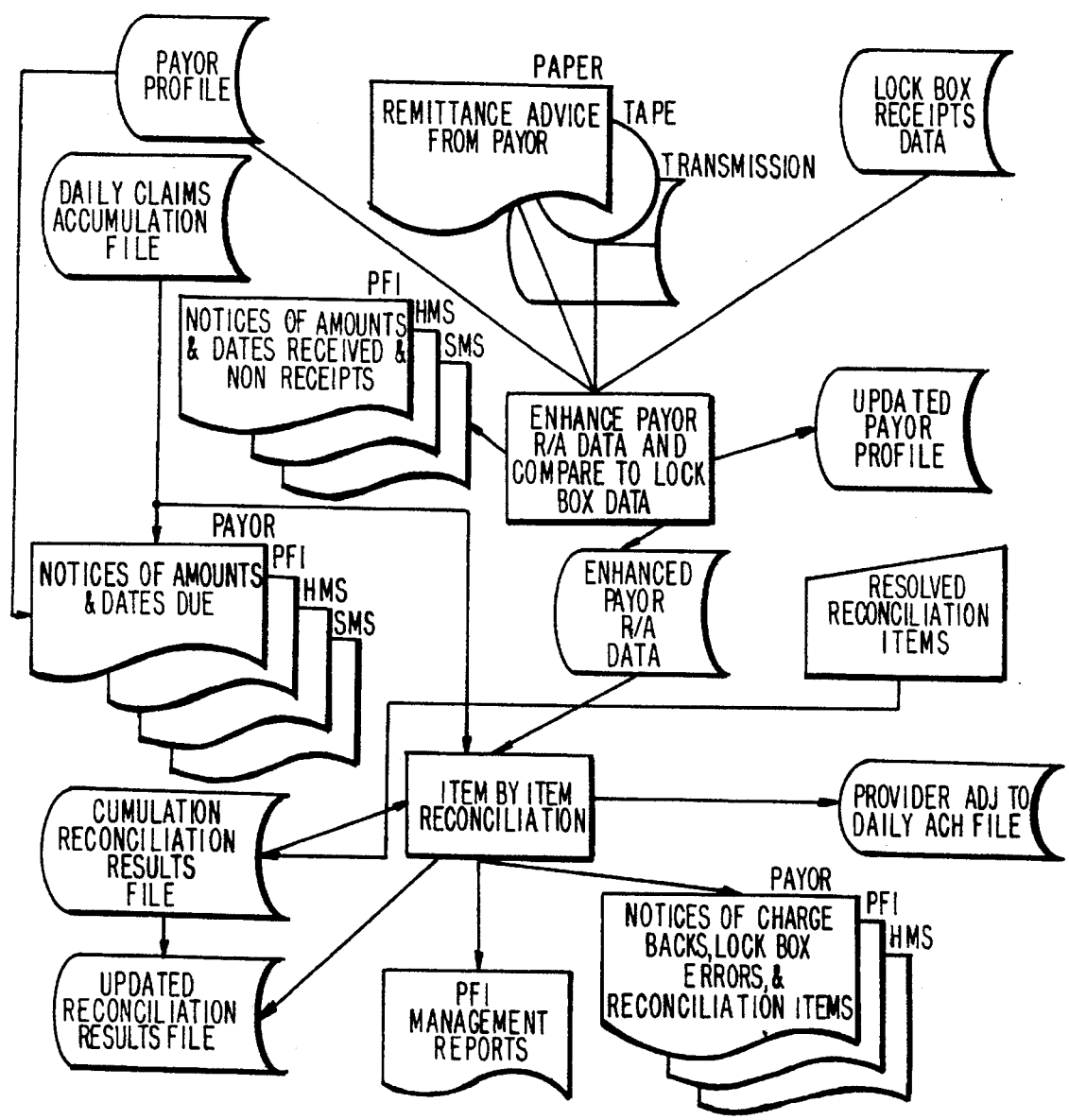
FIG. 42 shows the structure of one embodiment of CHARMS's reconciliation system.

CHARMS's reconciliation and collection process includes the performance of at least the following functions: (1) notification of amounts and date due for a just closed cycle, amounts and dates of receipts and non-receipts, adjustments, lock box errors, and reconciliation items; (2) reconciliation of claims approved on-line daily with payment and RA from processor/payor; (3) generation of payor performance data for future creditworthiness scoring consideration; (4) management report production; and (5) generation of ACH entries. FIG. 23 shows an overview of the reconciliation process in one embodiment of the present invention. FIG. 42 represents an overview of the structure of CHARMS's reconciliation and funds management subsystem. FIG. 43 shows the inputs used in the reconciliation process, and FIGS. 44–44A show the outputs of the reconciliation process.

a. Reconciliation Processing

On a periodic basis, as discussed above, payors transmit RAs regarding approved claims to CHARMS. This data may be transmitted in electronic format, for example, on a storage media such as magnetic tape. However, paper statements could be used if necessary, and the data contained therein would then be converted to an appropriate electronic format. Payors also send payment to the System Operator's bank lock box, and the contents thereof are periodically deposited to the SPV's operating account.

CHARMS performs a daily reconciliation of all RAs and all claims processed during the month for each service provider. CHARMS matches the statement and payment data to the appropriate transaction files. CHARMS records reconciliation differences to its records and identifies exception dispositions. CHARMS's daily processing includes recognition of each payor's and plan's cycle rule-off, generation of notice of amount and date due, and reconciliation of payments and RAs received.

The notifications generated by CHARMS includes the following: To payors, the amount and date due for the just closed cycle, a payor invoice, see FIGS. 45–45A for an invoice in one embodiment, a payment-RA discrepancies reconciliation report, see FIGS. 45B–45C for a report in one embodiment, and reconciliation items; For a collection agency, which, in one preferred embodiment is the Health Management System ("HMS"), and for the securitization management system, amounts and date due for just closed cycles (exceptions), amounts and dates of receipts and non-receipts (actuals), and adjustment charge backs, payment-RA discrepancies, and reconciliation items for the collection agency only. This information is passed to the collection agency for collection planning purposes, and to securitization management for cash flow and forecasting and other management tasks.

Any adjustments or miscellaneous charges/credits on the remittance advice are analyzed to determine whether they should be the responsibility of the payor, provider, or the System Operator. Notification of adjustment responsibility is generated and sent to the appropriate party. Adjustments passed through to the provider will be added to the internal reconciliation file and cleared by passing to the daily file for inclusion in the current day's ACH payment. It is important to complete this much of the reconciliation process in time to include any adjustments in the current day's ACH transfer.

CHARMS compares the converted RA information item by item (except for adjustments and miscellaneous charges/ credits) to the internal reconciliation file, and matches it on the NABP number, Date of Fill, prescription number, patient identification number, and amount. All data fields regarding non-matches or amount differences are reported to the payor via invoice and/or reconciliation statement, to the System Operator, and to the collection agency.

Amounts received according to the lock box input, and amounts due but not received, are also reported to the System Operator, the collection agency, and securitization management. The reconciliation file is updated to reflect the current status of cumulative differences. The payor profile is updated to reflect current payor payment performance. As reconciliation items are resolved, the cumulative reconciliation differences file is updated.

b. Reconciliation Timing and Disposition

During reconciliation processing unmatched detail claims, adjustments, and miscellaneous charges and credits are coded with disposition instructions so that the appropriate reports and data can be produced. All unreconciled items are written to the unreconciled items file and disposed in accordance with the disposition code.

The following are the types of adjustments and discrepancies CHARMS determines and marks for disposition, and their disposition, in one preferred embodiment of the invention:

(1) Adjustments include: (a) changes to amounts due to covered drugs, eligibility, drug price, or dispensing fee, of on-line approved claims are billed to the payor; (b) post payment audit charges are passed to the provider; adjustments to effect provider requested non-system reversals are passed to the provider and handled in accordance with reversal procedures set forth above.

(2) Miscellaneous TPA charges and credits, including processor fees and claims not purchased are passed to the provider.

(3) The System Operator adjustments are allocated based on a code provided at the time the adjustment is entered to the system.

(4) Claim detail discrepancies include: (a) for items in the claim detail file and not on an RA—if this is a timing difference, CHARMS codes it as such and writes it to the unreconciled items file; otherwise, CHARMS codes it as due from the payor and writes it to the unreconciled items file; (b) for items in an RA and not in the claim detail file, CHARMS codes it as an unidentified payment and writes it to the unreconciled items file; (c) for items which match but the amount paid is different—if an RA amount is less than the amount in the claim detail file, CHARMS codes it as a difference due from the payor and writes it to the unreconciled item file; otherwise, CHARMS codes it as a difference due to the payor and writes it to the unreconciled item file.

(5) For timing differences: (a) the reconciliation process applies to unmatched claims detail items only; (b) the date of transaction should generally be the same as the last day of cycle period per payor and plan profiles; and (c) the time of transaction should generally be within 15 minutes of the hour of rule-off per the payor and plan profiles.

The allocation and coding routine is performed each time the reconciliation process is performed as an integral part of that process, whenever an RA is received from a payor, which in one preferred embodiment is daily. In one embodiment of the invention, the timing for the routine is as follows:

(1) Timing differences are held until the next cycle reconciliation. If still not resolved, the payor is billed for an item not on the RA and the code is changed to due from payor written back to the unreconciled items file.

(2) Items due from the payor are written to a report or invoice with an explanation.

(3) Items apparently due to the payor are written to a report to the payor with an explanation. This report is sent to the payor only if a demand is made.

(4) Items passed through to the provider are written to the current day's daily summary and ACH transfer files with appropriate explanation.

(5) Items not allocated to either timing differences, the payor, or provider, have to be researched and cleared by the System Operator.

(6) Unreconciled items are cleared automatically through the item by item reconciliation process, ACH transfer to the Provider, or a manual update by the System Operator, e.g. a write off.

(7) Cleared items are coded with a cleared code indicating the method of clearing.

c. Collection Procedure

According to sets of predefined protocols, in one embodiment payors are notified of any differences and any funds that are due to the System Operator, and a collection agency such as HMS is directed to collect those funds. The predefined protocols are sets of instructions that dictate what actions are taken and when, including the generation and transmission of electronic messages or letters or the placing of telephone calls.

To facilitate the collection process, in this embodiment CHARMS interfaces with the collection agency's system and transmits information from the payor and obligor profile databases and accounts receivables information including new receivables and resolution of old items. In addition, CHARMS provides the collection agency, based on the set of predefined protocols, with collection alerts, collection issues, collection management reports including resolved items, and payment information. CHARMS creates a pharmacy ACH adjustment and sends the pharmacy a monthly statement and the payor an invoice.

5. Securitization System

As described above, CHARMS provides the means for purchase of third party receivables from participating pharmacies at a discount rate. These short term investment grade receivables are pooled to reduce risk and to collateralize a series of short and medium term funding instruments. The System Operator secures all of its borrowings with this stream of instruments, based on the creditworthiness of the diversified pool of underlying plan sponsors plus credit enhancement where appropriate.

CHARMS's computerized securitization subsystem may with certain modification be based on any of the commercially available securitization packages. The package utilized in one preferred embodiment is FAST, available through Deloitte & Touche, as indicated in the summary, which is customized for use by CHARMS.

FAST is a family of the following modules that address all of the business functions of an issuing entity in an integrated manner:

Credit Evaluation Modules assist in analyzing the creditworthiness of clients' assets portfolios. These modules perform frequency and balance distributions, weighted average maturity, weighted average coupon, and other portfolio statistics. The modules can also forecast expected and maximum losses given a portfolio and expected default probabilities.

Transaction Structuring Modules allow the user to see the effect of changing transaction parameters on returns to the sellers, investors and the sponsor. It also allows the user to perform "sensitivity analysis" to see how the returns to investors and the issuing entity change for different collateral behavior assumptions. Weighted average life, internal rate of return, and tranche break-even points are calculated and graphed for investor documents.

Funding Administration Modules calculate all the necessary data for the funding administration functions including price and funds transfer calculations. These modules maintain records for all funding vehicles used.

Collateral Purchase Administration Modules calculate the amount of collateral to purchase (or repurchase), the price of the collateral purchases, and the funds to be transferred to collateral sellers. These modules also record actual collateral behavior and assist in verifying the more frequent summary information against periodic detailed information.

Issuing Entity Administration Modules integrate the different modules to calculate, track and account for the purchase of collateral, issuance of debt and the accrual and payment of expenses. These modules also automatically generate general ledger journal entries and issuing entity budgets and forecasts for the collateral sellers on an individual transaction or consolidated basis.

Reporting and General Ledger Modules allow the user to see the results of the previous modules, as user defined reports or accounting entries. The accounting entries can be exported to an external general ledger.

Risk Management Methods include interest rate and foreign exchange risk hedging as well as operational policies and procedures which can be customized to the issuing entity's specific needs.

In addition, one preferred embodiment of CHARMS incorporates certain modifications to the FAST modules that customize the current FAST functionality for CHARMS's unique aspects and requirements. There are two major types of modifications. One is customization of the parameters in FAST, such as the setting of relevant time periods for the taking of particular actions. The second is the definition of the particular instruments to be used by CHARMS, as discussed elsewhere in this disclosure. One ordinarily skilled in the art could implement these modifications without undue experimentation.

Although preferred specific embodiments of the present invention have been described above in detail, it is desired to emphasize that this has been for the purpose of illustrating and describing the invention and should not be considered as necessarily limiting of the invention, it being understood that many modifications can be made by those skilled in the art while still practicing the invention claimed herein.

We claim:

1. A computerized method for financing a health care service provider, comprising:

(a) receiving an electronically transmitted insurance claim from the service provider;

(b) identifying a payor and an obligor associated with the insurance claim;

(c) accessing a profile database record for the payor and obligor;

(d) retrieving a creditworthiness status of the payor and obligor from the profile database record;

(e) determining whether to purchase the insurance claim from the service provider based on the creditworthiness status; and (f) if the determination is to purchase the insurance claim, making a payment to the service provider for purchase of the insurance claim.

2. A method according to claim 1 wherein the determination is not to purchase the insurance claim from the service provider, further comprising generating a notice to the service provider relating the determination not to purchase the insurance claim and electronically transmitting the notice.

3. A method according to claim 1 wherein the determination is to purchase the insurance claim from the service provider, and wherein the payment to the service provider is made at a discount, further comprising:

(a) generating and sending a notice to the payor and obligor associated with the insurance claim indicating that the insurance claim has been purchased;

(b) determining an amount owed by the payor and obligor;

(c) receiving payment on the insurance claim from the payor; and (d) reconciling the amount of the payment received from the payor with the amount of payment owed by the payor.

4. A method according to claim 3 wherein reconciling the amount of the payment received from the payor with the amount owed by the payor comprises:

(a) receiving a statement from the payor regarding payment amounts for insurance claims which have been approved for payment;

(b) matching the amount of one or more payments received from the payor with payment amounts indicated on the statement to determine whether discrepancies exist between these amounts;

(c) determining whether each discrepancy is due to an adjustment to the statement, and, if it is, determining whether the service provider or payor is responsible for the adjustment; and (d) disposing of the adjustment accordingly.

5. A method according to claim 3 further comprising:

(a) accessing a database of creditworthiness scores to identify a creditworthiness score for each payor and obligor associated with a set of insurance claims purchased from service providers;

(b) determining which insurance claims from the set to include in a pool of investment grade receivables based on the creditworthiness scores; and (c) using the pool to collateralize one or more funding instruments.

6. A method according to claim 5 wherein the steps of determining which insurance claims to include in a pool of investment grade receivables and using the pool to collateralize one or more funding instruments are implemented utilizing an integrated securitization software package.

7. A method according to claim 6 wherein the integrated securitization software package is the Financial Administration and Structuring Technology.

8. A method according to claim 1 wherein the health care service provider is a pharmaceutical service provider.

9. A method according to claim 1 wherein the payment to the service provider is made via an automated clearing house (ACH) transfer to the service provider's account.

10. A method according to claim 1 wherein the payment to the service provider is made via a wire transfer to the service provider's account.

11. A method according to claim 1 further comprising:

(a) identifying a plan associated with the insurance claim;

(b) accessing a profile database record for the plan; and (c) retrieving a creditworthiness status of the plan from the profile database record.

12. A method according to claim 1 wherein identifying a payor and an obligor associated with the insurance claim comprises accessing bank identification number (BIN) and group number data stored in a BIN field and a group number field of the electronically transmitted insurance claim and determining the identity of the payor and obligor based on the BIN and group number data.

13. A method according to claim 1 wherein the creditworthiness status of the payor and obligor is established in accordance with the following:

(a) retrievably storing ratings for the payor and obligor obtained from one or more rating agencies;

(b) assigning the ratings into numerical rating categories and retrievably storing the rating categories;

(c) assigning a weighting factor for each rating agency based on the anticipated importance of the rating agency to a relevant investor market, and retrievably storing the weighting factors;

(d) determining a creditworthiness score for each payor and obligor using the rating categories and weighting factors according to the following formula;

$$CS(q) = \sum_{i=1}^{n} w_i \cdot R(q)_i$$

where:

q is a given payor and obligor;

CS(q) is the creditworthiness score for the payor and obligor;

$w_i$ are the weighting factors assigned to each rating agency;

$R(q)_i$ are the rating categories to which the ratings for the given payor and obligor are assigned for each of the rating agencies used; and n is the number of rating agencies used;

(e) determining the creditworthiness status of the payor and obligor from the creditworthiness scores; and (f) retrievably storing the creditworthiness status in a profile database record.

14. A method according to claim 13 wherein determining the creditworthiness status of the payors and obligors from the creditworthiness scores further comprises:

(a) obtaining a range of possible creditworthiness scores by determining a highest and a lowest possible creditworthiness score;

(b) dividing the range into a desired number of subranges;

(c) determining a highest and a lowest possible creditworthiness score for each subrange; and (d) determining to which subrange the creditworthiness score for each payor and obligor belongs by comparing the creditworthiness score for each payor and obligor to the highest and lowest possible creditworthiness scores for the subrange.

15. A method according to claim 13 wherein at least one of the ratings used is a performance indicator for a given payor and obligor obtained according to the following:

(a) determining an average amount due associated with the payor and obligor over an average cycle;
(b) retrievably storing the following data:
  (i) the average amount due;
  (i) an amount of money due associated with the payor and obligor during a given payment cycle;
  (ii) a number of days such amount of money due is overdue for the given payment cycle;
  (iii) a total of any secured and guaranteed funds for the payor and obligor; and
(c) determining the performance indicator using the following formula:

$$PI=((AD*ND)-SF)/FD,$$

where:
PI is the performance indicator;
AD is the amount of money due during a given payment cycle;
ND is the number of days said amount of money due is overdue;
SF is the total of any secured or guaranteed funds; and
FD is the average amount due.

16. A method according to claim 15 wherein the rating agencies, rating categories, and weighting factors are as shown in FIG. 49.

17. A method according to claim 1 wherein determining whether to purchase the insurance claim comprises the steps set forth in FIG. 16.

18. A method according to claim 1 wherein determining whether to purchase the insurance claim comprises the steps set forth in FIG. 21.

19. A method according to claim 1 wherein determining whether to purchase the insurance claim comprises applying the logic set forth in the table in FIG. 28.

20. A method according to claim 1 wherein determining whether to purchase the insurance claim comprises applying the logic set forth in the table in FIG. 29.

21. A method according to claim 1 further comprising utilizing an electronic bulletin board system to provide access to information regarding insurance claim transactions and to provide the means for communication among a plurality of service providers, payors, processors, administrators, and obligors.

22. A method according to claim 1 further comprising a computerized alert process for discovering unusually high processing volume for a given service provider, said process comprising:
  (a) determining and retrievably storing:
    (i) an average processing volume for the service provider for a selected period of time;
    (ii) an average processing volume for the selected period for a set of service providers;
    (iii) an average annual processing volume for the set of service providers;
    (iv) an index representing the ratio of the average processing volume for the selected period for the set of service providers to the average annual processing volume for the set of service providers;
    (v) an expected average processing volume for the service provider representing the product of the index and the average processing volume for that service provider over the selected period; and
    (vi) the actual processing volume for the service provider during one period of time which is equivalent to the selected period of time;
  (b) comparing the actual processing volume for the service provider to the expected average processing volume for the service provider; and
  (c) if the actual processing volume is greater than the expected average processing volume for the service provider by more than a predetermined, adjustable parameter, generating an alert message.

23. A method according to claim 22 wherein the alert process further comprises the steps shown in FIG. 27.

24. A method according to claim 22 wherein the predetermined, adjustable parameter is 50%.

25. A computerized healthcare accounts receivable management system for purchasing accounts receivables from one or more health care service providers, comprising:
  (a) means for receiving electronically transmitted insurance claims from one or more service providers;
  (b) means for receiving electronically transmitted adjudication response messages from one or more processors approving the insurance claim;
  (c) means for matching the insurance claims with the adjudication response messages;
  (d) means for identifying a plan, a payor and an obligor associated with each insurance claim;
  (e) means for accessing one or more profile database records for the plan, payor and obligor;
  (f) means for retrieving creditworthiness statuses of the plan, payor and obligor from the profile database record or records;
  (g) means for determining whether to purchase each insurance claim from the service provider based on the creditworthiness statuses; and
  (h) means for making payments to the service providers for purchase of the insurance claims.

26. A system according to claim 25 wherein the payments to the service providers are made at a discount, further comprising:
  (a) means for generating and sending notices to payors and obligors indicating the insurance claims of a set of service providers are to be purchased;
  (b) determining amounts owed by each payor and obligor associated with an insurance claim;
  (c) receiving payments on the insurance claims from the payors; and
  (d) reconciling the amounts of the payments received from the payors with the amounts of payments owed by the payors.

27. A method according to claim 26 wherein reconciling the amounts of the payments received from the payors with the amounts owed by the payors comprises:
  (a) receiving statements from the payors regarding payment amounts for insurance claims which have been approved for payment;
  (b) matching the amounts of one or more payments received from the payors with payment amounts indicated on the statements to determine whether discrepancies exist between these amounts;
  (c) determining whether each discrepancy is due to an adjustment to each statement, and, if it is, determining whether the service providers or payors are responsible for the adjustment; and
  (d) disposing of the adjustments accordingly.

28. A computerized method for purchasing accounts receivables from a health care service provider, comprising:
  (a) receiving an electronically transmitted insurance claim from the service provider;

(b) receiving an electronically transmitted adjudication response message from a processor approving the insurance claim;

(c) identifying a plan, a payor and an obligor associated with the insurance claim;

(d) accessing a negative file;

(e) searching the negative file to find the plan, payor, and obligor;

(f) determining whether to purchase the insurance claim from the service provider based on the search and in accordance with the logic set forth in FIG. 29; and (g) if the determination is to purchase the insurance claim, making a payment to the service provider for purchase of the insurance claim.

29. A computerized system for determining whether to purchase an insurance claim from a service provider comprising:

(a) means for identifying a payor and obligor associated with the insurance claim;

(b) means for determining an average amount due associated with the payor and obligor over an average cycle;

(c) means for retrievably storing the following data:
 (i) ratings for the payor and obligor obtained from one or more rating agencies;
 (ii) weighting factors for each rating agency based on its anticipated importance to an investor market;
 (iii) the average amount due;
 (iv) an amount of money due associated with the payor and obligor during a given payment cycle;
 (v) a number of days such amount of money due is overdue for the given payment cycle;
 (vi) a total of any secured and guaranteed funds for the payor and obligor;

(d) means for determining a performance indicator according to the following algorithm;

$$PI=((AD*ND)-SF)/FD,$$

where:
 PI is the performance indicator;
 AD is the amount of money due during a given payment cycle;
 ND is the number of days said amount of money due overdue;
 SF is the total of any secured or guaranteed funds; and
 FD is the average amount due;

(e) means for assigning the ratings and the performance indicator into numerical rating categories;

(f) means for determining the creditworthiness score according to the following formula:

$$CS(q) = \sum_{i=1}^{n} w_i \cdot R(q)_i$$

where:
 q is a given payor and obligor;
 CS(q) is the creditworthiness score for the payor and obligor;
 $w_i$ are the weighting factors assigned to each of rating agencies;
 $R(q)_i$ are the rating categories to which the ratings for the given payor and obligor are assigned for each of the rating agencies used; and
 n is the number of rating agencies used;

(g) means for electronically communicating the creditworthiness scores;

(h) means for identifying the payors and obligors associated with the insurance claim; and (i) means for determining whether to purchase an insurance claim based on the creditworthiness score of one or more of the identified payors and obligors.

30. A system according to claim 29 wherein the rating agencies, rating categories, and weighting factors are as shown in FIG. 49.

31. A computerized healthcare accounts receivable purchasing, collections, securitization and management method for evaluating and purchasing the accounts receivables of subscribing pharmaceutical service providers, scoring the creditworthiness of payors and obligors, collecting on and securitizing accounts receivables, and reconciling claims and payments, comprising:

(a) establishing and retrievably storing a provider profile database comprising a plurality of records which contain information regarding subscribing pharmaceutical service providers;

(b) establishing and retrievably storing one or more plan, payor, and obligor profile databases comprising a plurality of records which contain information regarding plans, payors, and obligors;

(c) establishing a creditworthiness status for each plan, payor and obligor contained in the plan, payor and obligor profile database or databases and retrievably storing the creditworthiness status in the profile database records for the plan, payor, and obligor;

(d) receiving electronically transmitted insurance claims over an on-line pharmaceutical claims adjudication network which utilizes an a National Council for format;

(e) receiving NCPDP standard format adjudication responses approving payment for the insurance claims, which adjudication responses were electronically transmitted by one or more processors over the on-line pharmaceutical claims adjudication network;

(f) matching the insurance claims with the responses;

(g) identifying a plan, a payor, and an obligor associated with each insurance claim by accessing BIN and group number data stored in a BIN field and a group number field of each electronically transmitted insurance claim and determining the identity of the plan, payor and obligor based on the BIN and group number data;

(h) accessing one or more records for the plan, payor and obligor associated with each insurance claim from the plan, payor and obligor profile database or databases;

(i) retrieving the creditworthiness status of the plan, payor and obligor from the profile database record or records;

(j) determining which insurance claims to purchase from the pharmaceutical service providers based on the creditworthiness statuses in accordance with the procedure shown in FIG. 21 and applying the logic set forth in the table shown in FIG. 29;

(k) making payments at a discount to the service providers whose insurance claim or claims are to be purchased, which payment is made via an ACH transfer;

(l) generating and transmitting notices to the payors and obligors contained in the payor and obligor profile database or databases that insurance claims of the pharmaceutical service providers contained in the provider profile database are being purchased;

(m) receiving payments on the insurance claims from the payors;

(n) reconciling the amounts of the payments received from the payors with the amounts of payment owed by the payors, comprising:
  (i) receiving statements from the payors regarding payment amounts for insurance claims which have been approved for payment;
  (ii) matching the amount of one or more payments received from the payor with payment amounts indicated on the statements to determine whether discrepancies exist between these amounts;
  (iii) determining whether each discrepancy is due to adjustments to the statements, and, if it is, determining whether the service provider or payor is responsible for the adjustment; and
  (iv) disposing of the adjustments in accordance with the logic set forth in the tables in FIGS. 31–32A;

(o) utilizing an integrated securitization software package to securitize the accounts receivables of the service providers, comprising:
  (i) accessing a database of creditworthiness scores to identify a creditworthiness score for each payor and obligor associated with the accounts receivables purchased from service providers;
  (ii) determining which insurance claims to include in a pool of investment grade receivables based on the creditworthiness scores; and
  (iii) using the pool to collateralize one or more funding instruments;

(p) determining whether processing volume for each service provider is unusually high for a selected period of time, and generating an alert message, comprising:
  (i) determining and retrievably storing: an average processing volume for each service provider for a selected period of time, an average processing volume for the selected period for the service providers, an average annual processing volume for the service providers, an index representing the ratio of the average processing volume for the selected period for the service providers to the average annual processing volume for the service providers, an expected average processing volume for each service provider representing the product of the index and the average processing volume for that service provider over the selected period, and the actual processing volume for each service provider during one period of time which is equivalent to the selected period of time;
  (ii) comparing the actual processing volume for each service provider to the expected average processing volume for each service provider; and
  (iii) if the actual processing volume is greater than the expected average processing volume for each service provider by more than a predetermined, adjustable parameter, generating an alert message;

(q) receiving and responding to inquiries transmitted by service providers over the on-line pharmaceutical claims adjudication network and containing requests for information stored in database records, comprising:
  (i) identifying the electronically transmitted insurance claim message as an inquiry;
  (ii) reading from the inquiry and retrievably storing a code indicating the date of the information requested and a code indicating the type of information requested, wherein the types of information comprise deposit summary information, deposit/adjustment detail information, non-purchased detail information, and bulletin information;
  (iii) determining the date of the information requested and the type of information requested by converting the codes according to predefined parameters;
  (iv) identifying one or more database records containing the type of information requested for the date of the information requested;
  (v) accessing the database record or records to obtain and retrievably store the requested information;
  (vi) opening a response message in the form of an NCPDP standard rejected claim response message;
  (vii) transferring the requested information into one or more message text fields of the response message; and
  (viii) electronically transmitting the response message over the on-line pharmaceutical adjudication network to the service provider; and (r) retrieving information about pharmaceutical service provider financial accounts stored in one or more database files, comprising:
  (i) displaying two or more display screens each containing one or more fields in which a user can input information, wherein the display screens and fields are as shown in FIGS. 17A through 17P;
  (ii) capturing information inputted into the fields;
  (iii) switching between display screens at the press by the user of a hot key;
  (iv) converting the information inputted by the user into a set of requested information;
  (v) accessing and retrieving the requested information from the database files; and
  (vi) displaying to the user the information accessed from the database files.

32. A method according to claim 31 wherein establishing a creditworthiness status for each payor and obligor comprises:
  (a) determining an average amount due associated with the payor and obligor over an average cycle;
  (b) retrievably storing the following data:
    (i) ratings for the payor and obligor obtained from one or more rating agencies;
    (ii) weighting factors for each rating agency based on its anticipated importance to an investor market;
    (iii) the average amount due;
    (iv) an amount of money due associated with the payor and obligor during a given payment cycle;
    (v) a number of days such amount of money due is overdue for the given payment cycle;
    (vi) a total of any secured and guaranteed funds for the payor and obligor;
  (c) determining a performance indicator according to the following algorithm;

$$PI=((AD*ND)-SF)/FD,$$

where:
  PI is the performance indicator;
  AD is the amount of money due during a given payment cycle;
  ND is the number of days said amount of money due is overdue;
  SF is the total of any secured or guaranteed funds; and
  FD is the average amount due;
  (d) assigning the ratings and the performance indicator into numerical rating categories;
  (e) determining the creditworthiness score according to the following formula:

$$Cs(q) = \sum_{i=1}^{n} w_i \cdot R(q)_i$$

where:
- q is a given payor and obligor;
- CS(q) is the creditworthiness score for the payor and obligor;
- $w_i$ are the weighting factors assigned to each of rating agencies;
- $R(q)_i$ are the rating categories to which the ratings for the given payor and obligor are assigned for each of the rating agencies used; and
- n is the number of rating agencies used;

(f) obtaining a range of possible creditworthiness scores by determining a highest and a lowest possible creditworthiness score;

(g) dividing the range into a desired number of subranges;

(h) determining a highest and a lowest possible creditworthiness score for each subrange;

(i) determining to which subrange the creditworthiness score for each payor and obligor belongs by comparing the creditworthiness score for each payor and obligor to the highest and lowest possible creditworthiness scores for the subrange; and wherein the rating agencies, rating categories, and weighting factors are as shown in FIG. 49.

* * * * *